United States Patent
Karaoguz et al.

(10) Patent No.: US 9,247,286 B2
(45) Date of Patent: Jan. 26, 2016

(54) FRAME FORMATTING SUPPORTING MIXED TWO AND THREE DIMENSIONAL VIDEO DATA COMMUNICATION

(75) Inventors: Jeyhan Karaoguz, Irvine, CA (US); James D. Bennett, Hroznetin (CZ); Nambirajan Seshadri, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 342 days.

(21) Appl. No.: 12/982,289

(22) Filed: Dec. 30, 2010

(65) Prior Publication Data

US 2011/0169919 A1 Jul. 14, 2011

Related U.S. Application Data

(63) Continuation-in-part of application No. 12/774,307, filed on May 5, 2010, and a continuation-in-part of application No. 12/845,409, filed on Jul. 28, 2010, and a continuation-in-part of application No. 12/845,440, (Continued)

(51) Int. Cl.
*H04N 13/02* (2006.01)
*H04N 13/04* (2006.01)
(Continued)

(52) U.S. Cl.
CPC .......... *H04N 21/435* (2013.01); *H04N 13/0029* (2013.01); *H04N 13/0048* (2013.01); *H04N 13/0055* (2013.01); *H04N 13/0059* (2013.01);
(Continued)

(58) Field of Classification Search
CPC ........................... H04N 13/02; H04N 13/0228
USPC ..................................................... 348/42–60
See application file for complete search history.

(56) References Cited

U.S. PATENT DOCUMENTS

| 4,829,365 A | 5/1989 | Eichenlaub |
| 5,315,377 A | 5/1994 | Isono et al. |

(Continued)

FOREIGN PATENT DOCUMENTS

| EP | 0833183 A1 | 4/1998 |
| EP | 1662808 A1 | 5/2006 |

(Continued)

OTHER PUBLICATIONS

European Search Report received for European Patent Application No. 10015984.7, mailed on May 3, 2011, 3 pages.

(Continued)

*Primary Examiner* — Farzana Hossain
*Assistant Examiner* — Matthew Kwan
(74) *Attorney, Agent, or Firm* — Fiala & Weaver P.L.L.C.

(57) ABSTRACT

Systems and methods are provided that relate to frame formatting supporting mixed two and three dimensional video data communication. For example, frames in frame sequence (s) may be formatted to indicate that a first screen configuration is to be used for displaying first video content, that a second screen configuration is to be used for displaying second video content, and so on. The screen configurations may be different or the same. In another example, the frames in the frame sequence(s) may be formatted to indicate that the first video content is to be displayed at a first region of a screen, that the second video content is to be displayed at a second region of the screen, and so on. The regions of the screen may partially overlap, fully overlap, not overlap, be configured such that one or more regions are within one or more other regions, etc.

20 Claims, 25 Drawing Sheets

Related U.S. Application Data filed on Jul. 28, 2010, and a continuation-in-part of application No. 12/845,461, filed on Jul. 28, 2010.

(60) Provisional application No. 61/303,119, filed on Feb. 10, 2010, provisional application No. 61/291,818, filed on Dec. 31, 2009.

(51) Int. Cl.
*H04N 21/435* (2011.01)
*H04N 13/00* (2006.01)
*H04N 21/235* (2011.01)
*H04N 21/41* (2011.01)

(52) U.S. Cl.
CPC ....... *H04N 13/0404* (2013.01); *H04N 13/0409* (2013.01); *H04N 13/0411* (2013.01); *H04N 13/0447* (2013.01); *H04N 13/0454* (2013.01); *H04N 13/0456* (2013.01); *H04N 13/0468* (2013.01); *H04N 13/0497* (2013.01); *H04N 21/235* (2013.01); *H04N 21/4122* (2013.01); *H04N 2013/0463* (2013.01); *H04N 2013/0465* (2013.01)

(56) References Cited

U.S. PATENT DOCUMENTS

| | | |
|---|---|---|
| 5,493,427 A | 2/1996 | Nomura et al. |
| 5,615,046 A | 3/1997 | Gilchrist |
| 5,855,425 A | 1/1999 | Hamagishi |
| 5,945,965 A | 8/1999 | Inoguchi et al. |
| 5,959,597 A | 9/1999 | Yamada et al. |
| 5,969,850 A | 10/1999 | Harrold et al. |
| 5,990,975 A | 11/1999 | Nan et al. |
| 6,023,277 A | 2/2000 | Osaka et al. |
| 6,049,424 A | 4/2000 | Hamagishi |
| 6,094,216 A | 7/2000 | Taniguchi et al. |
| 6,144,375 A | 11/2000 | Jain et al. |
| 6,188,442 B1 | 2/2001 | Narayanaswami |
| 6,285,368 B1 | 9/2001 | Sudo |
| 6,697,687 B1 | 2/2004 | Kasahara et al. |
| 6,710,920 B1 | 3/2004 | Mashitani et al. |
| 6,909,555 B2 | 6/2005 | Wohlstadter |
| 7,030,903 B2 | 4/2006 | Sudo |
| 7,038,698 B1 | 5/2006 | Palm et al. |
| 7,091,471 B2 | 8/2006 | Wenstrand et al. |
| 7,123,213 B2 | 10/2006 | Yamazaki et al. |
| 7,190,518 B1 | 3/2007 | Kleinberger et al. |
| 7,359,105 B2 | 4/2008 | Jacobs et al. |
| 7,389,214 B1 | 6/2008 | Yelich et al. |
| 7,440,193 B2 | 10/2008 | Gunasekaran et al. |
| 7,511,774 B2 | 3/2009 | Lee et al. |
| 7,626,644 B2 | 12/2009 | Shestak et al. |
| 7,646,451 B2 | 1/2010 | Vogel et al. |
| 7,671,935 B2 | 3/2010 | Mather et al. |
| 7,692,859 B2 | 4/2010 | Redert et al. |
| 7,769,668 B2 | 8/2010 | Balabon |
| 7,885,079 B2 | 2/2011 | Chen et al. |
| 7,911,442 B2 | 3/2011 | Wang et al. |
| 7,924,456 B1 | 4/2011 | Kahn et al. |
| 7,954,967 B2 | 6/2011 | Kashiwagi et al. |
| 7,997,783 B2 | 8/2011 | Song et al. |
| 8,040,952 B2 | 10/2011 | Park et al. |
| 8,044,983 B2 | 10/2011 | Nonaka et al. |
| 8,049,710 B2 | 11/2011 | Shestak et al. |
| 8,072,411 B2 | 12/2011 | Chen et al. |
| 8,139,024 B2 | 3/2012 | Daiku |
| 8,154,686 B2 | 4/2012 | Mather et al. |
| 8,154,799 B2 * | 4/2012 | Kim et al. ..................... 359/463 |
| 8,174,564 B2 | 5/2012 | Kim et al. |
| 8,183,788 B2 | 5/2012 | Ma |
| 8,209,396 B1 | 6/2012 | Raman et al. |
| 8,233,034 B2 | 7/2012 | Sharp et al. |
| 8,284,119 B2 | 10/2012 | Kim et al. |
| 8,310,527 B2 | 11/2012 | Ko et al. |
| 8,334,933 B2 | 12/2012 | Tsukada et al. |
| 8,363,928 B1 | 1/2013 | Sharp |
| 8,368,745 B2 * | 2/2013 | Nam et al. ..................... 348/59 |
| 8,368,749 B2 | 2/2013 | Lambdin et al. |
| 8,384,774 B2 | 2/2013 | Gallagher |
| 8,400,392 B2 | 3/2013 | Kimura et al. |
| 8,411,746 B2 | 4/2013 | Chen et al. |
| 8,438,601 B2 | 5/2013 | Putterman et al. |
| 8,441,430 B2 | 5/2013 | Lee |
| 8,466,869 B2 | 6/2013 | Kobayashi et al. |
| 8,482,512 B2 | 7/2013 | Adachi et al. |
| 8,487,863 B2 | 7/2013 | Park et al. |
| 8,525,942 B2 | 9/2013 | Robinson et al. |
| 8,587,642 B2 | 11/2013 | Shestak et al. |
| 8,587,736 B2 | 11/2013 | Kang |
| 8,605,136 B2 | 12/2013 | Yu et al. |
| 8,687,042 B2 | 4/2014 | Karaoguz et al. |
| 8,736,659 B2 | 5/2014 | Liu |
| 8,766,905 B2 | 7/2014 | Adachi |
| 8,767,050 B2 | 7/2014 | Bennett et al. |
| 8,788,676 B2 | 7/2014 | Alameh et al. |
| 8,823,782 B2 | 9/2014 | Karaoguz et al. |
| 8,854,531 B2 | 10/2014 | Karaoguz et al. |
| 8,885,026 B2 | 11/2014 | Endo |
| 8,922,545 B2 | 12/2014 | Bennett et al. |
| 8,964,013 B2 | 2/2015 | Bennett et al. |
| 8,988,506 B2 | 3/2015 | Bennett et al. |
| 2002/0010798 A1 | 1/2002 | Ben-Shaul et al. |
| 2002/0037037 A1 | 3/2002 | Van Der Schaar |
| 2002/0167862 A1 | 11/2002 | Tomasi et al. |
| 2002/0171666 A1 | 11/2002 | Endo et al. |
| 2002/0194604 A1 | 12/2002 | Sanchez et al. |
| 2003/0012425 A1 | 1/2003 | Suzuki et al. |
| 2003/0103165 A1 | 6/2003 | Bullinger et al. |
| 2003/0137506 A1 | 7/2003 | Efran et al. |
| 2003/0154261 A1 | 8/2003 | Doyle et al. |
| 2003/0223499 A1 | 12/2003 | Routhier et al. |
| 2004/0027452 A1 | 2/2004 | Yun et al. |
| 2004/0036763 A1 | 2/2004 | Swift et al. |
| 2004/0041747 A1 | 3/2004 | Uehara et al. |
| 2004/0081302 A1 | 4/2004 | Kim et al. |
| 2004/0109093 A1 | 6/2004 | Small-Stryker |
| 2004/0141237 A1 | 7/2004 | Wohlstadter |
| 2004/0164292 A1 | 8/2004 | Tung et al. |
| 2004/0239231 A1 | 12/2004 | Miyagawa et al. |
| 2004/0252187 A1 | 12/2004 | Alden |
| 2004/0255337 A1 | 12/2004 | Doyle et al. |
| 2005/0044489 A1 | 2/2005 | Yamagami et al. |
| 2005/0073472 A1 | 4/2005 | Kim et al. |
| 2005/0128353 A1 | 6/2005 | Young et al. |
| 2005/0185515 A1 | 8/2005 | Berstis et al. |
| 2005/0237487 A1 | 10/2005 | Chang |
| 2005/0248561 A1 | 11/2005 | Ito et al. |
| 2005/0259147 A1 | 11/2005 | Nam et al. |
| 2006/0026090 A1 | 2/2006 | Balabon |
| 2006/0050785 A1 | 3/2006 | Watanabe et al. |
| 2006/0087556 A1 | 4/2006 | Era |
| 2006/0109242 A1 | 5/2006 | Simpkins |
| 2006/0139448 A1 * | 6/2006 | Ha et al. ..................... 348/51 |
| 2006/0139490 A1 | 6/2006 | Fekkes et al. |
| 2006/0244918 A1 | 11/2006 | Cossairt et al. |
| 2006/0256136 A1 | 11/2006 | O'Donnell et al. |
| 2006/0256302 A1 | 11/2006 | Hsu |
| 2006/0262376 A1 | 11/2006 | Mather et al. |
| 2006/0271791 A1 | 11/2006 | Novack et al. |
| 2007/0002041 A1 * | 1/2007 | Kim et al. ..................... 345/419 |
| 2007/0008406 A1 | 1/2007 | Shestak et al. |
| 2007/0008620 A1 | 1/2007 | Shestak et al. |
| 2007/0052807 A1 | 3/2007 | Zhou et al. |
| 2007/0061845 A1 * | 3/2007 | Barnes, Jr. ..................... 725/62 |
| 2007/0072674 A1 | 3/2007 | Ohta et al. |
| 2007/0085814 A1 | 4/2007 | Ijzerman et al. |
| 2007/0096125 A1 | 5/2007 | Vogel et al. |
| 2007/0097103 A1 | 5/2007 | Yoshioka et al. |
| 2007/0097208 A1 | 5/2007 | Takemoto et al. |
| 2007/0110035 A1 | 5/2007 | Bennett |
| 2007/0139371 A1 | 6/2007 | Harsham et al. |
| 2007/0146267 A1 | 6/2007 | Jang et al. |

(56) References Cited

U.S. PATENT DOCUMENTS

| | | |
|---|---|---|
| 2007/0147827 A1 | 6/2007 | Sheynman et al. |
| 2007/0153122 A1 | 7/2007 | Ayite et al. |
| 2007/0153916 A1* | 7/2007 | Demircin et al. ........ 375/240.26 |
| 2007/0162392 A1 | 7/2007 | McEnroe et al. |
| 2007/0225994 A1 | 9/2007 | Moore |
| 2007/0226258 A1 | 9/2007 | Lambdin et al. |
| 2007/0258140 A1 | 11/2007 | Shestak et al. |
| 2007/0270218 A1 | 11/2007 | Yoshida et al. |
| 2007/0296874 A1 | 12/2007 | Yoshimoto et al. |
| 2008/0025390 A1 | 1/2008 | Shi et al. |
| 2008/0037120 A1 | 2/2008 | Koo et al. |
| 2008/0043096 A1 | 2/2008 | Vetro et al. |
| 2008/0043644 A1* | 2/2008 | Barkley et al. ................ 370/261 |
| 2008/0068329 A1 | 3/2008 | Shestak et al. |
| 2008/0086321 A1 | 4/2008 | Walton |
| 2008/0086391 A1 | 4/2008 | Maynard et al. |
| 2008/0086685 A1 | 4/2008 | Janky et al. |
| 2008/0126557 A1 | 5/2008 | Motoyama et al. |
| 2008/0133122 A1 | 6/2008 | Mashitani et al. |
| 2008/0150853 A1 | 6/2008 | Peng et al. |
| 2008/0165176 A1 | 7/2008 | Archer et al. |
| 2008/0168129 A1 | 7/2008 | Robbin et al. |
| 2008/0184301 A1 | 7/2008 | Boylan et al. |
| 2008/0191964 A1 | 8/2008 | Spengler |
| 2008/0192112 A1 | 8/2008 | Hiramatsu et al. |
| 2008/0204550 A1 | 8/2008 | De Zwart et al. |
| 2008/0246757 A1 | 10/2008 | Ito |
| 2008/0259233 A1 | 10/2008 | Krijn et al. |
| 2008/0273242 A1 | 11/2008 | Woodgate et al. |
| 2008/0284844 A1 | 11/2008 | Woodgate et al. |
| 2008/0303832 A1* | 12/2008 | Kim et al. ..................... 345/501 |
| 2009/0002178 A1 | 1/2009 | Guday et al. |
| 2009/0010264 A1 | 1/2009 | Zhang |
| 2009/0051759 A1 | 2/2009 | Adkins et al. |
| 2009/0052164 A1 | 2/2009 | Kashiwagi et al. |
| 2009/0058845 A1 | 3/2009 | Fukuda et al. |
| 2009/0066785 A1* | 3/2009 | Lee ................... 348/51 |
| 2009/0102915 A1 | 4/2009 | Arsenich |
| 2009/0115783 A1 | 5/2009 | Eichenlaub |
| 2009/0115800 A1 | 5/2009 | Berretty et al. |
| 2009/0133051 A1 | 5/2009 | Hildreth |
| 2009/0138280 A1 | 5/2009 | Morita et al. |
| 2009/0138805 A1 | 5/2009 | Hildreth |
| 2009/0141182 A1 | 6/2009 | Miyashita et al. |
| 2009/0167639 A1 | 7/2009 | Casner et al. |
| 2009/0174700 A1 | 7/2009 | Daiku |
| 2009/0232202 A1 | 9/2009 | Chen et al. |
| 2009/0238378 A1 | 9/2009 | Kikinis et al. |
| 2009/0244262 A1 | 10/2009 | Masuda et al. |
| 2009/0244266 A1 | 10/2009 | Brigham |
| 2009/0268816 A1 | 10/2009 | Pandit et al. |
| 2009/0319625 A1 | 12/2009 | Kouhi |
| 2010/0007582 A1 | 1/2010 | Zalewski |
| 2010/0045782 A1 | 2/2010 | Morita |
| 2010/0066850 A1 | 3/2010 | Wilson et al. |
| 2010/0070987 A1 | 3/2010 | Amento et al. |
| 2010/0071015 A1 | 3/2010 | Tomioka et al. |
| 2010/0079374 A1 | 4/2010 | Cortenraad et al. |
| 2010/0097525 A1 | 4/2010 | Mino |
| 2010/0107184 A1 | 4/2010 | Shintani |
| 2010/0128112 A1 | 5/2010 | Marti et al. |
| 2010/0135640 A1 | 6/2010 | Zucker et al. |
| 2010/0182407 A1 | 7/2010 | Ko et al. |
| 2010/0208042 A1 | 8/2010 | Ikeda et al. |
| 2010/0215343 A1 | 8/2010 | Ikeda et al. |
| 2010/0218231 A1 | 8/2010 | Frink et al. |
| 2010/0225576 A1 | 9/2010 | Morad et al. |
| 2010/0231511 A1 | 9/2010 | Henty et al. |
| 2010/0238274 A1* | 9/2010 | Kim et al. ................ 348/51 |
| 2010/0238367 A1 | 9/2010 | Montgomery et al. |
| 2010/0245548 A1 | 9/2010 | Sasaki et al. |
| 2010/0272174 A1 | 10/2010 | Toma et al. |
| 2010/0299390 A1 | 11/2010 | Alameh et al. |
| 2010/0302461 A1 | 12/2010 | Lim et al. |
| 2010/0306800 A1 | 12/2010 | Jung et al. |
| 2010/0309290 A1 | 12/2010 | Myers |
| 2011/0016004 A1 | 1/2011 | Loyall et al. |
| 2011/0043475 A1 | 2/2011 | Rigazio et al. |
| 2011/0050687 A1 | 3/2011 | Alyshev et al. |
| 2011/0063289 A1 | 3/2011 | Gantz |
| 2011/0064146 A1 | 3/2011 | Chen et al. |
| 2011/0090233 A1 | 4/2011 | Shahraray et al. |
| 2011/0090413 A1 | 4/2011 | Liou |
| 2011/0093882 A1 | 4/2011 | Candelore et al. |
| 2011/0109964 A1 | 5/2011 | Kim et al. |
| 2011/0113343 A1 | 5/2011 | Trauth |
| 2011/0122944 A1 | 5/2011 | Gupta et al. |
| 2011/0137894 A1 | 6/2011 | Narayanan et al. |
| 2011/0149026 A1 | 6/2011 | Luthra |
| 2011/0157167 A1 | 6/2011 | Bennett et al. |
| 2011/0157168 A1 | 6/2011 | Bennett et al. |
| 2011/0157169 A1 | 6/2011 | Bennett et al. |
| 2011/0157170 A1 | 6/2011 | Bennett et al. |
| 2011/0157172 A1 | 6/2011 | Bennett et al. |
| 2011/0157257 A1 | 6/2011 | Bennett et al. |
| 2011/0157264 A1 | 6/2011 | Seshadri et al. |
| 2011/0157309 A1 | 6/2011 | Bennett et al. |
| 2011/0157315 A1 | 6/2011 | Bennett et al. |
| 2011/0157322 A1 | 6/2011 | Bennett et al. |
| 2011/0157326 A1 | 6/2011 | Karaoguz et al. |
| 2011/0157327 A1 | 6/2011 | Seshadri et al. |
| 2011/0157330 A1 | 6/2011 | Bennett et al. |
| 2011/0157336 A1 | 6/2011 | Bennett et al. |
| 2011/0157339 A1 | 6/2011 | Bennett et al. |
| 2011/0157471 A1 | 6/2011 | Seshadri et al. |
| 2011/0157696 A1 | 6/2011 | Bennett et al. |
| 2011/0157697 A1 | 6/2011 | Bennett et al. |
| 2011/0159929 A1 | 6/2011 | Karaoguz et al. |
| 2011/0161843 A1 | 6/2011 | Bennett et al. |
| 2011/0164034 A1 | 7/2011 | Bennett et al. |
| 2011/0164111 A1 | 7/2011 | Karaoguz et al. |
| 2011/0164115 A1 | 7/2011 | Bennett et al. |
| 2011/0164188 A1 | 7/2011 | Karaoguz et al. |
| 2011/0169913 A1 | 7/2011 | Karaoguz et al. |
| 2011/0169930 A1 | 7/2011 | Bennett et al. |
| 2011/0199469 A1 | 8/2011 | Gallagher |
| 2011/0234754 A1 | 9/2011 | Newton et al. |
| 2011/0254698 A1 | 10/2011 | Eberl et al. |
| 2011/0268177 A1 | 11/2011 | Tian et al. |
| 2011/0282631 A1 | 11/2011 | Poling et al. |
| 2012/0016917 A1 | 1/2012 | Priddle et al. |
| 2012/0081515 A1 | 4/2012 | Jang |
| 2012/0212414 A1 | 8/2012 | Osterhout et al. |
| 2012/0235900 A1 | 9/2012 | Border et al. |
| 2012/0308208 A1 | 12/2012 | Karaoguz et al. |
| 2013/0127980 A1 | 5/2013 | Haddick et al. |
| 2015/0015668 A1 | 1/2015 | Bennett et al. |
| 2015/0156473 A1 | 6/2015 | Bennett et al. |

FOREIGN PATENT DOCUMENTS

| | | |
|---|---|---|
| EP | 1816510 A1 | 8/2007 |
| EP | 1993294 A2 | 11/2008 |
| GB | 2454771 A | 5/2009 |
| TW | 200938878 A | 9/2009 |
| WO | 2005/045488 A1 | 5/2005 |
| WO | 2007/024118 A1 | 3/2007 |
| WO | 2008038068 A1 | 4/2008 |
| WO | 2008126557 A1 | 10/2008 |
| WO | 2009/031872 A2 | 3/2009 |
| WO | 2009/098622 A2 | 8/2009 |

OTHER PUBLICATIONS

European search Report received for European Patent Application No. 10016055.5, mailed on Apr. 12, 2011, 3 pages.

EPO Communication received for European Patent Application No. 10016055.5, mailed on Apr. 5, 2013, 6 pages.

"How Browsers Work", retrieved from <http://taligarsiel.com/Projects/howbrowserswork1.htm> on Oct. 21, 2010, 54 pages.

IEEE 100 The Authoritative Dictionary of IEEE Standards Terms Seventh Edition, entry for "engine", IEEE 100-2000, 2000, pp. 349-411.

(56) References Cited

OTHER PUBLICATIONS

IEEE 100 The Authoritative Dictionary of IEEE Standards Terms Seventh Edition, entry for "Web page", IEEE 100-2000, 2000, pp. 1269-1287.

Wikipedia entry on "Scripting language", retrieved on Aug. 16, 2012, 4 pages.

Peterka, Thomas, "Dynallax: Dynamic Parallax Barrier Autostereoscopic Display", PH.D. Dissertation, University of Illinois at Chicago, 2007, 134 pages.

Shan et al., "Principles and Evaluation of Autostereoscopic Photogrammetric Measurement", Photogrammetric Engineering and Remote Sensing, vol. 72, No. 4, Apr. 2006, pp. 365-372.

Yanagisawa et al., "A Focus Distance Controlled 3DTV", SPIE, vol. 3012, Stereoscopic Displays and Virtual Reality Systems IV, May 15, 1997, pp. 256-261.

Yanaka, Kazuhisa "Stereoscopic Display Technique for Web3D Images", SIGGRAPH 2009, New Orleans, Louisiana, Aug. 3-7, 2009, 1 page.

Fono, et al.,"EyeWindows: Evaluation of Eye-Controlled Zooming Windows for Focus Selection",CHI 2005, Papers: Eyes on Interaction, Portland, Oregon, Apr. 2-7, 2005, pp. 151-160.

Kumar et al.,"Eye Point: Practical Pointing and Selection Using Gaze and Keyboard",CHI 2007, Apr. 28-May 3, 2007, 10 pages.

Liao, et al., "The Design and Application of High-Resolution 3D Stereoscopic graphics Display on PC", Purdue University School of Science, 2000., pp. 1-7.

"Displaying Stereoscopic 3D (S3D) with Intel HD Graphics Processors for Software Developers", Intel, Aug. 2011, pp. 1-10.

Office Action Received for Chinese Patent Application No. 201010619646.3, mailed on Mar. 31, 2014, 7 pages of Chinese Office action only.

Office Action Received for Chinese Patent Application No. 201010619646.x, mailed on Mar. 5, 2014, 4 pages of Chinese Office action only.

Office Action Received for Taiwanese Patent Application No. 099147124, mailed on Mar. 31, 2014, 8 pages.

Ko et al., "Facial Feature Tracking and Head Orientation-Based Gaze Tracking", ETRI, 2000, 4 pages.

Ruddarraju et al., "Perceptual User Interfaces Using Vision-Based Eye Tracking", ICMI, Nov. 5-7, 2003, 7 pages.

Office Action received for Chinese Patent Application No. 201010619649.3, mailed on Oct. 11, 2014, 5 pages.

\* cited by examiner

FRAME FORMATTING SUPPORTING MIXED TWO AND THREE DIMENSIONAL VIDEO DATA COMMUNICATION

CROSS-REFERENCE TO RELATED APPLICATIONS

This application claims the benefit of U.S. Provisional Application No. 61/291,818, filed on Dec. 31, 2009, which is incorporated by reference herein in its entirety. This application also claims the benefit of U.S. Provisional Application No. 61/303,119, filed on Feb. 10, 2010, which is incorporated by reference herein in its entirety.

This application is a continuation-in-part of the following pending U.S. Patent Applications, which are each incorporated by reference herein in their entireties:

U.S. patent application Ser. No. 12/845,409, titled "Display With Adaptable Parallax Barrier," filed on Jul. 28, 2010;

U.S. patent application Ser. No. 12/845,440, titled "Adaptable Parallax Barrier Supporting Mixed 2D And Stereoscopic 3D Display Regions," filed on Jul. 28, 2010;

U.S. patent application Ser. No. 12/845,461, titled "Display Supporting Multiple Simultaneous 3D Views," filed on Jul. 28, 2010; and U.S. patent application Ser. No. 12/774,307, titled "Display with Elastic Light Manipulator," filed on May 5, 2010."

This application is also related to the following U.S. Patent Applications, each of which also claims the benefit of U.S. Provisional Patent Application Nos. 61/291,818 and 61/303,119 and each of which is incorporated by reference herein:

U.S. patent application Ser. No. 12/982,053, filed on titled "Hierarchical Video Compression Supporting Selective Delivery of Two-Dimensional and Three-Dimensional Video Content," filed on Dec. 30, 2010;

U.S. patent application Ser. No. 12/982,199, titled "Transcoder Supporting Selective Delivery of 2D, Stereoscopic 3D and Multi-View 3D Content from Source Video," filed on Dec. 30, 2010;

U.S. patent application Ser. No. 12/982,248, titled "Interpolation of Three-Dimensional Video Content" filed on Dec. 30, 2010;

U.S. patent application Ser. No. 12/982,062, titled "Set-Top Box Circuitry Supporting 2D and 3D Content Reductions to Accommodate Viewing Environment Constraints"; and U.S. patent application Ser. No. 12/982,330, titled "Multi-path and Multi-Source 3D Content Storage, Retrieval and Delivery," filed on Dec. 30, 2010.

BACKGROUND OF THE INVENTION

1. Field of the Invention

The present invention relates to techniques for formatting video frames.

2. Background Art

Images may be generated for display in various forms. For instance, television (TV) is a widely used telecommunication medium for transmitting and displaying images in monochromatic ("black and white") or color form. Conventionally, images are provided in analog form and are displayed by display devices in two-dimensions. More recently, images are being provided in digital form for display in two-dimensions on display devices having improved resolution (e.g., "high definition" or "HD"). Even more recently, images capable of being displayed in three-dimensions are being generated.

Conventional displays may use a variety of techniques to achieve three-dimensional image viewing functionality. For example, various types of glasses have been developed that may be worn by users to view three-dimensional images displayed by a conventional display. Examples of such glasses include glasses that utilize color filters or polarized filters. In each case, the lenses of the glasses pass two-dimensional images of differing perspective to the user's left and right eyes. The images are combined in the visual center of the brain of the user to be perceived as a three-dimensional image. In another example, synchronized left eye, right eye LCD (liquid crystal display) shutter glasses may be used with conventional two-dimensional displays to create a three-dimensional viewing illusion. In still another example, LCD display glasses are being used to display three-dimensional images to a user. The lenses of the LCD display glasses include corresponding displays that provide images of differing perspective to the user's eyes, to be perceived by the user as three-dimensional.

Some displays are configured for viewing three-dimensional images without the user having to wear special glasses, such as by using techniques of autostereoscopy. For example, a display may include a parallax barrier that has a layer of material with a series of precision slits. The parallax barrier is placed proximal to a display so that a user's eyes each see a different set of pixels to create a sense of depth through parallax. Another type of display for viewing three-dimensional images is one that includes a lenticular lens. A lenticular lens includes an array of magnifying lenses configured so that when viewed from slightly different angles, different images are magnified. Displays are being developed that use lenticular lenses to enable autostereoscopic images to be generated.

Techniques for achieving three-dimensional image viewing functionality often use predefined frame formats in an attempt to ensure that displays and other components in display systems are capable of interpreting the data that are included in frame sequences. For instance, a High-Definition Multimedia Interface (HDMI) industry standard currently provides support for three-dimensional video communication cabling. However, HDMI and other such standards are directed to rigid frame structures supporting, for example, only a single full-screen left eye frame sequence and a single full-screen right eye frame sequence to be consumed by using shutter lens glasses.

BRIEF SUMMARY OF THE INVENTION

Methods, systems, and apparatuses are described for frame formatting supporting mixed two and three dimensional video data communication, substantially as shown in and/or described herein in connection with at least one of the figures, as set forth more completely in the claims.

BRIEF DESCRIPTION OF THE DRAWINGS/FIGURES

The accompanying drawings, which are incorporated herein and form part of the specification, illustrate embodiments of the present invention and, together with the description, further serve to explain the principles involved and to enable a person skilled in the relevant art(s) to make and use the disclosed technologies.

FIGS. 1, 8, and 9 show block diagrams of exemplary display systems, according to embodiments.

Figure 1:
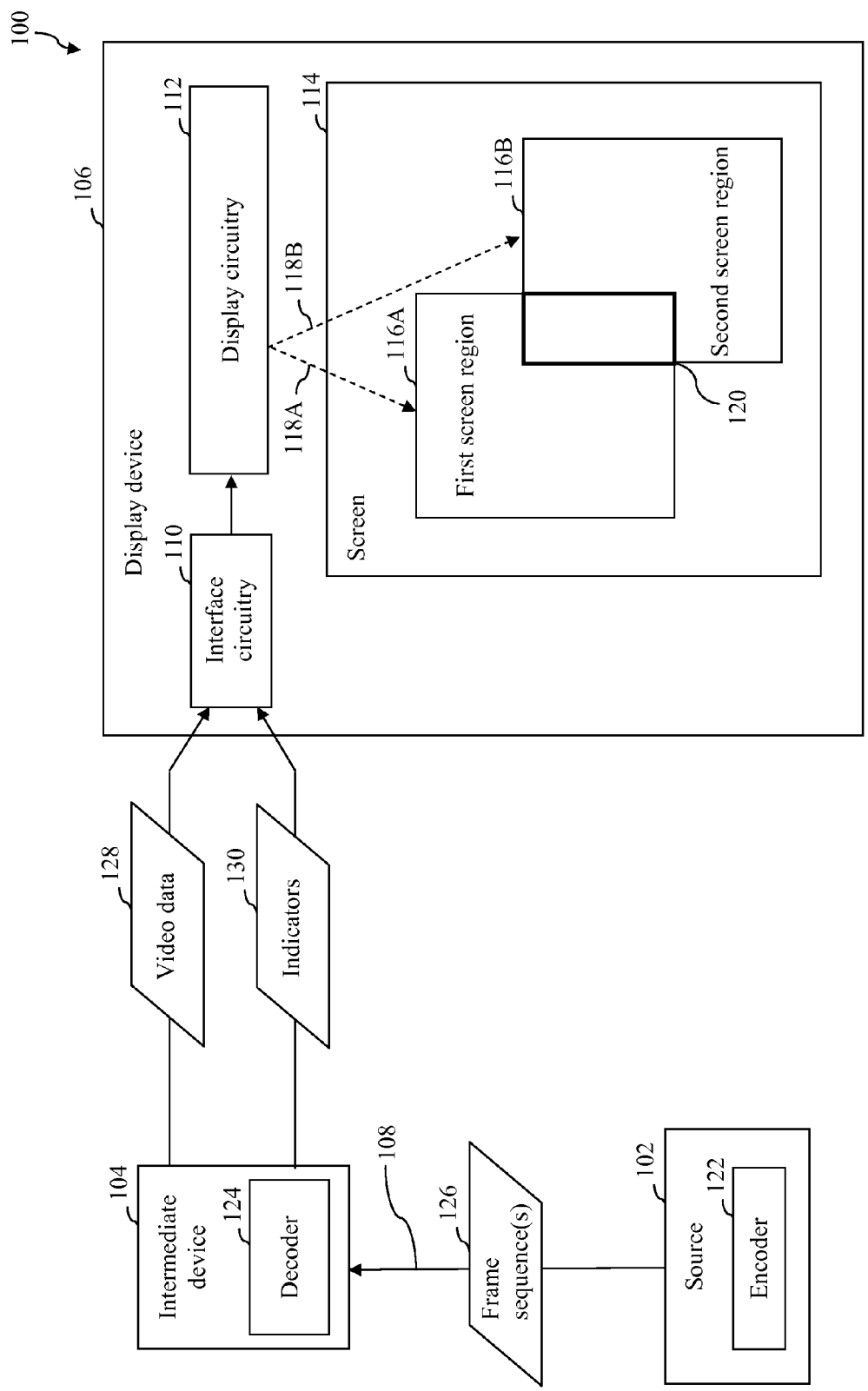

The features and advantages of the disclosed technologies will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION OF THE INVENTION

I. Introduction

The following detailed description refers to the accompanying drawings that illustrate exemplary embodiments of the present invention. However, the scope of the present invention is not limited to these embodiments, but is instead defined by the appended claims. Thus, embodiments beyond those shown in the accompanying drawings, such as modified versions of the illustrated embodiments, may nevertheless be encompassed by the present invention.

References in the specification to "one embodiment," "an embodiment," "an exemplary embodiment," or the like, indicate that the embodiment described may include a particular feature, structure, or characteristic, but every embodiment may not necessarily include the particular feature, structure, or characteristic. Moreover, such phrases are not necessarily referring to the same embodiment. Furthermore, when a particular feature, structure, or characteristic is described in connection with an embodiment, it is submitted that it is within the knowledge of one skilled in the relevant art(s) to implement such feature, structure, or characteristic in connection with other embodiments whether or not explicitly described.

Furthermore, it should be understood that spatial descriptions (e.g., "above," "below," "up," "left," "right," "down," "top," "bottom," "vertical," "horizontal," etc.) used herein are for purposes of illustration only, and that practical implementations of the structures described herein can be spatially arranged in any orientation or manner.

II. Exemplary Embodiments

Exemplary embodiments relate to frame formatting supporting mixed two and three dimensional video data communication. For example, frames in frame sequence(s) may be formatted to indicate that a first screen configuration (a.k.a. display configuration) is to be used for displaying first video content, that a second screen configuration is to be used for displaying second video content, and so on.

Any suitable screen configuration may be used to display video content. For example, a two-dimensional (2D) configuration is used to display a 2D representation of the video content. In another example, a three-dimensional (3D) configuration is used to display a 3D representation of the video content. A 3D configuration may include any number of viewpoints (a.k.a. perspectives), two of which may be combined to provide a three-dimensional viewing experience. For instance, a 3D configuration that includes n viewpoints is said to be a 3Dn configuration, where n is a positive integer greater than or equal to two. The configurations that are used to display the different video contents may be different or the same.

Different video contents may be associated with respective regions of a screen. For instance, the first video content may be associated with a first region of the screen; the second video content may be associated with a second region of the screen, and so on. The frames in the frame sequence(s) may be formatted to indicate the associations of the video contents with the regions of the screen. The regions of the screen may partially overlap, fully overlap, not overlap, be configured such that one or more regions are within one or more other regions, etc.

Data that corresponds to the different video contents may be received from a common source or from different sources. The frame formatting may support simultaneous streamed display of the different video contents.

The following subsections describe numerous exemplary embodiments of the present invention. For instance, the next subsection describes embodiments for frame formatting supporting mixed two and three dimensional video data communication, followed by a subsection that describes exemplary display device screen environments, a subsection that describes exemplary display environments, and a subsection that describes exemplary electronic devices.

It will be apparent to persons skilled in the relevant art that various changes in form and detail can be made to the embodiments described herein without departing from the spirit and scope of the invention. Thus, the breadth and scope of the present invention should not be limited by any of the exemplary embodiments described herein.

A. Exemplary Frame Formatting Embodiments

Embodiments for frame formatting supporting mixed two and three dimensional video data communication may be implemented in a variety of environments. For instance, FIG. 1 shows a block diagram of an exemplary display system 100, according to an embodiment. Generally speaking, display system 100 operates to provide differing video content among regions of a screen based on formatting of frames that correspond to the differing video content. Any suitable screen configuration(s) (e.g., 2D, 3D2, 3D4, 3D8, etc.) may be used to display the video content.

As shown in FIG. 1, system 100 includes a source 102, an intermediate device 104, and a display device 106. Source provides differing 2D and/or 3D video data for delivery toward a display device (e.g., display device 106) in one or more frame sequences. Each video data corresponds to respective video content. In one example, each video data may be included in a respective frame sequence. In another example, two or more video data may be included in a frame sequence. For instance, all of the video data may be included in a single frame sequence.

Source 102 includes an encoder 122. Encoder 122 encodes frame(s) of frame sequence(s) 126 that include video data 128. For instance, encoder 122 may format the frame(s) by placing field(s) therein to indicate screen configurations that are to be used to display the differing video content 128 and/or screen regions in which the differing video content 128 is to be displayed.

In one example, encoder 122 may format each of one or more frames to indicate that first video content that corresponds to first video data is to be displayed using a first screen configuration, to indicate that second video content that corresponds to second video data is to be displayed using a second screen configuration, and so on. In another example, encoder 122 may format first frame(s) to indicate that the first video content is to be displayed using the first screen configuration; encoder 122 may format second frame(s) to indicate that the second video content is to be displayed using the second screen configuration, and so on.

In yet another example, encoder 122 may format each of one or more frame(s) to indicate that the first video content is to be displayed at a first region of a screen (e.g., screen 114), that the second video content is to be displayed at a second region of the screen, and so on. In still another example, the encoder 122 may format first frame(s) to indicate that the first video content is to be displayed at the first region of the screen; encoder 122 may format second frame(s) to indicate that the second video content is to be displayed at the second region of the screen, and so on. Source 102 delivers the frame sequence(s) 126 to intermediate device 104 via communication pathway 108 using well-known communication protocols.

Source 102 is shown to include an encoder 122 for illustrative purposes and is not intended to be limiting. It will be recognized that source 102 need not necessarily include encoder 122. For instance, source 102 may store the video data in an encoded state.

Intermediate device 104 decodes the frame(s) of the frame sequence(s) 126 that include the video data 128 upon receipt of the frame sequence(s) 126 from source 102. Intermediate device 104 determines the screen configuration and/or screen region with which each of the differing video data is associated based on the format of the frame(s). For instance, intermediate device 104 may determine the screen configurations and/or screen regions based on fields that encoder 122 places in the frame(s). Intermediate device 104 provides the video data 128 to display device 106, along with indicators 130 that specify the screen configurations and/or screen regions that are associated with the respective video data 128. For instance, indicators 130 may include fields that encoder 122 places in the frame(s) or information that is based on the fields. In some embodiments, intermediate device 104 is included in display device 106.

Display device 106 provides the video content that corresponds to the video data 128 based on the indicators 130 that are received from intermediate device 104. Display device 106 may be implemented in various ways. For instance, display device 106 may be a television display (e.g., a liquid crystal display (LCD) television, a plasma television, etc.), a computer monitor, a projection system, or any other type of display device.

Display device 106 includes interface circuitry 110, display circuitry 112, and a screen 114. Interface circuitry 110 provides the video data 128 and the indicators 130 that are received from intermediate device 104 to display circuitry 112 for further processing. The video data 128 is described below as including first video data and second video data for illustrative purposes and is not intended to be limiting. The video data 128 may include any number of differing video data.

Display circuitry 112 directs display of the video content 128 among regions of screen 114 based on the indicators 130. For example, as shown in FIG. 1, display circuitry 112 directs display of first video content that corresponds to the first video data in a first screen region 116A (a.k.a. display region) of screen 114, as indicated by arrow 118A, based on at least one of the indicators 130 specifying that the first video content is to be displayed in first screen region 116A. Display circuitry 112 further directs display of second video content that corresponds to the second video data in a second screen region 116B of screen 114, as indicated by arrow 118B, based on at least one of the indicators 130 specifying that the second video content is to be displayed in second screen region 116B. It will be recognized that the functionality of display circuitry 112 may be implemented in hardware, software, firmware, or any combination thereof.

In one embodiment, the first video content and the second video content are unrelated. For instance, the first video content may depict a scene from a movie, and the second video content may depict a scene from another movie, a television show, a home video, etc. In another embodiment, the first video content and the second video content are related. For example, the first video content may depict a scene from a first perspective (a.k.a. viewpoint or orientation), and the second video content may depict the scene from a second perspective.

Each of the first and second video data may be two-dimensional video data or three-dimensional video data. Two-dimensional video data corresponds to video content that is configured to be perceived as a sequence of two-dimensional images. Three-dimensional video data corresponds to video content that is configured to be perceived as a sequence of three-dimensional images. For example, the first video data may be two-dimensional video data, and the second video data may be three-dimensional video data. In accordance with this example, the first video data may include video frames that correspond to respective sequential two-dimensional images, and the second video data may include second video frames and respective third video frames to provide respective frame pairs that correspond to respective sequential three-dimensional images.

In another example, the first video data may be three-dimensional video data, and the second video data may be two-dimensional video data. In yet another example, both the first video data and the second video data may be two-dimensional video data. In still another example, both the first video data and the second video data may be three-dimensional video data.

Screen 114 displays the video content among screen regions 116A and 116B as directed by display circuitry 112. Screen 114 is capable of simultaneously supporting multiple screen configurations. Accordingly, screen 114 is capable of simultaneously displaying video content that corresponds to two-dimensional video data and other video content that corresponds to three-dimensional video data. Screen 114 is also capable of simultaneously displaying video content that corresponds to first three-dimensional video data that represents a first number of perspectives and other video content that corresponds to second three-dimensional video data that represents a second number of perspectives that is different from the first number.

As shown in FIG. 1, screen 114 displays the first video content in first screen region 116A and the second video content in second screen region 116B. First screen region 116A and second screen region 116B are shown in FIG. 1 to overlap in area of overlap 120 for illustrative purposes and are not intended to be limiting. It will be recognized that screen regions 116A and 116B may partially overlap (as shown in FIG. 1), fully overlap, not overlap, be configured such that first screen region 116A is within second screen region 116B, be configured such that second screen region 116B is within first screen region 116A, etc. Moreover, screen regions (e.g., screen regions 116A and 116B) may be substantially square in shape, as shown in FIG. 1, or may have other shapes, including rectangular, round or rounded, triangular or other polygon, or any other shape, such as the shape of an object, a displayed character (e.g., a person, an animal, an animated character, etc.), etc. Screen 114 may be any suitable type of screen, including an LCD screen, a plasma screen, a light emitting device (LED) screen (e.g., an OLED (organic LED) screen), etc.

Figure 2:
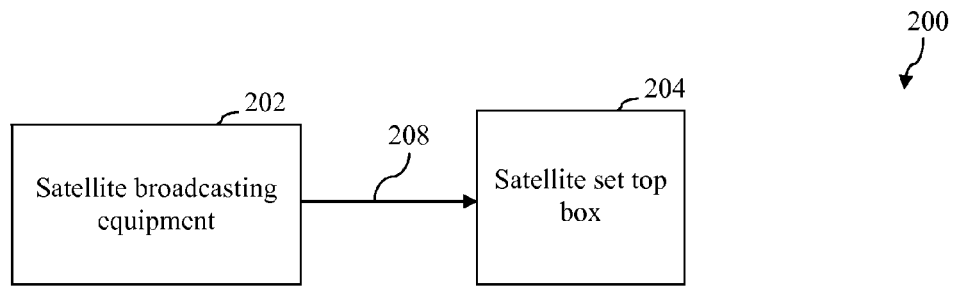
FIGS. 2-7 show some exemplary implementations of sources and intermediate devices in accordance with embodiments.

Source 102 and intermediate device 104 may be implemented as any suitable source and any suitable intermediate device, respectively. FIGS. 2-7 show some exemplary implementations of sources and intermediate devices in accordance with embodiments. As shown in FIG. 2, source 102 may be implemented as satellite broadcasting equipment 202, and intermediate device 104 may be implemented as a satellite set top box 204. Satellite broadcasting equipment 202 may provide the frame sequences 126 shown in FIG. 1 to satellite set top box 204 via a satellite pathway 208.

Figure 3:
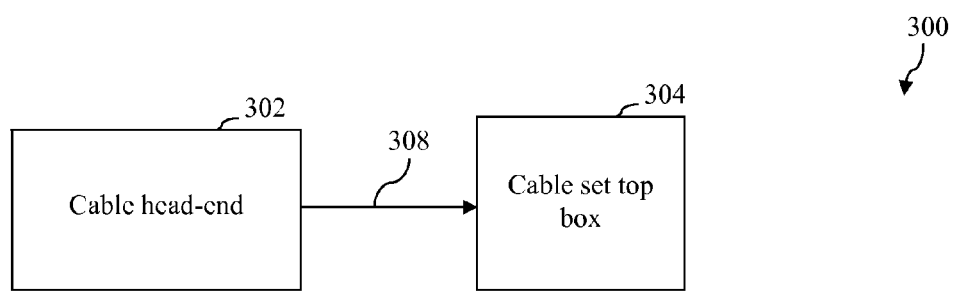

As shown in FIG. 3, source 102 may be implemented as cable head-end 302, and intermediate device 104 may be implemented as a cable set top box 304. Cable head-end 302 may provide the frame sequences 126 to cable set top box 304 via a cable pathway 308.

Figure 4:
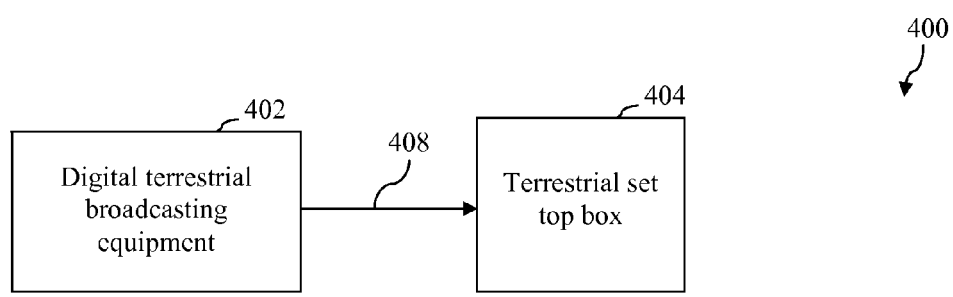

As shown in FIG. 4, source 102 may be implemented as digital terrestrial broadcasting equipment 402, and intermediate device 104 may be implemented as a terrestrial set top box 404. Digital terrestrial broadcasting equipment 402 may provide the frame sequences 126 to terrestrial set top box 404 via a terrestrial pathway 408.

Figure 5:
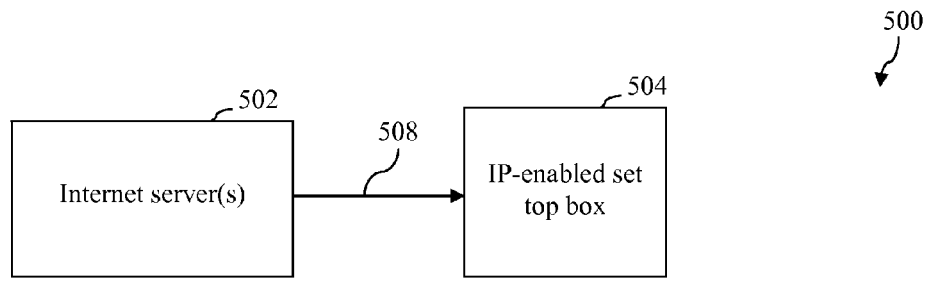

As shown in FIG. 5, source 102 may be implemented as internet server(s) 502, and intermediate device 104 may be implemented as an internet protocol-enabled (IP-enabled) set top box 504. Internet server(s) 502 may provide the frame sequences 126 to IP-enabled set top box 504 via an internet pathway 508. In accordance with this embodiment, quality of service (QoS) may be used to support mixed, regional 2D/3D content streaming and/or background downloading from internet server(s) 502.

Figure 6:
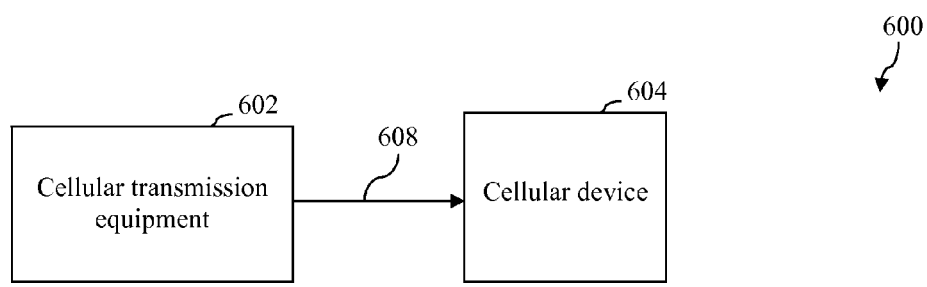

As shown in FIG. 6, source 102 may be implemented as cellular transmission equipment 602, and intermediate device 104 may be implemented as a cellular device 604. Cellular transmission equipment 602 may provide the frame sequences 126 to cellular device 604 via a cellular pathway 608.

Figure 7:
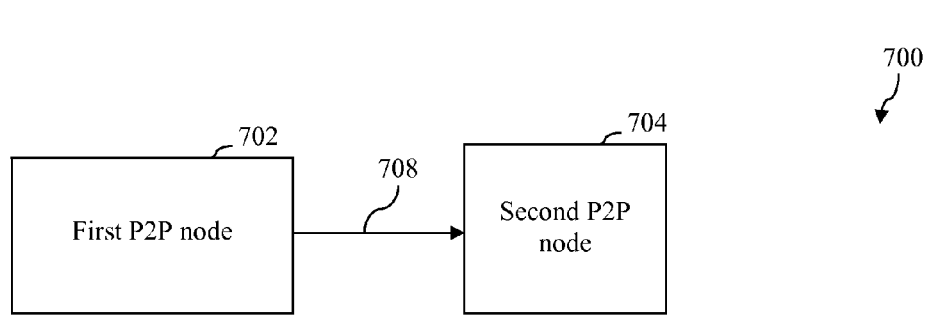

As shown in FIG. 7, source 102 may be implemented as a first point-to-point (P2P) node 702, and intermediate device 104 may be implemented as a second P2P node 704. First P2P node 702 may provide the frame sequences 126 to second P2P node 704 via a P2P pathway 708. P2P pathway 708 may be a wireless pathway or a wired pathway (e.g., a high-definition multimedia interface (HDMI) pathway).

The exemplary implementations of source 102 and intermediate device 104 described above are provided for illustrative purposes and are not intended to be limiting. For instance, source 102 may be implemented as a network attached storage (NAS) device, which may provide the frame sequences 126 to any suitable intermediate device 104.

Figure 8:
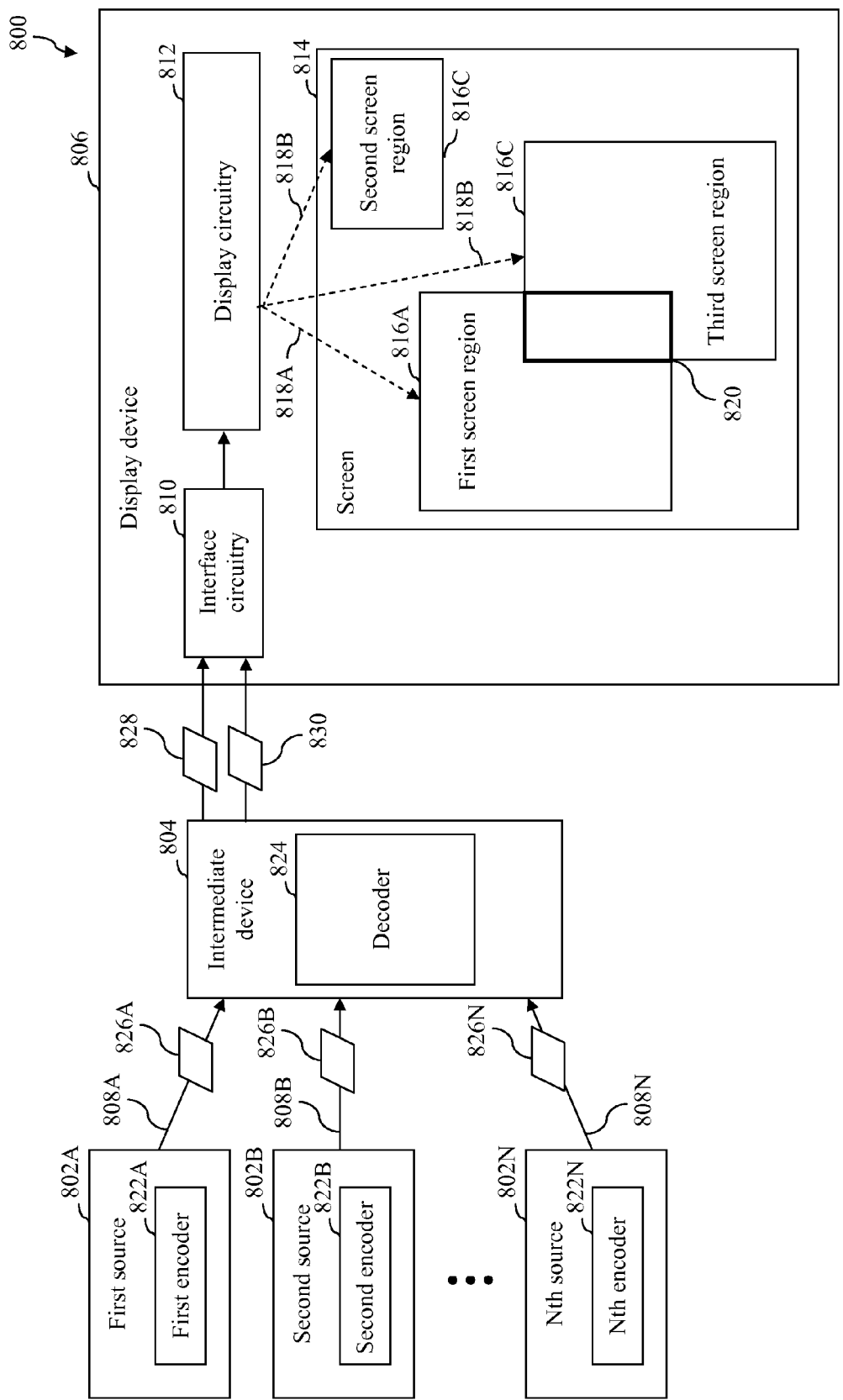

It will be recognized that an intermediate device may decode frame sequences that are received from any number of sources. For example, FIG. 8 shows a block diagram of another exemplary display system 800, according to an embodiment. As shown in FIG. 8, system 800 includes a plurality of sources 802A-802N, an intermediate device 804, and a display device 806. Sources 802A-802N include respective encoders 822A-822N. Encoders 822A-822N encode frames of respective frame sequences 826A-826N that include respective portions of video data 828. In particular, encoders 822A-822N format frames of the respective frame sequences 826A-826N to indicate screen configurations and screen regions with which the video data that are included in the respective frame sequences 826A-826N are associated.

For example, encoder 822A may format frame(s) of frame sequence 826A that includes first video data and second video data to indicate that the first video data is to be displayed in a first region 816A of screen 814 using a first screen configuration and that the second video data is to be displayed in a second region 816B of screen 814 using a second screen configuration. Encoder 822B may format frame(s) of frame sequence 826B that includes third video data to indicate that the third video data is to be displayed in a third region 816C of screen 814 using a third screen configuration, and so on.

Intermediate device 804 decodes the frames of the frame sequences 826A-826N that include the respective portions of the video data 828 upon receipt thereof from source 802. Intermediate device 804 determines the screen configuration and screen region with which each of the differing video data from among the frame sequences 826A-826N is associated based on the format of the frames. Intermediate device 804 provides the video data 828 to display device 806, along with indicators 830 that specify the screen configurations and screen regions that are associated with the respective video data 828. In some embodiments, intermediate device 804 is included in display device 806.

Display device 806 provides the video content that corresponds to the video data 828 based on the indicators 830 that are received from intermediate device 804. Display device 806 includes interface circuitry 810, display circuitry 812, and a screen 814. Interface circuitry 810 provides the video data 828 and the indicators 830 that are received from intermediate device 804 to display circuitry 812 for further processing. The video data 828 is described below as including first video data, second video data, and third video data for illustrative purposes and is not intended to be limiting.

Display circuitry 812 directs display of the video content 828 among regions of screen 814 based on the indicators 830. For example, as shown in FIG. 8, display circuitry 812 directs display of first video content that corresponds to the first video data in a first screen region 816A of screen 814, as indicated by arrow 818A, based on at least one of the indicators 830 specifying that the first video content is to be displayed in first screen region 816A. Display circuitry 812 further directs display of second video content that corresponds to the second video data in a second screen region 816B of screen 814, as indicated by arrow 818B, based on at least one of the indicators 830 specifying that the second video content is to be displayed in second screen region 816B. Display circuitry 812 further directs display of third video content that corresponds to the third video data in a third screen region 816C of screen 814, as indicated by arrow 818C, based on at least one of the indicators 830 specifying that the third video content is to be displayed in third screen region 816C.

Any of the first video content, the second video content, and/or the third video content may be related or unrelated. Moreover, any of the first video content, the second video content, and/or the third video content may be two-dimensional content or three-dimensional content.

Screen 814 displays the video content among screen regions 816A, 816B, and 816C as directed by display circuitry 812. Screen 814 is capable of simultaneously supporting multiple screen configurations. Accordingly, screen 814 is capable of simultaneously displaying video content that corresponds to two-dimensional video data and other video content that corresponds to three-dimensional video data. Screen 814 is also capable of simultaneously displaying video content that corresponds to first three-dimensional video data that represents a first number of perspectives and other video content that corresponds to second three-dimensional video data that represents a second number of perspectives that is different from the first number.

As shown in FIG. 8, screen 814 displays the first video content in first screen region 816A, the second video content in second screen region 816B, and the third video content in third screen region 816C. First screen region 816A and third screen region 816C are shown in FIG. 8 to overlap in area of overlap 820 for illustrative purposes and are not intended to be limiting. Second screen region 816B is shown to not overlap with first screen region 816A or third screen region 816C for illustrative purposes. It will be recognized that any of screen regions 816A, 816B, and/or 816C may partially overlap, fully overlap, not overlap, be configured such that one or more screen region 816A, 816B, and/or 816C are within one or more other screen regions 816A, 816B, and/or 816C, etc. Moreover, screen regions 816A, 816B, and 816C may be any suitable shapes. Furthermore, screen 814 may be any suitable type of screen.

Each of sources 802A-802N may be a remote source or a local source. Exemplary implementations of a set top box that supports processing of mixed 2D/3D video data from both remote and local sources is provided in commonly-owned, co-pending U.S. patent application Ser. No. 12/982,062 filed on Dec. 30, 2010, titled "Set-Top Box Circuitry Supporting 2D and 3D Content Reductions to Accommodate Viewing Environment Constraints," the entirety of which is incorporated by reference herein.

The exemplary systems (e.g., systems 100 and 800) described herein may include any number of intermediate devices. Such intermediate devices are capable of formatting and delivering video data that corresponds to various regions of a screen (i.e., regional data) separately. Such intermediate devices are also capable of combining regional data and then formatting the combined data for delivery. For example, FIG. 9 shows a block diagram of another exemplary display system 900, which includes multiple intermediate devices, according to an embodiment.

Figure 9:
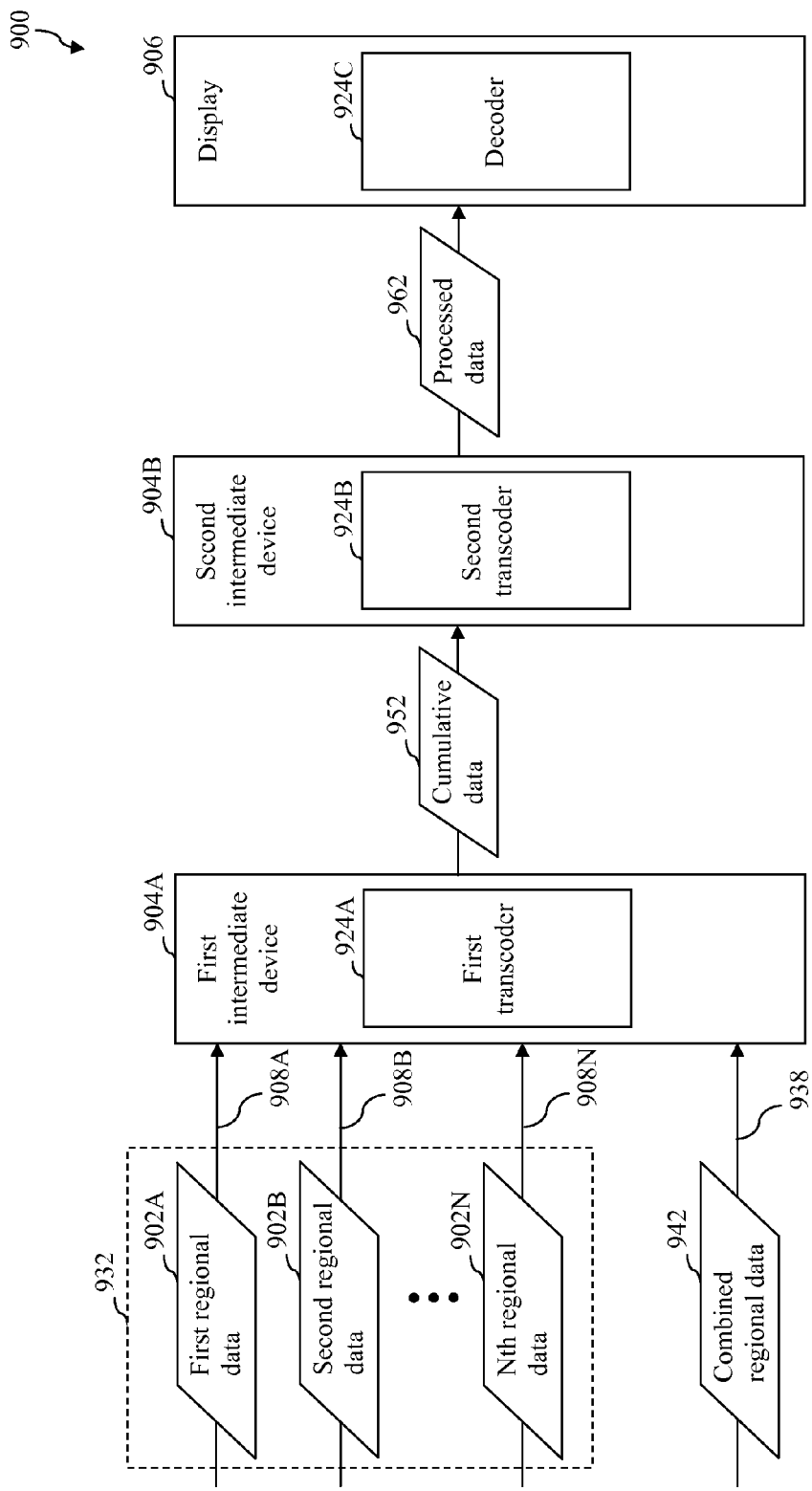

As shown in FIG. 9, system 900 includes a first intermediate device 904A, a second intermediate device 904B, and a display 906. First intermediate device 904A receives both non-combined regional data 932 and combined regional data 942 in accordance with a first communication standard. The non-combined regional data 932 includes first regional data 902A, second regional data 902B, . . . , and Nth regional data 902N, where N may be any positive integer. Each of the regional data 902A-902N is formatted separately from other regional data. The combined regional data 942 is a formatted combination of multiple regional data. Each of the regional data 902A-902N has a first format that is defined by a first format standard. The combined regional data 942 has a second format that is defined by a second format standard.

First intermediate device 904A includes a first transcoder 924A. First transcoder 924A combines the regional data 902A-902N and the combined regional data 942 in accordance with the second format standard to provide cumulative data 952. Cumulative data 952 is a formatted combination of the regional data 902A-902N and the multiple regional data from combined regional data 942. First intermediate device 904A delivers the cumulative data 952 to second intermediate device 904B in accordance with a second communication standard.

Second intermediate device 904B is shown to include a second transcoder 924B. In a first example, second transcoder 924B may re-format the cumulative data 952 to have a third format that is defined by a third format standard. In accordance with this example, second intermediate device 904B may deliver the re-formatted cumulative data as processed data 962 to display 906 in accordance with a third communication standard. In a second example, second intermediate device 904B may not re-format the cumulative data 952. In accordance with this example, second intermediate device 904B may deliver the non-re-formatted cumulative data 952 as the processed data 962 to display 906 in accordance with the third communication standard. In further accordance with this example, second intermediate device 904B need not necessarily include second transcoder 924B.

Display 906 is shown to include a decoder 924C. In accordance with the first example above in which second transcoder 924 re-formats the cumulative data 952 to have the third format, decoder 924C determines the screen configuration and/or screen region with which each regional data that is included in the processed data 962 is associated based on the third format. In accordance with the second example above in which second transcoder 924 does not re-format the cumulative data 952 from the second format, decoder 924C determines the screen configuration and/or screen region with which each regional data that is included in the processed data 962 is associated based on the second format. Display 906 directs display of video contents that correspond to the respective regional data that are included in the processed data 962 among regions of a screen based on the determined screen configurations and/or screen regions.

Formatting techniques described herein may reduce an amount of bandwidth that is consumed with respect to delivery of video content. For example, assume that various regional data correspond to respective regions of a screen that overlap in areas of overlap, as described above with reference to FIGS. 1 and 8. When such regional data are combined, the combined data may include multiple data portions for each of the areas of overlap, such that each data portion is included in a respective one of the various regional data. In some embodiments, a source or intermediate device that provides the combined data removes one or more of the multiple data portions that correspond to an area of overlap so that the combined data is reconfigured to include a single data portion that corresponds to the area of overlap. It will be recognized that such combined data may be reconfigured as described above at any node in its delivery toward a display. Moreover, such reconfiguring of the combined data may be performed in any environment, such as an HDMI environment.

In another example, assume that a communication pathway supports an overall maximum bandwidth corresponding to 3D4 HD. In such environment, an attempt to send video data corresponding to full-screen 3D4 HD movie content along with media data that represents a 2D interactive interface element, for example, may not be supported because of the bandwidth limitation. Similarly, video data corresponding to 3D2 HD full-screen content plus other video data that corresponds to regional 3D4 HD content may or may not be supported depending on how big the region happens to be. Lastly, 3D2 full-screen data that is sent three times in the form of three full-screen 3D2 movies which the viewer decides to regionalize in some manner may not be supported.

In yet another example, a source or intermediate device sends three or four sources of media content of various 2D/3D configurations, some for full-screen HD and others for lesser full-screen or regional presentation. In accordance with this example, the viewer configures the regions and overlaps via a remote control live or via setup. A display may send the configuration information upstream to an intermediate device or a source of the video data to assist in an overall construction of the content for final delivery to the display.

Figure 10:
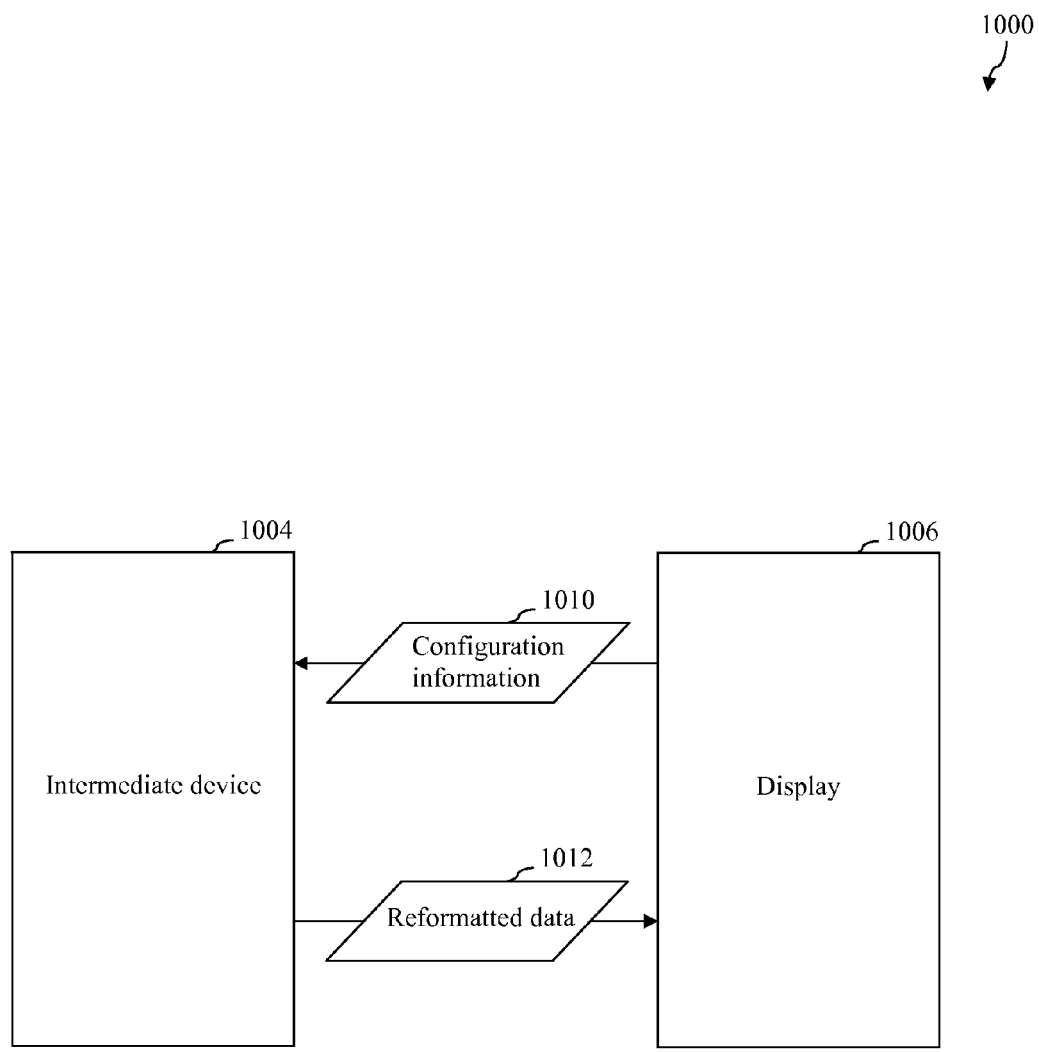
FIG. 10 is a block diagram of a system that is capable of reformatting media data in accordance with an embodiment.

For example, FIG. 10 is a block diagram of a system that is capable of reformatting media data in accordance with an embodiment. As shown in FIG. 10, system 1000 includes an intermediate device 1004 and a display 1006. Display 1006 provides configuration information 1010 to intermediate device. The configuration information 1010 includes information regarding one or more limitations of the capabilities of display 1006 and/or viewer-provided information regarding display preferences of the viewer. Examples of a limitation of the capabilities of display 1006 include but are not limited to a limitation regarding a bandwidth that is available for delivery of the various video data and a limitation on a number of perspectives that may be represented by any one or more of the various video data. It will be recognized that some or all of the configuration information 1010 may be provided by the viewer via a user interface device (e.g., a remote control) that is associated with display 1006 or intermediate device 1004.

Intermediate device 1004 reformats the various video data based on the configuration information 1010. For example, intermediate device 1004 may remove one or more of multiple data portions that correspond to an area of overlap so that a single data portion corresponds to the area of overlap. In another example, intermediate device 1004 may reduce resolution of any one or more of the various video data. In accordance with this example, intermediate device 1004 may reduce resolution of video data based on a reduction in a size of a screen region in which video data is to be displayed. In yet another example, intermediate device 1004 may reduce a number of perspectives that are represented by any one or more of the various video data. In accordance with this example, intermediate device 1004 may reformat video data from being 3D16 data to 3D2 data, from 3D8 data to 3D4 data, from 3D4 data to 3D2 data, from 3D2 data to 2D data, and so on. Display 1006 displays video content that corresponds to the reformatted data 1012.

In one example, assume that interface device 1004 reformats the video data to take into consideration that display 1006 is capable of supporting full-screen 3D4 data. If the reformatting involves removing overlapping data, it can be appreciated that combining any number of overlapping 3D4 portions will not exceed the supported bandwidth, so long as overlapping data is removed and a number of perspectives that are represented by the reformatted data 1012 is reduced to if necessary. On the other hand, if no removal of overlapping data occurs, intermediate device 1004 may remove overlapping data and/or reduce a number of perspectives that are represented by the reformatted data 1012 more often or more aggressively so as not to exceed the overall bandwidth limitations associated with the downstream link toward the display.

It will be recognized that limitations of the capabilities of display 1006 (e.g., bandwidth capability) may change over time as when other communications flow in competition (network communication flow). Accordingly, intermediate device 1004 or any other node involved in the process may remove overlapping data, reduce resolution, and/or reduce a number of perspectives represented by the reformatted data 1012 more or less aggressively to meet the current conditions. It will be recognized that intermediate device 1004 need not perform the reformatting of the video data. For instance, intermediate device 1004 may forward the configuration information 1010 or information regarding the configuration information 1010 to another intermediate device or a source of the video data for reformatting of the video data in accordance with the configuration information 1010.

Figure 11:
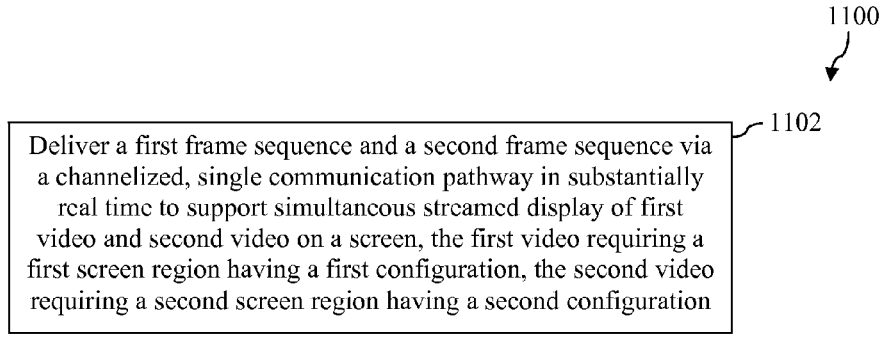
FIG. 11 shows a flowchart of an exemplary method for delivering frame sequences, according to an embodiment.
Figure 12:
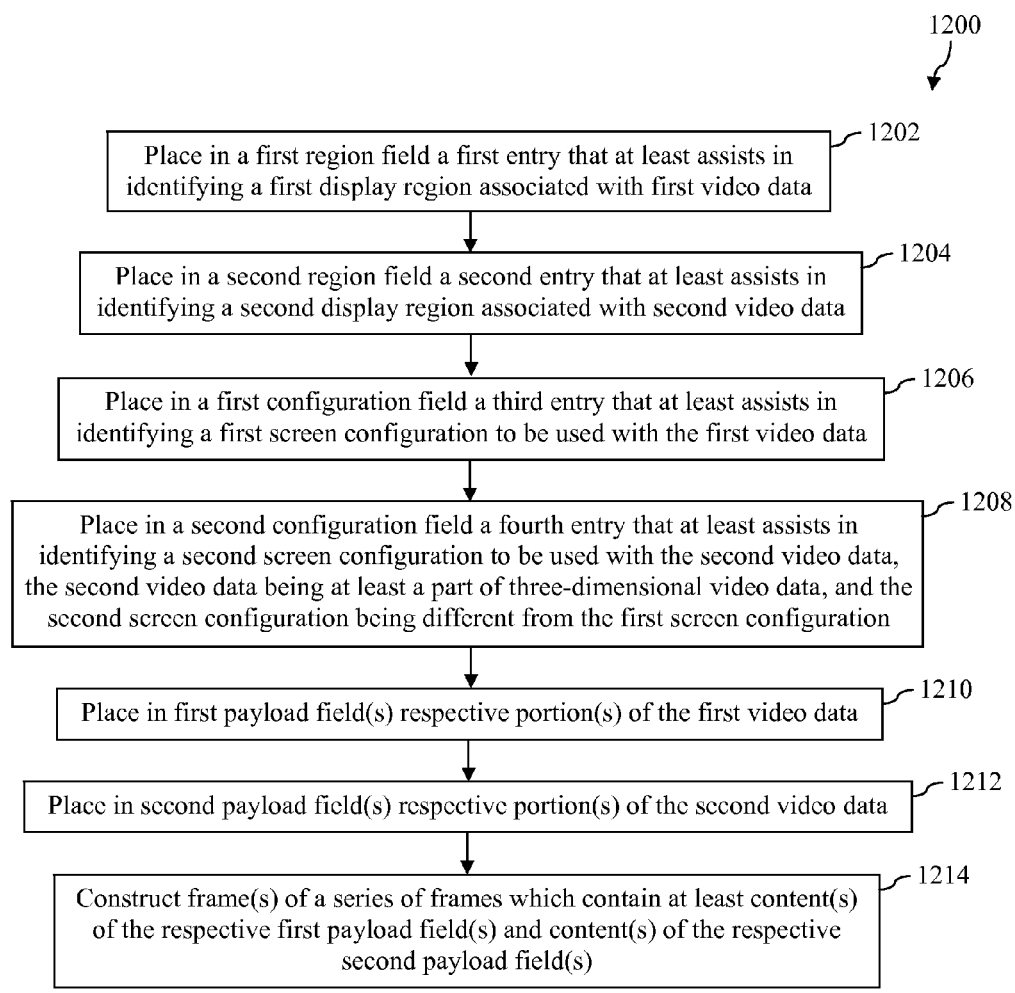
FIGS. 12 and 14 show flowcharts of exemplary methods for supporting formatting of video data for delivery in a series of frames, according to embodiments.
Figure 14:
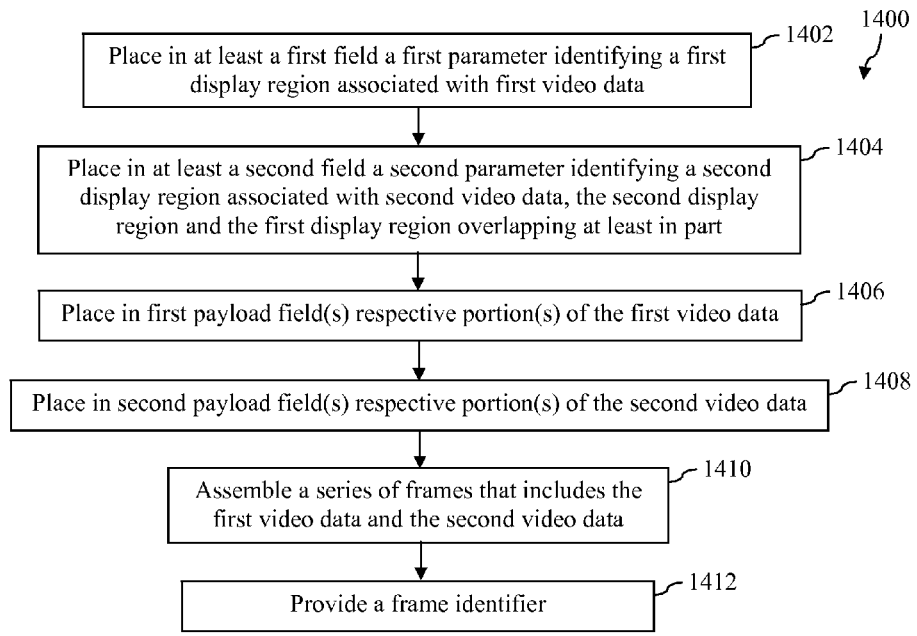

Video data may be formatted and/or delivered in a variety of ways according to embodiments. For instance, FIG. 11 shows a flowchart 1100 of an exemplary method for delivering frame sequences, according to an embodiment. FIGS. 12 and 14 show flowcharts 1200 and 1400 of exemplary methods for supporting formatting of video data for delivery in a series of frames, according to embodiments. Flowcharts 1100, 1200, and 1400 may be performed by source 102 or any of sources 802A-802N shown in respective FIG. 1 or 8, for example. However the methods of flowcharts 1100, 1200, and 1400 are not limited to those embodiments. Further structural and operational embodiments will be apparent to persons skilled in the relevant art(s) based on the discussion regarding flowcharts 1100, 1200, and 1400. Flowcharts 1100, 1200, and 1400 are described as follows.

Flowchart 1100 includes step 1102. In step 1102, a first frame sequence and a second frame sequence are delivered via a channelized, single communication pathway (e.g., pathway 108 of FIG. 1 or any one of pathways 808A-808N of FIG. 8) in substantially real time to support simultaneous streamed display of first video and second video on a screen (e.g., screen 114 or 814). A frame sequence is said to be delivered in substantially real time when the frame sequence is delivered substantially at the same time as the frame sequence is generated (e.g., immediately after the frame sequence is generated).

The first video requires a first screen region (e.g., first screen region 116A or 816A) having a first configuration. The second video requires a second screen region (e.g., second screen region 116B or 816B) having a second configuration. The first frame sequence relates to the first video and has first field content that at least assists in identifying the first configuration. The second frame sequence relates to the second video and has second field content that at least assists in identifying the second configuration.

The first configuration and the second configuration may be the same or different. For example, the first and second configurations may be two-dimensional configurations. In another example, the first and second configurations may be three-dimensional configurations that include a common number of perspectives. In yet another example, the first configuration may be a two-dimensional configuration and the second configuration may be a three-dimensional configuration, or vice versa. In still another example, the first configuration may be a three-dimensional configuration that includes a first number of perspectives, and the second configuration may be another three-dimensional configuration that includes a second number of perspectives that is different from the first number of perspectives.

Figure 13:
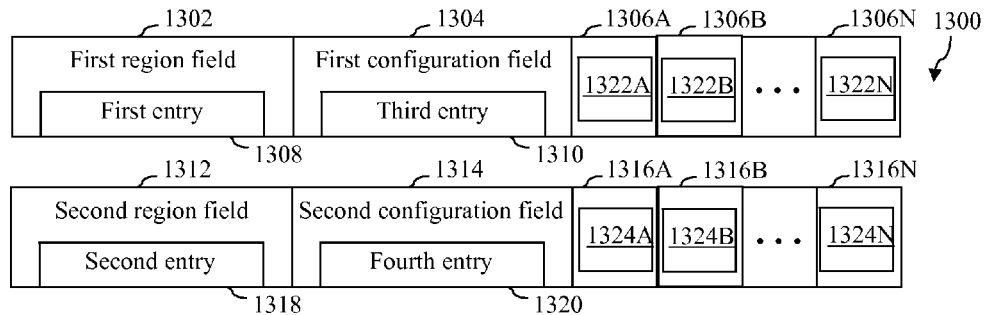
FIGS. 13 and 15 show exemplary frame formats, according to embodiments.

Flowchart 1200 will be described with continued reference to exemplary frame format 1300 shown in FIG. 13. It will be recognized that frame format 1300 is merely one exemplary frame format and is not intended to be limiting.

Flowchart 1200 begins with step 1202. In step 1202, a first entry is placed in a first region field. The first entry at least assists in identifying a first display region associated with first video data. For example, the first entry may specify the first display region. In another example, the first entry may include information that corresponds to the first display region (e.g., a location in storage at which the identity of the first display region is stored). As shown in FIG. 13, first region field 1302 includes first entry 1308.

At step 1204, a second entry is placed in a second region field. The second entry at least assists in identifying a second display region associated with second video data. As shown in FIG. 13, second region field 1312 includes second entry 1318.

At step 1206, a third entry is placed in a first configuration field. The third entry at least assists in identifying a first screen configuration to be used with the first video data. The first video data may be two-dimensional data (or a part thereof) or three-dimensional data (or a part thereof). As shown in FIG. 13, first configuration field 1304 includes third entry 1310.

At step 1208, a fourth entry is placed in a second configuration field. The fourth entry at least assists in identifying a second screen configuration to be used with the second video data. The second video data is at least a part of three-dimensional video data. The second screen configuration is different from the first screen configuration. As shown in FIG. 13, second configuration field 1314 includes fourth entry 1320.

At step 1210, portion(s) of the first video data are placed in respective first payload field(s). As shown in FIG. 13, portions 1322A-1322N of first video data are included in respective first payload fields 1306A-1306N. Multiple first payload fields are shown in FIG. 13 for illustrative purposes and are not intended to be limiting. It will be recognized that frame format 1300 may include a single first payload field that includes a single portion of the first video data.

At step 1212, portion(s) of the second video data are placed in respective second payload field(s). As shown in FIG. 13, portions 1324A-1324N of second video data are included in respective second payload fields 1316A-1316N. Multiple second payload fields are shown in FIG. 13 for illustrative purposes and are not intended to be limiting. It will be recognized that frame format 1300 may include a single second payload field that includes a single portion of the second video data.

At step 1214, frame(s) of a series of frames are constructed. The frame(s) contain at least content(s) of the respective first payload field(s) and content(s) of the respective second payload field(s). For example, the frame(s) may include at least the portions 1322A-1322N of the first video data, which are included in the first payload fields 1306A-1306N, and the portions 1324A-1324N of the second video data, which are included in the second payload fields 1316A-1316N. In one variant, multiple instances of the first, second, third, and fourth entries are placed into frame(s) of the series of frames. For example, an instance of the first and third entries may be placed into the frame(s) for each portion (or subset of the portions) of the first video data. In another example, an instance of the second and fourth entries may be placed into the frame(s) for each portion (or subset of the portions) of the second video data.

In some example embodiments, one or more steps 1202, 1204, 1206, 1208, 1210, 1212, and/or 1214 of flowchart 1200 may not be performed. Moreover, steps in addition to or in lieu of steps 1202, 1204, 1206, 1208, 1210, 1212, and/or 1214 may be performed.

Figure 15:
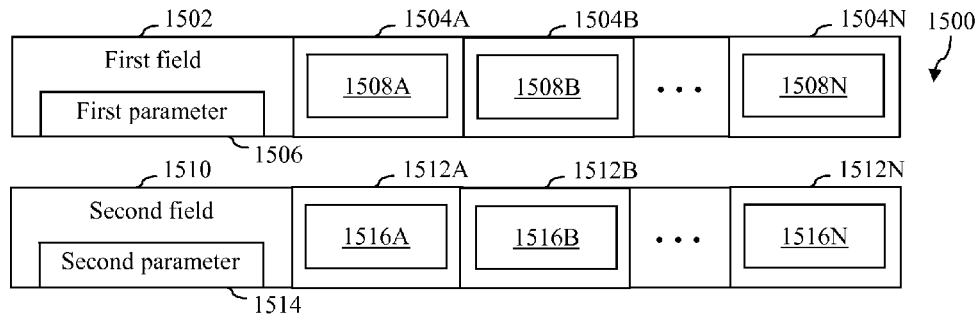

Flowchart 1400 will be described with continued reference to exemplary frame format 1500 shown in FIG. 15. It will be recognized that frame format 1500 is merely one exemplary frame format and is not intended to be limiting.

Flowchart 1400 begins with step 1402. In step 1402, a first parameter is placed in at least a first field. The first parameter identifies a first display region associated with first video data. As shown in FIG. 15, first field 1502 includes first parameter 1506.

At step 1404, a second parameter is placed in at least a second field. The second parameter identifies a second display region associated with second video data. The second display region and the first display region overlap at least in part. For example, the second display region and the first display region may overlap at least in part on a single screen. As shown in FIG. 15, second field 1510 includes second parameter 1514.

In one variant, the first display region and the second display region fully overlap. In another variant, the first video data corresponds to first video capture at a first perspective, and the second video data corresponds to second video capture at a second perspective. In accordance with this variant, together the first video data and the second video data are intended for a three-dimensional visual presentation in the overlapping region.

At step 1406, portion(s) of the first video data are placed in respective first payload field(s). As shown in FIG. 15, portions 1508A-1508N of first video data are included in respective first payload fields 1504A-1504N. Multiple first payload fields are shown in FIG. 15 for illustrative purposes and are not intended to be limiting. It will be recognized that frame format 1500 may include a single first payload field that includes a single portion of the first video data.

At step 1408, portion(s) of the second video data are placed in respective second payload field(s). As shown in FIG. 15, portions 1516A-1516N of second video data are included in respective second payload fields 1512A-1512N. Multiple second payload fields are shown in FIG. 15 for illustrative purposes and are not intended to be limiting. It will be recognized that frame format 1500 may include a single second payload field that includes a single portion of the second video data.

At step 1410, a series of frames is assembled. The series of frames includes the first video data and the second video data. For example, each frame in the series of frames may include a respective portion of the first video data or the second video data.

At step 1412, a frame identifier is provided. For example, the frame identifier may specify a beginning and/or an end of one or more frames that are included in the series of frames. In another example, the frame identifier may specify portion(s) of the first and second video data that correspond to respective frame(s) of the series of frames.

In some example embodiments, one or more steps 1402, 1404, 1406, 1408, 1410, and/or 1412 of flowchart 1400 may not be performed. Moreover, steps in addition to or in lieu of steps 1402, 1404, 1406, 1408, 1410, and/or 1412 may be performed.

Figure 16:
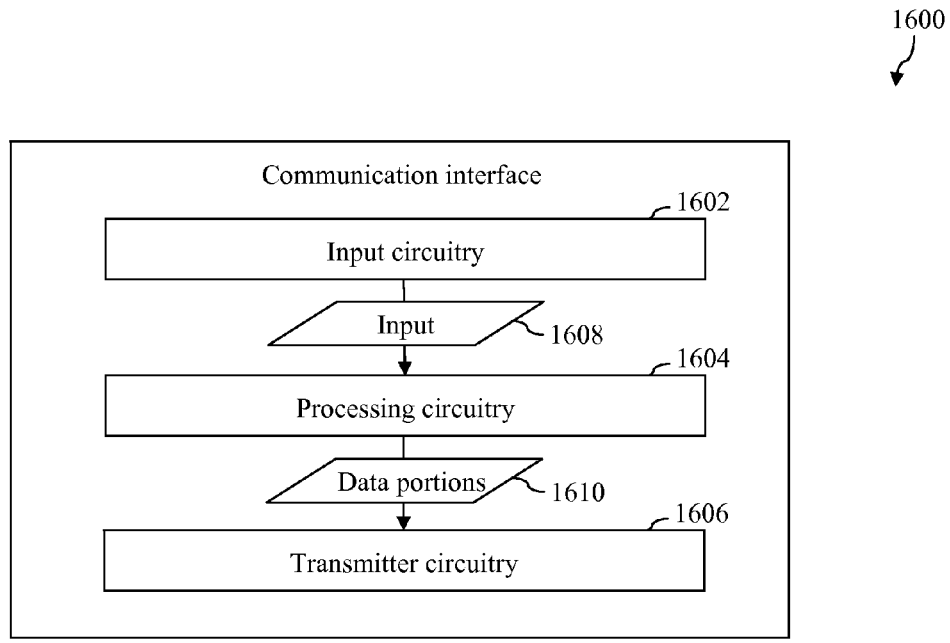
FIG. 16 shows a block diagram of an exemplary communication interface, according to an embodiment.

FIG. 16 shows a block diagram of an exemplary communication interface 1600, according to an embodiment. Communication interface 1600 may be implemented in encoder 122, decoder 124, or display circuitry 112 of FIG. 1, any of the encoders 822A-822N, decoder 824, or display circuitry 812 of FIG. 8, or first transcoder 924A, second transcoder 924B, or decoder 904C of FIG. 9, though the embodiments are not limited in this respect. Communication interface 1600 supports delivery of a sequence of frames that define a simultaneous visual presentation on a screen of a first type and a second type of video content. The first type of the video content corresponds to first video data that requires a first screen configuration in a first region of the screen. The second type of the video content corresponds to second video data that requires a second screen configuration in a second region of the screen.

Communication interface 1600 includes input circuitry 1602, processing circuitry 1604, and transmitter circuitry 1606. Input circuitry 1602 delivers input 1608 to processing circuitry 1604. The input 1608 is at least related to the first video data and the second video data. The first video data requires the first screen configuration, which is different from the second screen configuration required by the second video data. The first screen configuration may be a two-dimensional configuration or a three-dimensional configuration. The second screen configuration is a three-dimensional configuration.

Processing circuitry 1604 generates output data that corresponds to other data that is within fields of each frame of the sequence of frames.

Transmitter circuitry 1606 receives at least portions 1610 (a.k.a. data portions) of the output data from processing circuitry 1604. Transmitter circuitry 1606 manages transmission of the data portions 1610.

In a variant, the input 1608 includes the sequence of frames that define the simultaneous visual presentation on the screen of the first type and the second type of video content. In another variant, processing circuitry 1604 produces the sequence of frames from the input 1608. In yet another variant, at least a first frame of the sequence of frames contains at least a portion of the first video data and at least a portion of the second video data.

Figure 17:
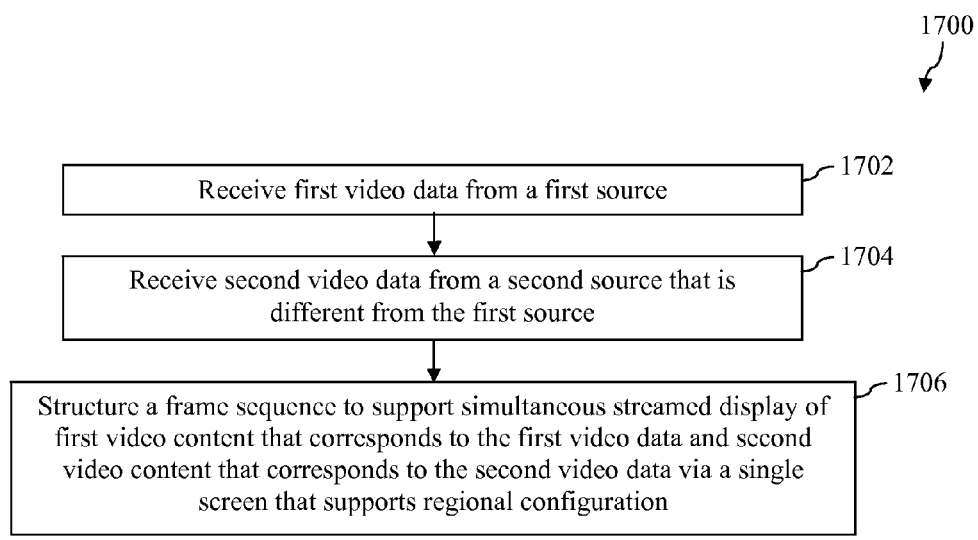
FIG. 17 shows a flowchart of an exemplary method for structuring a frame sequence, according to an embodiment.

A frame sequence may be structured in a variety of ways according to embodiments. For instance, FIG. 17 shows a flowchart of an exemplary method for structuring a frame sequence, according to an embodiment. Flowchart 1700 may be performed by intermediate device 804 shown in FIG. 8, for example. However the method of flowchart 1700 is not limited to that embodiment. Further structural and operational embodiments will be apparent to persons skilled in the relevant art(s) based on the discussion regarding flowchart 1700. Flowchart 1700 is described as follows.

Flowchart 1700 begins with step 1702. In step 1702, first video data is received from a first source. The first video data may be associated with a first screen configuration and/or a first screen region, though the scope of the embodiments is not limited in this respect.

At step 1704, second video data is received from a second source that is different from the first source. The second video data may be associated with a second screen configuration that is different from or the same as the first screen region. The second video data may be associated with a second screen region that is different from or the same as the first screen region. It will be recognized, however, that the second video data need not necessarily be associated with a second screen configuration and/or a second screen region.

At step 1706, a frame sequence is structured to support simultaneous streamed display of first video content and second video content via a single screen that supports regional configuration. The first video content corresponds to the first video data. The second video content corresponds to the second video data. For example, fields may be incorporated into one or more frames of the frame sequence to indicate screen configurations and/or screen regions that correspond to the respective first and second video data. In accordance with this example, the frame sequence may be structured to support simultaneous streamed display of the first video content at a first region of the screen and the second video content at a second region of the screen that is different from the first region.

In one variant, the first video data is two-dimensional video data, and the second video data is three-dimensional video data, or vice versa. In another variant, the first video data is first three-dimensional video data, and the second video data is second three-dimensional video data.

In some example embodiments, one or more steps 1702, 1704, and/or 1706 of flowchart 1700 may not be performed. Moreover, steps in addition to or in lieu of steps 1702, 1704, and/or 1706 may be performed.

B. Exemplary Display Device Screen Embodiments

Embodiments described herein for frame formatting supporting mixed two and three dimensional video data communication may be implemented with respect to various types of display devices. For example, as described above, some display screens are configured for displaying two-dimensional content, although they may display two-dimensional images that may be combined to form three-dimensional images by special glasses worn by users. Some other types of display screens are capable of display two-dimensional content and three-dimensional content without the users having to wear special glasses using techniques of autostereoscopy.

As described above, display devices, such as display device 106 or 806 or display 906 or 1006, may be implemented in various ways. For instance, display device 106 or 806 or display 906 or 1006 may be a television display (e.g., an LCD (liquid crystal display) television, a plasma television, etc.), a computer monitor, or any other type of display device. Display device 106 or 806 or display 906 or 1006 may include any suitable type or combination of light and image generating devices, including an LCD screen, a plasma screen, an LED (light emitting device) screen (e.g., an OLED (organic LED) screen), etc. Furthermore, display device 106 or 806 or display 906 or 1006 may include any suitable type of light filtering device, such as a parallax barrier (e.g., an LCD filter, a mechanical filter (e.g., that incorporates individually controllable shutters), etc.) and/or a lenticular lens, and may be configured in any manner, including as a thin-film device (e.g., formed of a stack of thin film layers), etc. Furthermore, display device 106 or 806 or display 906 or 1006 may include any suitable light emitting device as backlighting, including a panel of LEDs or other light emitting elements.

Figure 18:
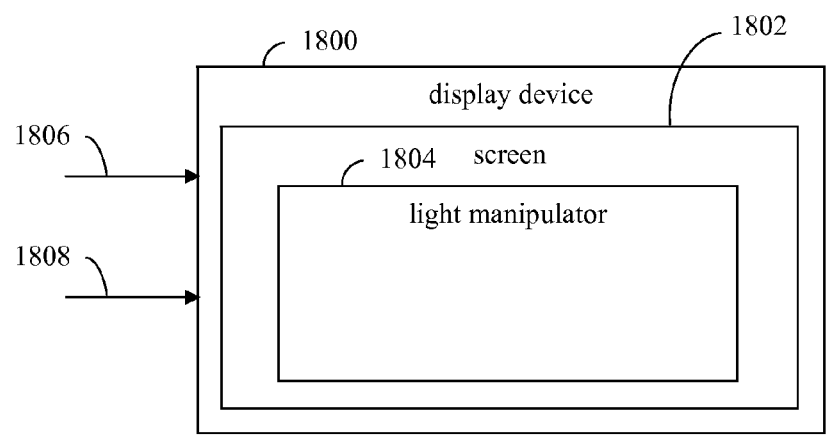
FIG. 18 shows a block diagram of an exemplary display device, according to an embodiment.

For instance, FIG. 18 shows a block diagram of a display device 1800, according to an exemplary embodiment. As shown in FIG. 18, display device 1800 includes a screen 1802. Display device 1800 is an example of display device 106 or 806 or display 906 or 1006, and screen 1802 is an example of screen 114 or 814, all of which are described above (e.g., with respect to FIGS. 1, 8, 9, and 10). Device 1800 receives one or more control signals 1806 that are configured to place screen 1802 in a desired display mode (e.g., either a two-dimensional display mode or a three-dimensional display mode). As shown in FIG. 18, screen 1802 includes a light manipulator 1804. Light manipulator 1804 is configured to manipulate light that passes through light manipulator 1804 to enable three-dimensional images to be delivered to users in a viewing space. For instance, control signal(s) 1806 may be configured to activate or deactivate light manipulator 1804 to place screen 1802 in a three-dimensional display mode or a two-dimensional display mode, respectively.

Examples of light manipulator 1804 include a parallax barrier and a lenticular lens. For instance, light manipulator 1804 may be a parallax barrier that has a layer of material with a series of precision slits. The parallax barrier is placed proximal to a light emitting pixel array so that a user's eyes each see a different set of pixels to create a sense of depth through parallax. In another embodiment, light manipulator 1804 may be a lenticular lens that includes an array of magnifying lenses configured so that when viewed from slightly different angles, different images are magnified. Such a lenticular lens may be used to deliver light from a different set of pixels of a pixel array to each of the user's eyes to create a sense of depth. Embodiments are applicable display devices that include such light manipulators, include other types of light manipulators, and that may include multiple light manipulators.

As shown in FIG. 18, display device 1800 receives a content signal 1808 (e.g., from intermediate device 104 of FIG. 1, intermediate device 804 of FIG. 8, second intermediate device 904B of FIG. 9, intermediate device 1004 of FIG. 10, communication interface 1600 of FIG. 16, or other electronic device). Content signal 1808 includes two-dimensional or three-dimensional content for display by screen 1802, depending on the particular display mode. In the embodiment of FIG. 18, light manipulator 1804 is physically fixed—is not adaptable. As such, when present, light manipulator 1804 (e.g., a fixed parallax barrier or a fixed lenticular lens) always delivers three-dimensional images of a particular type to a particular region in a viewing space. As such, light manipulator 1804 is not adaptable to deliver other types of three-dimensional images and/or to deliver two and/or three-dimensional images to multiple different regions of a viewing space.

Figure 19:
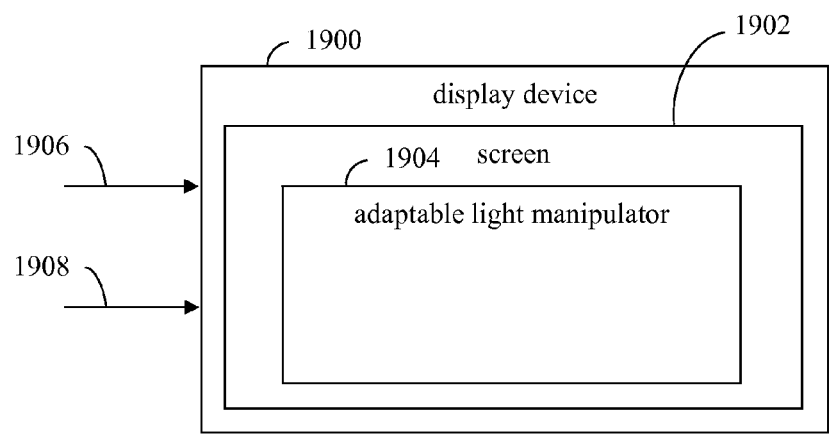
FIG. 19 shows a block diagram of an exemplary display device that is adaptable, according to an embodiment.

In contrast, FIG. 19 shows a block diagram of a display device 1900 that is adaptable, according to an exemplary embodiment. As shown in FIG. 19, display device 1900 includes a screen 1902. Display device 1900 is an example of display device 106 or 806 or display 906 or 1006, and screen 1902 is an example of screen 114 or 814, all of which are described above (e.g., with respect to respective FIGS. 1, 8, 9, and 10). Furthermore, as shown in FIG. 19, screen 1902 includes an adaptable light manipulator 1904. Adaptable light manipulator 1904 is configured to manipulate light that passes through adaptable light manipulator 1904 to enable three-dimensional images to be delivered to users in a viewing space. Furthermore, adaptable light manipulator 1904 is adaptable—is not physically fixed in configuration. As such, adaptable light manipulator 1904 is adaptable to deliver multiple different types of three-dimensional images and/or to deliver three-dimensional images to different/moving regions of a viewing space. Furthermore, in an embodiment, different regions of adaptable light manipulator 1904 may be adaptable such that multiple two-dimensional and/or three-dimensional images may be simultaneously delivered by screen 1902 to the viewing space.

Device 1900 receives one or more control signals 1906 that are configured to place screen 1902 in a desired display mode (e.g., either a two-dimensional display mode or a three-dimensional display mode), and/or to configure three-dimensional characteristics of any number and type as described above, such as configuring adaptable light manipulator 1904 to deliver different types of three-dimensional images, to deliver three-dimensional images to different/moving regions of a viewing space, and to deliver two-dimensional and/or three-dimensional images from any number of regions of screen 1902 to the viewing space.

As shown in FIG. 19 display device 1900 receives a content signal 1908 (e.g., from intermediate device 104 of FIG. 1, intermediate device 804 of FIG. 8, second intermediate device 904B of FIG. 9, intermediate device 1004, communication interface 1600 of FIG. 16, or other electronic device). Content signal 1908 includes two-dimensional and/or three-dimensional content for display by screen 1902, depending on the particular display mode and on the number of regions of screen 1902 that are delivering different two- or three-dimensional views to a viewing space.

Content signals 1808 and 1908 may include video content according to any suitable format. For example, content signals 1808 and 1908 may include video content delivered over an HDMI (High-Definition Multimedia Interface) interface, over a coaxial cable, as composite video, as S-Video, a VGA (video graphics array) interface, etc.

Figure 20:
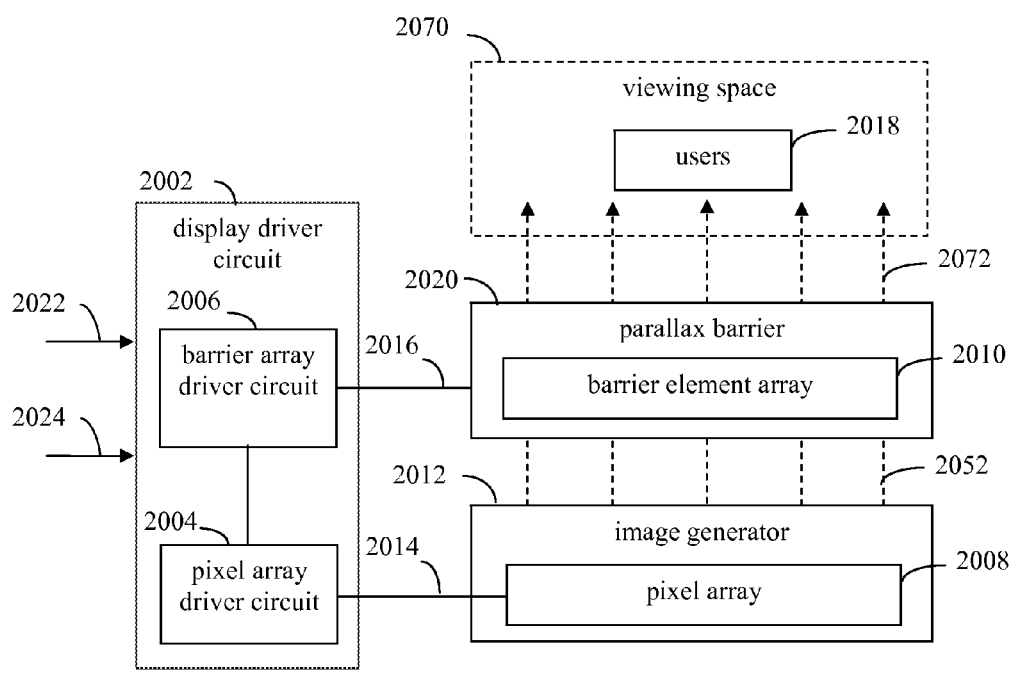
FIGS. 20 and 21 show block diagrams of examples of the display device of FIG. 19, according to embodiments.

Exemplary embodiments for display devices 1900 and 2000 of FIGS. 19 and 20 are described as follows for purposes of illustration.

1. Exemplary Embodiments Using Parallax Barriers

Display devices 1800 and 1900 may include parallax barriers as light manipulators 1804 and 1904, respectively. For instance, FIG. 20 shows a block diagram of a display system 2000, which is an example of display device 106, according to an embodiment. As shown in FIG. 20, system 2000 includes a display device driver circuit 2002, an image generator 2012, and parallax barrier 2020. As shown in FIG. 20, image generator 2012 includes a pixel array 2008, and parallax barrier 2020 includes a barrier element array 2010. Furthermore, as shown in FIG. 20, display driver circuit 2002 includes a pixel array driver circuit 2004 and a barrier array driver circuit 2006. These features of system 2000 are described as follows.

Pixel array 2008 includes a two-dimensional array of pixels (e.g., arranged in a grid or other distribution). Pixel array 2008 is a self-illuminating or light-generating pixel array such that the pixels of pixel array 2008 each emit light included in light 2052 emitted from image generator 2012. Each pixel may be a separately addressable light source (e.g., a pixel of a plasma display, an LCD display, an LED display such as an OLED display, or of other type of display). Each pixel of pixel array 2008 may be individually controllable to vary color and intensity. In an embodiment, each pixel of pixel array 2008 may include a plurality of sub-pixels that correspond to separate color channels, such as a trio of red, green, and blue sub-pixels included in each pixel.

Parallax barrier 2020 is positioned proximate to a surface of pixel array 2008. Barrier element array 2010 is a layer of parallax barrier 2020 that includes a plurality of barrier elements or blocking regions arranged in an array. Each barrier element of the array is configured to be selectively opaque or transparent. Combinations of barrier elements may be configured to be selectively opaque or transparent to enable various effects. For example, in one embodiment, each barrier element may have a round, square, or rectangular shape, and barrier element array 2010 may have any number of rows of barrier elements that extend a vertical length of barrier element array 2010. In another embodiment, each barrier element may have a "band" shape that extends a vertical length of barrier element array 2010, such that barrier element array 2010 includes a single horizontal row of barrier elements. Each barrier element may include one or more of such bands, and different regions of barrier element array may include barrier elements that include different numbers of such bands.

One advantage of such a configuration where barrier elements extend a vertical length of barrier element array 2010 is that such barrier elements do not need to have spacing between them because there is no need for drive signal routing in such space. For instance, in a two-dimensional LCD array configuration, such as TFT (thin film transistor) display, a transistor-plus-capacitor circuit is typically placed onsite at the corner of a single pixel in the array, and drive signals for such transistors are routed between the LCD pixels (row-column control, for example). In a pixel configuration for a parallax barrier, local transistor control may not be necessary because barrier elements may not need to be changing as rapidly as display pixels (e.g., pixels of pixel array 2008). For a single row of vertical bands of barrier elements, drive signals may be routed to the top and/or bottom of barrier elements. Because in such a configuration drive signal routing between rows is not needed, the vertical bands can be arranged side-by-side with little-to-no space in between. Thus, if the vertical bands are thin and oriented edge-to-edge, one band or multiple adjacent bands (e.g., five bands) may comprise a barrier element in a blocking state, followed by one band or multiple adjacent bands (e.g., two bands) that comprise a barrier element in a non-blocking state (a slit), and so on. In the example of five bands in a blocking state and two bands in a non-blocking state, the five bands may combine to offer a single black barrier element of approximately 2.5 times the width of a single transparent slit with no spaces therein.

It is noted that in some embodiments, barrier elements may be capable of being completely transparent or opaque, and in other embodiments, barrier elements may not be capable of being fully transparent or opaque. For instance, such barrier elements may be capable of being 95% transparent when considered to be "transparent" and may be capable of being 5% transparent when considered to be "opaque." "Transparent" and "opaque" as used herein are intended to encompass barrier elements being substantially transparent (e.g., greater than 75% transparent, including completely transparent) and substantially opaque (e.g., less than 25% transparent, including completely opaque), respectively.

Display driver circuit 2002 receives control signal 2022 and content signal 2024. As described below, content signal 2024 includes two-dimensional and/or three-dimensional content for display. Control signal 2022 may be control signal 1806 of FIG. 18 (for a non-adaptable parallax barrier 2020) or may be control signal 1906 of FIG. 19 (for an adaptable parallax barrier 2020). Control signal 2022 may be received from a display driver of an operating system, for example. Display driver circuit 2002 is configured to generate drive signals based on control signal 2022 and content signal 2024 to enable display system 2000 to display two-dimensional and three-dimensional images to users 2018 in viewing space 2070. For example, pixel array driver circuit 2004 is configured to generate a drive signal 2014 that is received by pixel array 2008 (e.g., based on content signal 2024 and/or control signal 2022). Drive signal 2014 may include one or more drive signals used to cause pixels of pixel array 2008 to emit light 2052 of particular desired colors and/or intensity. Barrier array driver circuit 2006 is configured to generate a drive signal 2016 that is received by barrier element array 2010 (e.g., based on control signal 2022). Drive signal 2016 may include one or more drive signals used to cause each of the barrier elements of barrier element array 2010 to be transparent or opaque. In this manner, barrier element array 2010 filters light 2052 to generate filtered light 2072 that includes one or more two-dimensional and/or three-dimensional images that may be viewed by users 2018 in viewing space 2070.

For example, drive signal 2014 may control sets of pixels of pixel array 2008 to each emit light representative of a respective image, to provide a plurality of images. Drive signal 2016 may control barrier elements of barrier element array 2010 to filter the light received from pixel array 2008 according to the provided images such that one or more of the images are received by users 2018 in two-dimensional form. For instance, drive signal 2016 may select one or more sets of barrier elements of barrier element array 2010 to be transparent, to transmit one or more corresponding two-dimensional images or views to users 2018. Furthermore, drive signal 2016 may control sections of barrier element array 2010 to include opaque and transparent barrier elements to filter the light received from pixel array 2008 so that one or more pairs of images or views provided by pixel array 2008 are each received by users 2018 as a corresponding three-dimensional image or view. For example, drive signal 2016 may select parallel strips of barrier elements of barrier element array 2010 to be transparent to form slits that enable three-dimensional images to be received by users 2018.

In embodiments, drive signal 2016 may be generated by barrier array driver circuit 2006 to configure one or more characteristics of barrier element array 2010. For example, drive signal 2016 may be generated to form any number of parallel strips of barrier elements of barrier element array 2010 to be transparent, to modify the number and/or spacing of parallel strips of barrier elements of barrier element array 2010 that are transparent, to select and/or modify a width and/or a length (in barrier elements) of one or more strips of barrier elements of barrier element array 2010 that are transparent or opaque, to select and/or modify an orientation of one or more strips of barrier elements of barrier element array 2010 that are transparent, to select one or more areas of barrier element array 2010 to include all transparent or all opaque barrier elements, etc.

Figure 21:
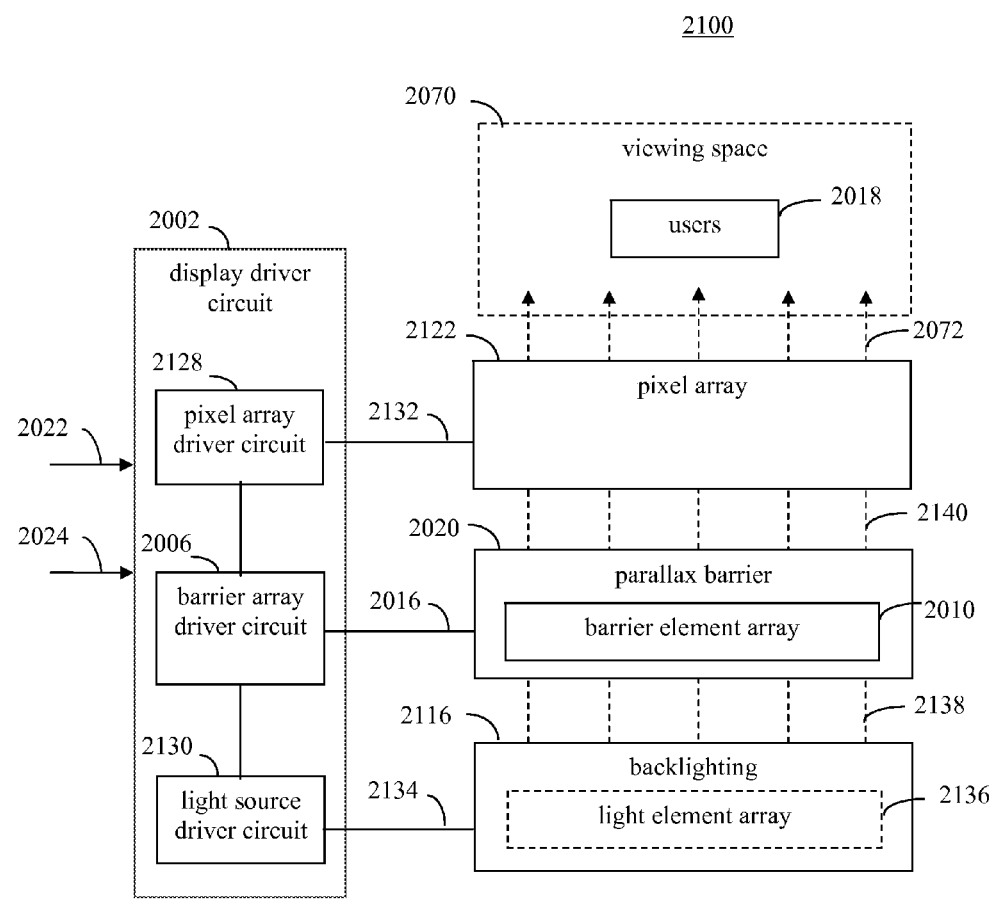

FIG. 21 shows a block diagram of a display system 2100, which is another example of display device 1900 of FIG. 19, according to an embodiment. As shown in FIG. 21, system 2100 includes display device driver circuit 2002, a pixel array 2122, parallax barrier 2020, and a backlighting 2116. Parallax barrier 2020 includes barrier element array 2010 and backlighting 2116 includes a light element array 2136. Furthermore, display driver circuit 2002 includes a pixel array driver circuit 2128, barrier array driver circuit 2006, and a light source driver circuit 2130. These features of system 2100 are described as follows.

Backlighting 2116 is a backlight panel that emits light 2138. Light element array 2136 (or "backlight array") of backlighting 2116 includes a two-dimensional array of light sources. Such light sources may be arranged, for example, in a rectangular grid. Each light source in light element array 2136 is individually addressable and controllable to select an amount of light emitted thereby. A single light source may comprise one or more light-emitting elements depending upon the implementation. In one embodiment, each light source in light element array 2136 comprises a single light-emitting diode (LED) although this example is not intended to be limiting.

Parallax barrier 2020 is positioned proximate to a surface of backlighting 2116 (e.g., a surface of the backlight panel). As described above, barrier element array 2010 is a layer of parallax barrier 2020 that includes a plurality of barrier elements or blocking regions arranged in an array. Each barrier element of the array is configured to be selectively opaque or transparent. Barrier element array 2010 filters light 2138 received from backlighting 2116 to generate filtered light 2140. Filtered light 2140 is configured to enable a two-dimensional image or a three-dimensional image (e.g., formed by a pair of two-dimensional images in filtered light 2072) to be formed based on images subsequently imposed on filtered light 2140 by pixel array 2122.

Similarly to pixel array 2008 of FIG. 20, pixel array 2122 of FIG. 21 includes a two-dimensional array of pixels (e.g., arranged in a grid or other distribution). However, pixel array 2122 is not self-illuminating, and instead is a light filter that imposes images (e.g., in the form of color, grayscale, etc.) on filtered light 2140 from parallax barrier 2020 to generate filtered light 2072 to include one or more images. Each pixel of pixel array 2122 may be a separately addressable filter (e.g., a pixel of a plasma display, an LCD display, an LED display, or of other type of display). Each pixel of pixel array 2122 may be individually controllable to vary the color imposed on the corresponding light passing through, and/or to vary the intensity of the passed light in filtered light 2072. In an embodiment, each pixel of pixel array 2122 may include a plurality of sub-pixels that correspond to separate color channels, such as a trio of red, green, and blue sub-pixels included in each pixel.

Display driver circuit 2002 of FIG. 21 is configured to generate drive signals based on control signal 2022 and/or content signal 2024 to enable display system 2100 to display two-dimensional and three-dimensional images to users 2018 in viewing space 2070. For example, light source driver circuit 2130 within display driver circuit 2002 controls the amount of light emitted by each light source in light element array 2136 by generating a drive signal 2134 that is received by light element array 2136 (based on content signal 2024 and/or control signal 2022). Drive signal 2134 may include one or more drive signals used to control the amount of light emitted by each light source in light element array 2136 to generate light 2138. As described above, barrier array driver circuit 2006 is configured to generate drive signal 2016 received by barrier element array 2010 (e.g., based on control signal 2022). Drive signal 2016 may include one or more drive signals used to cause each of the barrier elements of barrier element array 2010 to be transparent or opaque, to filter light 2138 to generate filtered light 2140. Pixel array driver circuit 2128 is configured to generate a drive signal 2132 that is received by pixel array 2122 (e.g., based on content signal 2024 and/or control signal 2022). Drive signal 2132 may include one or more drive signals used to cause pixels of pixel array 2122 to impose desired images (e.g., colors, grayscale, etc.) on filtered light 2140 as it passes through pixel array 2122. In this manner, pixel array 2122 generates filtered light 2072 that includes one or more two-dimensional and/or three-dimensional images that may be viewed by users 2018 in viewing space 2070.

For example, drive signal 2134 may control sets of light sources of light element array 2136 to emit light 2138. Drive signal 2016 may control barrier elements of barrier element array 2010 to filter light 2138 received from light element array 2136 to enable filtered light 2140 to enable two- and/or three-dimensionality. Drive signal 2132 may control sets of pixels of pixel array 2122 to filter filtered light 2140 according to respective images, to provide a plurality of images. For instance, drive signal 2016 may select one or more sets of the barrier elements of barrier element array 2010 to be transparent, to enable one or more corresponding two-dimensional images to be delivered to users 2018. Furthermore, drive signal 2016 may control sections of barrier element array 2010 to include opaque and transparent barrier elements to filter the light received from light element array 2136 so that one or more pairs of images provided by pixel array 2122 are each enabled to be received by users 2018 as a corresponding three-dimensional image. For example, drive signal 2016 may select parallel strips of barrier elements of barrier element array 2010 to be transparent to form slits that enable three-dimensional images to be received by users 2018.

Figure 22:
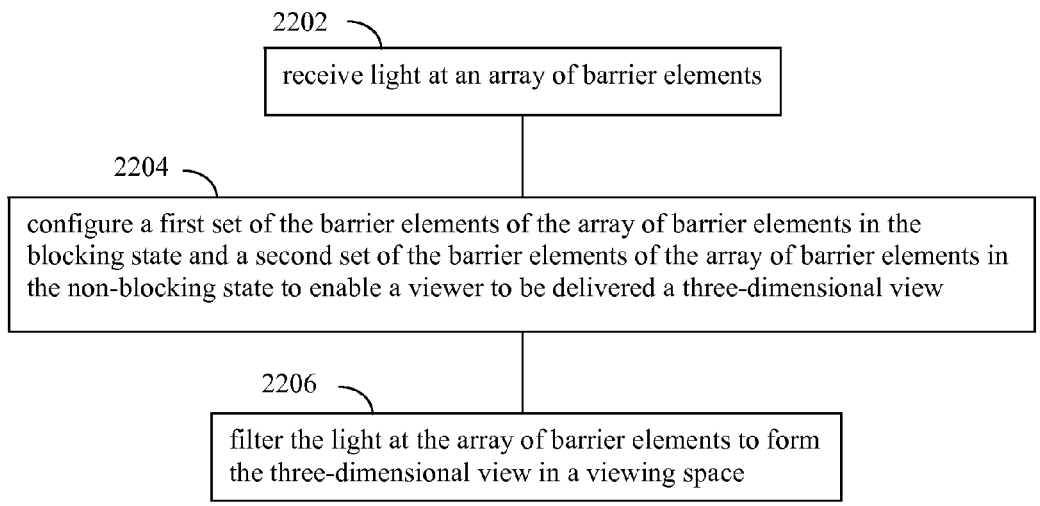
FIG. 22 shows a flowchart of an exemplary method for generating three-dimensional images, according to an embodiment.
Figure 23:
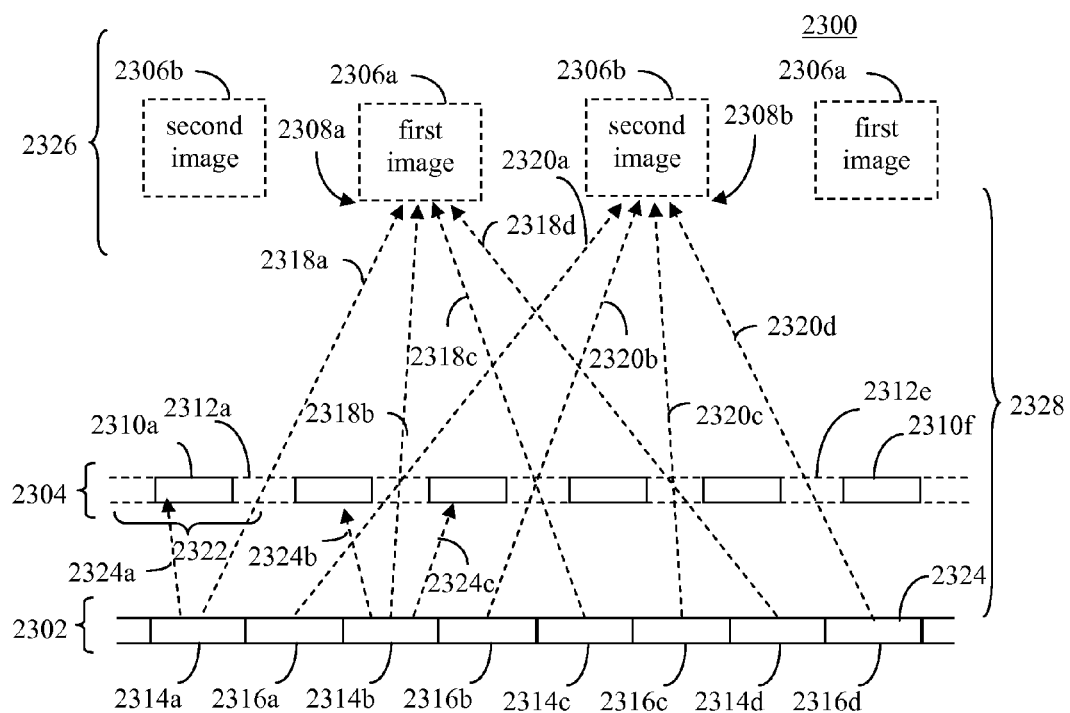
FIG. 23 shows a cross-sectional view of an example of a display system, according to an embodiment.

FIG. 22 shows a flowchart 2200 for generating images that are delivered to users in a viewing space, according to an exemplary embodiment. Flowchart 2200 may be performed by system 2000 in FIG. 20 or system 2100 of FIG. 21, for example. Flowchart 2200 is described with respect to FIG. 23, which shows a cross-sectional view of a display system 2300. Display system 2300 is an exemplary embodiment of system 2000 shown in FIG. 20, and is shown for purposes of illustration. As shown in FIG. 23, system 2300 includes a pixel array 2302 and a barrier element array 2304. In another embodiment, system 2300 may further include backlighting in a configuration similar to display system 2100 of FIG. 21. Further structural and operational embodiments will be apparent to persons skilled in the relevant art(s) based on the discussion regarding flowchart 2200. Flowchart 2200 is described as follows.

Flowchart 2200 begins with step 2202. In step 2202, light is received at an array of barrier elements. For example, as shown in FIG. 20, light 2052 is received at parallax barrier 2020 from pixel array 2008. Each pixel of pixel array 2008 may generate light that is received at parallax barrier 2020. Depending on the particular display mode of parallax barrier 2020, parallax barrier 2020 may filter light 2052 from pixel array 2008 to generate a two-dimensional image or a three-dimensional image viewable in viewing space 2070 by users 2018. As described above with respect to FIG. 21, alternatively, light 2138 may be received by parallax barrier 2020 from light element array 2136.

In step 2204, a first set of the barrier elements of the array of barrier elements is configured in the blocking state and a second set of the barrier elements of the array of barrier elements is configured in the non-blocking state to enable a viewer to be delivered a three-dimensional view. Three-dimensional image content may be provided for viewing in viewing space 2070. In such case, referring to FIG. 20 or 21, barrier array driver circuit 2006 may generate drive signal 2016 to configure barrier element array 2010 to include transparent strips of barrier elements to enable a three-dimensional view to be formed. For example, as shown in FIG. 23, barrier element array 2304 includes a plurality of barrier elements that are each either transparent (in a non-blocking state) or opaque (in a blocking state). Barrier elements that are blocking are indicated as barrier elements 2310a-2310f, and barrier elements that are non-blocking are indicated as barrier elements 2312a-2312e. Further barrier elements may be included in barrier element array 2304 that are not visible in FIG. 23. Each of barrier elements 2310a-2310f and 2312a-2312e may include one or more barrier elements. Barrier elements 2310 alternate with barrier elements 2312 in series in the order of barrier elements 2310a, 2312a, 2310b, 2312b, 2310c, 2312c, 2310d, 2312d, 2310e, 2312e, and 2310f. In this manner, blocking barrier elements 2310 are alternated with non-blocking barrier elements 2312 to form a plurality of parallel non-blocking or transparent slits in barrier element array 2304.

Figure 24:
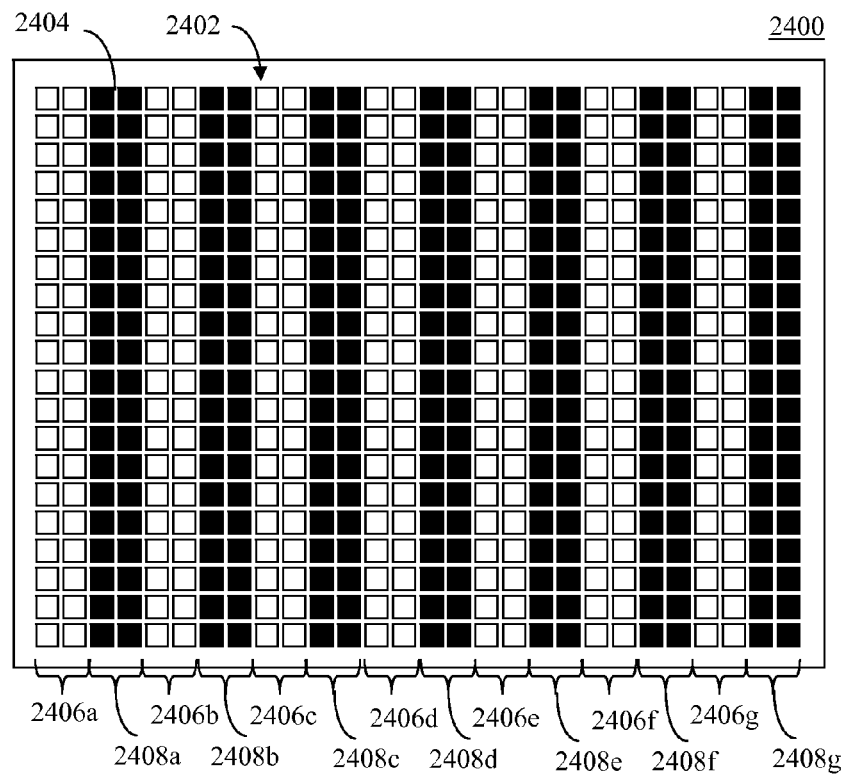
FIGS. 24 and 25 shows view of exemplary parallax barriers with non-blocking slits, according to embodiments.

For instance, FIG. 24 shows a view of a parallax barrier 2400 with transparent slits, according to an exemplary embodiment. Parallax barrier 2400 is an example of parallax barrier 2020 of FIGS. 20 and 21. As shown in FIG. 24, parallax barrier 2400 includes barrier element array 2402, which includes a plurality of barrier elements 2404 arranged in a two-dimensional array. Furthermore, as shown in FIG. 24, barrier element array 2402 includes a plurality of parallel strips of barrier elements 2404 that are selected to be non-blocking to form a plurality of parallel non-blocking strips (or "slits") 2406a-2406g. As shown in FIG. 24, parallel non-blocking strips 2406a-2406g (non-blocking slits) are alternated with parallel blocking or blocking strips 2408a-2408g of barrier elements 2404 that are selected to be blocking. In the example of FIG. 24, non-blocking strips 2406a-2406g and blocking strips 2408a-2408g each have a width (along the x-dimension) of two barrier elements 2404, and have lengths that extend along the entire y-dimension (twenty barrier elements 2404) of barrier element array 2402, although in other embodiments, may have alternative dimensions. Non-blocking strips 2406a-2406g and blocking strips 2408a-2408g form a parallax barrier configuration for parallax barrier 1220. The spacing (and number) of parallel non-blocking strips 2406 in barrier element array 2402 may be selectable by choosing any number and combination of particular strips of barrier elements 2404 in barrier element array 2402 to be non-blocking, to be alternated with blocking strips 2408, as desired. For example, hundreds, thousands, or even larger numbers of non-blocking strips 2406 and blocking strips 2408 may be present in parallax barrier 1220.

Figure 25:
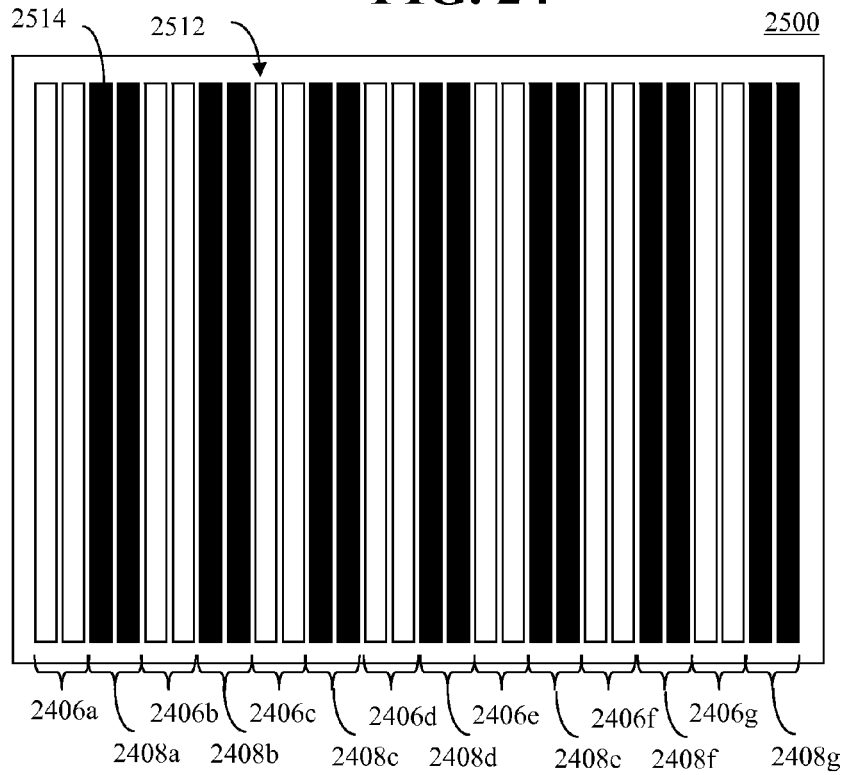

FIG. 25 shows a parallax barrier 2500 that is another example of parallax barrier 2020 with parallel transparent slits, according to an embodiment. Similarly to parallax barrier 2400 of FIG. 24, parallax barrier 2500 includes a barrier element array 2512, which includes a plurality of barrier elements 2514 arranged in a two-dimensional array (28 by 1 array). Barrier elements 2514 have widths (along the x-dimension) similar to the widths of barrier elements 2404 in FIG. 24, but have lengths that extend along the entire vertical length (y-dimension) of barrier element array 2514. As shown in FIG. 25, barrier element array 2512 includes parallel non-blocking strips 2406a-2406g alternated with parallel blocking strips 2408a-2408g. In the example of FIG. 25, parallel non-blocking strips 2406a-2406g and parallel blocking strips 2408a-2408g each have a width (along the x-dimension) of two barrier elements 2514, and have lengths that extend along the entire y-dimension (one barrier element 2514) of barrier element array 2512.

Referring back to FIG. 22, in step 2206, the light is filtered at the array of barrier elements to form the three-dimensional view in a viewing space. Barrier element array 2010 of parallax barrier 2020 is configured to filter light 2052 received from pixel array 2008 (FIG. 20) or light 2138 received from light element array 2136 (FIG. 21) according to whether barrier element array 2010 is transparent or non-blocking (e.g., in a two-dimensional mode) or includes parallel non-blocking strips (e.g., in a three-dimensional mode). If one or more regions of barrier element array 2010 are transparent, those regions of barrier element array 2010 function as "all pass" filters to substantially pass all of light 2052 as filtered light 2072 to deliver one or more corresponding two-dimensional images generated by pixel array 2008 to viewing space 2070, to be viewable as a two-dimensional images in a similar fashion as a conventional display. If barrier element array 2010 includes one or more regions having parallel non-blocking strips (e.g., as shown for barrier element array 2402 in FIGS. 24 and 25), those regions of barrier element array 2010 pass a portion of light 2052 as filtered light 2072 to deliver one or more corresponding three-dimensional images to viewing space 2070.

For example, as shown in FIG. 23, pixel array 2302 includes a plurality of pixels 2314a-2314d and 2316a-2316d. Pixels 2314 alternate with pixels 2316, such that pixels 2314a-2314d and 2316a-2316d are arranged in series in the order of pixels 2314a, 2316a, 2314b, 2316b, 2314c, 2316c, 2314d, and 2316d. Further pixels may be included in pixel array 2302 that are not visible in FIG. 23, including further pixels along the width dimension of pixel array 2302 (e.g., in the left-right directions) as well as pixels along a length dimension of pixel array 2302 (not visible in FIG. 23). Each of pixels 2314a-2314d and 2316a-2316d generates light, which emanates from display surface 2324 of pixel array 2302 (e.g., generally upward in FIG. 23) towards barrier element array 2304. Some example indications of light emanating from pixels 2314a-2314d and 2316a-2316d are shown in FIG. 23 (as dotted lines), including light 2324a and light 2318a emanating from pixel 2314a, light 2324b, light 2318b, and light 2324c emanating from pixel 2314b, etc.

Furthermore, light emanating from pixel array 2302 is filtered by barrier element array 2304 to form a plurality of images in a viewing space 2326, including a first image 2306a at a first location 2308a and a second image 2306b at a second location 2308b. A portion of the light emanating from pixel array 2302 is blocked by blocking barrier elements 2310, while another portion of the light emanating from pixel array 2302 passes through non-blocking barrier elements 2312, according to the filtering by barrier element array 2304. For instance, light 2324a from pixel 2314a is blocked by blocking barrier element 2310a, and light 2324b and light 2324c from pixel 2314b are blocked by blocking barrier elements 2310b and 2310c, respectively. In contrast, light 2318a from pixel 2314a is passed by non-blocking barrier element 2312a and light 2318b from pixel 2314b is passed by non-blocking barrier element 2312b.

By forming parallel non-blocking slits in a barrier element array, light from a pixel array can be filtered to form multiple images or views in a viewing space. For instance, system 2300 shown in FIG. 23 is configured to form first and second images 2306a and 2306b at locations 2308a and 2308b, respectively, which are positioned at a distance 2328 from pixel array 2302 (as shown in FIG. 23, further instances of first and second images 2306a and 2306b may be formed in viewing space 2326 according to system 2300, in a repeating, alternating fashion). As described above, pixel array 2302 includes a first set of pixels 2314a-2314d and a second set of pixels 2316a-2316d. Pixels 2314a-2314d correspond to first image 2306a and pixels 2316a-2316d correspond to second image 2306b. Due to the spacing of pixels 2314a-2314d and 2316a-2316d in pixel array 2302, and the geometry of non-blocking barrier elements 2312 in barrier element array 2304, first and second images 2306a and 2306b are formed at locations 2308a and 2308b, respectively. As shown in FIG. 23, light 2318a-2318d from the first set of pixels 2314a-2314d is focused at location 2308a to form first image 2306a at location 2308a. Light 2320a-2320d from the second set of pixels 2316a-2316d is focused at location 2308b to form second image 2306b at location 2308b.

FIG. 23 shows a slit spacing 2322 (center-to-center) of non-blocking barrier elements 2312 in barrier element array 2304. Spacing 2322 may be determined to select locations for parallel non-blocking slits to be formed in barrier element array 2304 for a particular image distance 2328 at which images are desired to be formed (for viewing by users). For example, in an embodiment, if a spacing of pixels 2314a-2314d corresponding to an image is known, and a distance 2328 at which the image is desired to be displayed is known, the spacing 2322 between adjacent parallel non-blocking slits in barrier element array 2304 may be selected.

First and second images 2306a and 2306b are configured to be perceived by a user as a three-dimensional image or view. For example, a viewer may receive first image 2306a at a first eye location and second image 2306b at a second eye location, according to an exemplary embodiment. First and second images 2306a and 2306b may be generated by first set of pixels 2314a-2314d and second set of pixels 2316a-2316d as images that are slightly different perspective from each other. Images 2306a and 2306b are combined in the visual center of the brain of the viewer to be perceived as a three-dimensional image or view. In such an embodiment, first and second images 2306a and 2306b may be formed by display system 2300 such that their centers are spaced apart a width of a user's pupils (e.g., an "interocular distance").

Note that in the embodiments of FIGS. 24 and 25, the entire regions of parallax barriers 2400 and 2500 are filled with parallel non-blocking strips (e.g., as shown for barrier element array 2402 in FIGS. 24 and 25) to be configured to deliver three-dimensional images to viewing space 2070. In further embodiments, one or more regions of a parallax barrier may be filled with parallel non-blocking strips to deliver three-dimensional images, and one or more other regions of the parallax barrier may be transparent to deliver two-dimensional images. Furthermore, different regions of a parallax barrier that have parallel non-blocking strips may have the parallel non-blocking strips oriented at different angles to deliver three-dimensional images to viewers that are oriented differently.

Figure 26:
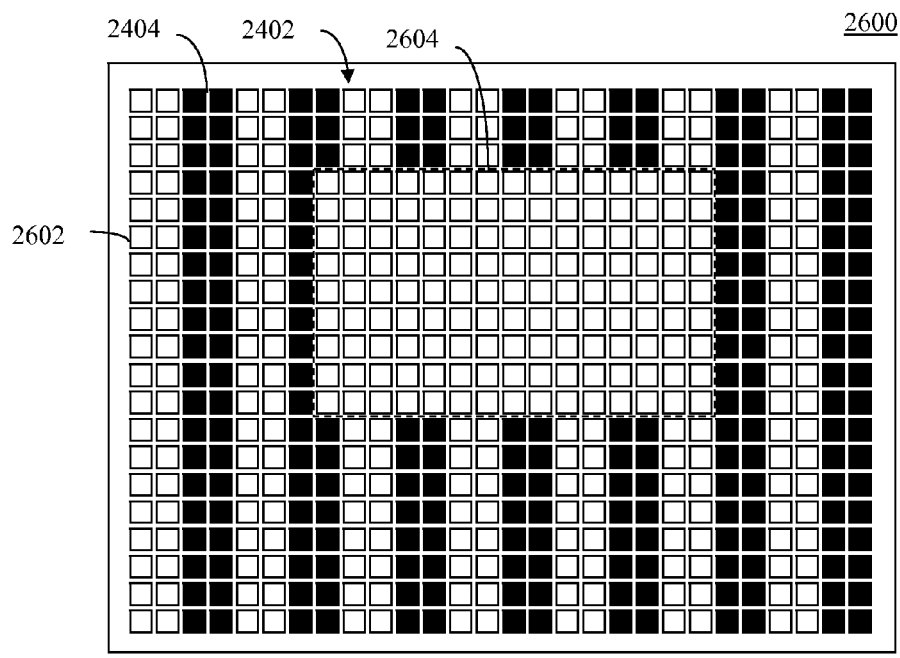
FIG. 26 shows an exemplary view of the barrier element array of FIG. 24 configured to enable the simultaneous display of two-dimensional and three-dimensional images of various sizes and shapes, according to an embodiment.

For instance, FIG. 26 shows a view of a parallax barrier 2600 configured to enable the simultaneous display of two-dimensional and three-dimensional images at different regions, according to exemplary embodiments. Parallax barrier 2600 is similar to parallax barrier 2400 of FIG. 24, having barrier element array 2402 including a plurality of barrier elements 2404 arranged in a two-dimensional array. In FIG. 26, a first region 2602 of barrier element array 2402 includes a plurality of parallel non-blocking strips alternated with parallel blocking strips that together fill first region 2602. A second region 2604 of barrier element array 2402 is surrounded by first region 2602. Second region 2604 is a rectangular shaped region of barrier element array 2402 that includes a two-dimensional array of barrier elements 2404 that are non-blocking. Thus, in FIG. 26, barrier element array 2402 is configured to enable a three-dimensional image to be generated by pixels of a pixel array that are adjacent to barrier elements of first region 2602, and to enable a two-dimensional image to be generated by pixels of the pixel array that are adjacent to barrier elements inside of second region 2604. Note that alternatively, first region 2602 may include all non-blocking barrier elements 2402 to pass a two-dimensional image, and second region 2604 may include parallel non-blocking strips alternated with parallel blocking strips to pass a three-dimensional image. In further embodiments, parallax barrier 2600 may have additional numbers, sizes, and arrangements of regions configured to pass different combinations of two-dimensional images and three-dimensional images.

Figure 27:
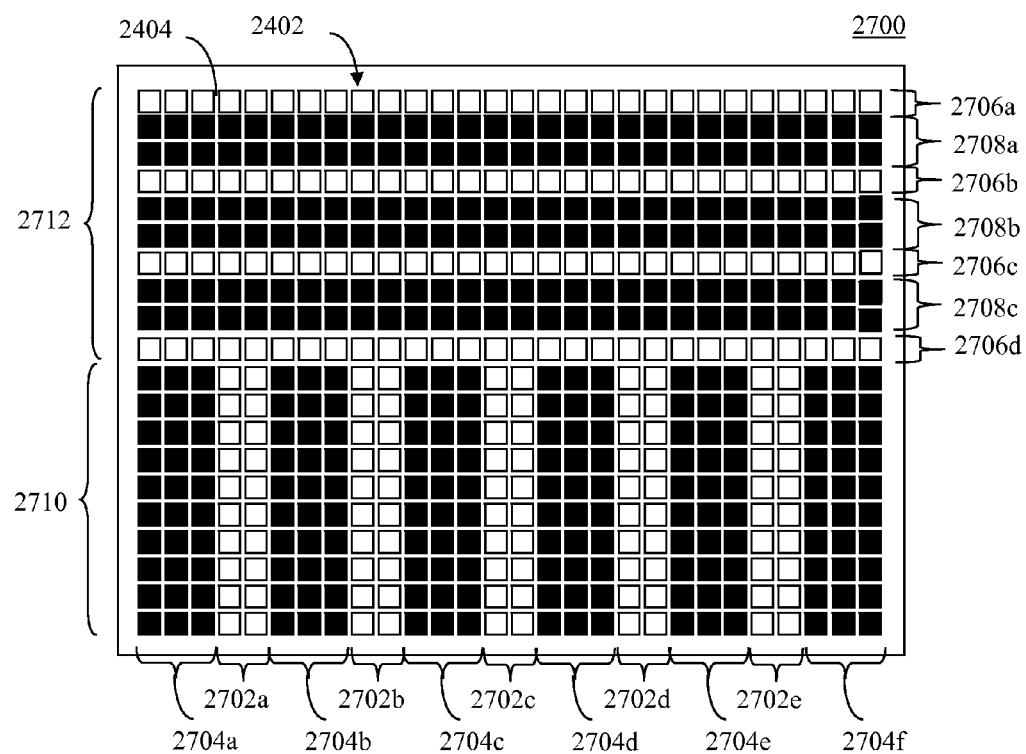
FIG. 27 shows an exemplary view of the parallax barrier of FIG. 24 with differently oriented non-blocking slits, according to an embodiment.

In another example, FIG. 27 shows a view of a parallax barrier 2700 with transparent slits having different orientations, according to an exemplary embodiment. Parallax barrier 2700 is similar to parallax barrier 2400 of FIG. 24, having barrier element array 2402 including a plurality of barrier elements 2404 arranged in a two-dimensional array. A first region 2710 (e.g., a bottom half) of barrier element array 2402 includes a first plurality of parallel strips of barrier elements 2404 that are selected to be non-blocking to form a first plurality of parallel non-blocking strips 2702a-2702e (each having a width of two barrier elements 2404). As shown in FIG. 27, parallel non-blocking strips 2702a-2702e are alternated with parallel blocking strips 2704a-2704f of barrier elements 2404 (each having a width of three barrier elements 2404). Parallel non-blocking strips 2702a-2702e are oriented in a first direction (e.g., along a vertical axis).

Furthermore, as shown in FIG. 27, a second region 2712 (e.g., a top half) of barrier element array 2402 includes a second plurality of parallel strips of barrier elements 2404 that are selected to be non-blocking to form a second plurality of parallel non-blocking strips 2706a-2706d (each having a width of one barrier element 2404). As shown in FIG. 27, parallel non-blocking strips 2706a-2706d are alternated with parallel blocking strips 2708a-2708c of barrier elements 2404 (each having a width of two barrier elements 2404). Parallel non-blocking strips 2706a-2706d are oriented in a second direction (e.g., along a horizontal axis).

As such, in FIG. 27, first and second pluralities of parallel non-blocking strips 2702a-2702e and 2706a-2706d are present in barrier element array 2402 that are oriented perpendicularly to each other. The region of barrier element array 2402 that includes first plurality of parallel non-blocking strips 2702a-2702e may be configured to deliver a three-dimensional image in a viewing space (as described above) to be viewable by a user whose body is oriented vertically (e.g., sitting upright or standing up). The region of barrier element array 2402 that includes second plurality of parallel non-blocking strips 2706a-2706d may be configured to deliver a three-dimensional image in a viewing space (as described above) to be viewable by a user whose body is oriented horizontally (e.g., laying down). In this manner, users who are oriented differently relative to each other can still each be provided with a corresponding three-dimensional image that accommodates their position.

As described above, in an embodiment, display device 1902 of FIG. 19 may be configured to generate a two-dimensional image for viewing by users in a viewing space. For instance, referring to FIGS. 20 and 21, barrier element array 2010 may be configured into a third configuration to deliver a two-dimensional view. In the third configuration, barrier array driver circuit 2006 may generate drive signal 2016 to configure each barrier element of barrier element array 2010 to be in the non-blocking state (transparent). If barrier element array 2010 is non-blocking, barrier element array 2010 functions as an "all pass" filter to substantially pass all of light 2052 (FIG. 20) or light 2138 (FIG. 21) as filtered light 2072 to deliver the two-dimensional image to viewing space 2070, to be viewable as a two-dimensional image in a similar fashion as a conventional display.

Figure 28:
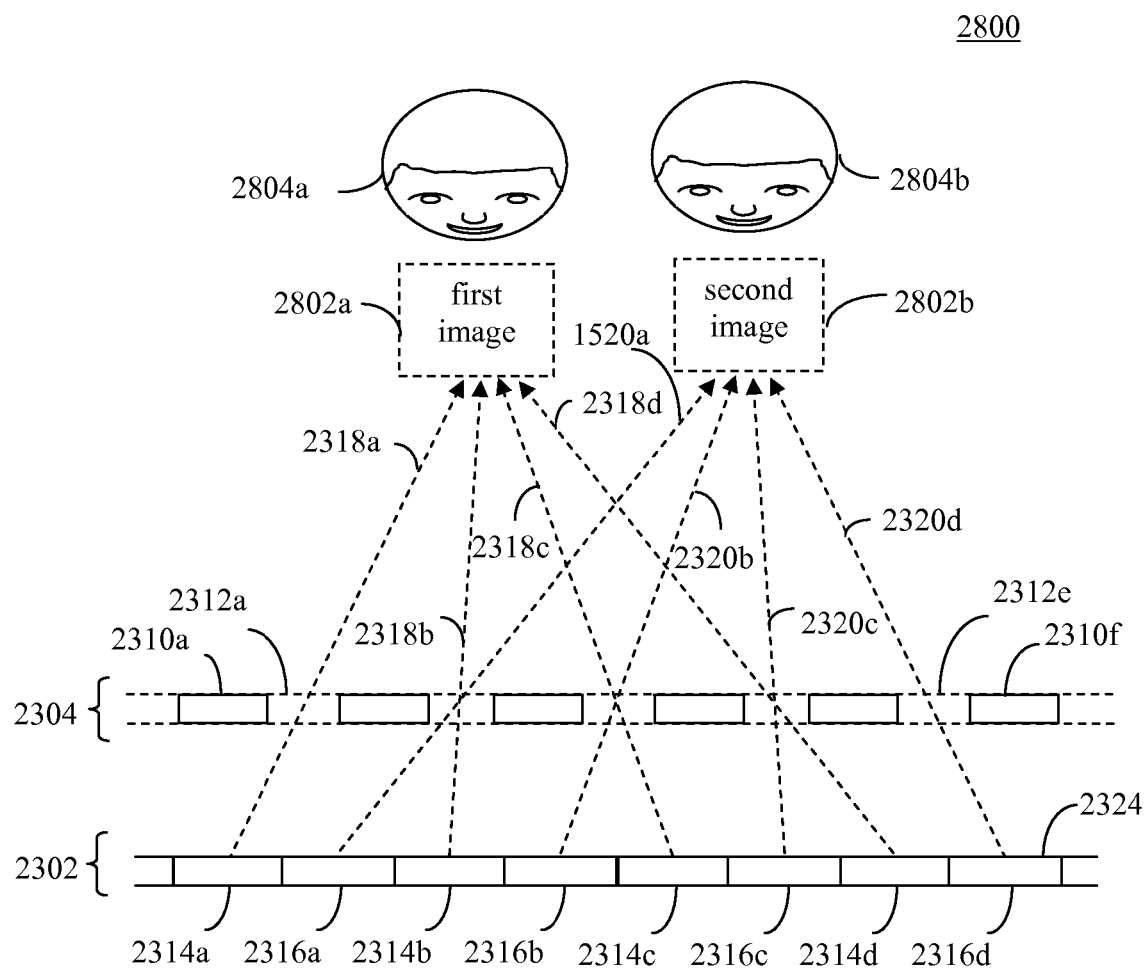
FIG. 28 shows an exemplary display system providing two two-dimensional images that are correspondingly viewable by a first viewer and a second viewer, according to an embodiment.

In embodiments, display systems may be configured to generate multiple two-dimensional images or views for viewing by users in a viewing space. For example, FIG. 28 shows a display system 2800 configured to deliver two two-dimensional images, according to an embodiment. Display system 2800 is configured similarly to display system 2300 of FIG. 23. As shown in FIG. 28, display system 2800 includes pixel array 2302 and barrier element array 2304, which generate first and second images 2802a and 2802b. As shown in FIG. 28, a first viewer 2804a receives first image 2802a at a first location and a second viewer 2804b receives second image 2802b at a second location, according to an exemplary embodiment. Similarly to the description provided above with respect to FIG. 23, first and second images 2802a and 2802b may be generated by first set of pixels 2314a-2314d and second set of pixels 2316a-2316d of pixel array 2302. However, rather than first and second images 2802a and 2802b being images that are of different perspective, first and second images 2802a and 2802b are each a two-dimensional image that may be viewed independently from each other. For instance, image 2802a and image 2802b may generated by display system 2300 from first media content and second media content, respectively, that are independent of each other. Image 2802a may be received by both eyes of first viewer 2804a to be perceived by first viewer 2804a as a first two-dimensional image, and image 2802b may be received by both eyes of second viewer 2804b to be perceived by second viewer 2804b as a second two-dimensional image. Thus, first and second images 2802a and 2802b may be generated to have a spacing that enables them to be separately viewed by first and second users 2804a and 2804b.

As such, display system 2800 of FIG. 28 can be configured to deliver a single three-dimensional view to a viewer (e.g., as shown in FIG. 23 for display system 2300), to deliver a pair of two-dimensional views to a pair of viewers (e.g., as shown in FIG. 28), or to deliver a pair of three-dimensional views to a pair of viewers as described above). Display system 2800 can be configured to switch between delivering views to one and two viewers by turning off or turning on, respectively, the display of media content by pixel array 2302 associated with one of the viewers (e.g., by turning off or on pixels 2316 associated with second image 2802b). Display system 2800 can be configured to switch between delivering two-dimensional and three-dimensional views by providing the corresponding media content type at pixel array 2802. Furthermore, display system 2800 may provide such capabilities when configured similarly to display system 2100 shown in FIG. 21 (e.g., including backlighting 2116).

In an embodiment, display system 2300 may be configured to generate multiple three-dimensional images that include related image content (e.g., each three-dimensional image is a different viewpoint of a common scene), or that each include unrelated image content, for viewing by users in a viewing space. Each of the three-dimensional images may correspond to a pair of images generated by pixels of the pixel array. The barrier element array filters light from the pixel array to form the image pairs in a viewing space to be perceived by users as three-dimensional images.

Figure 29:
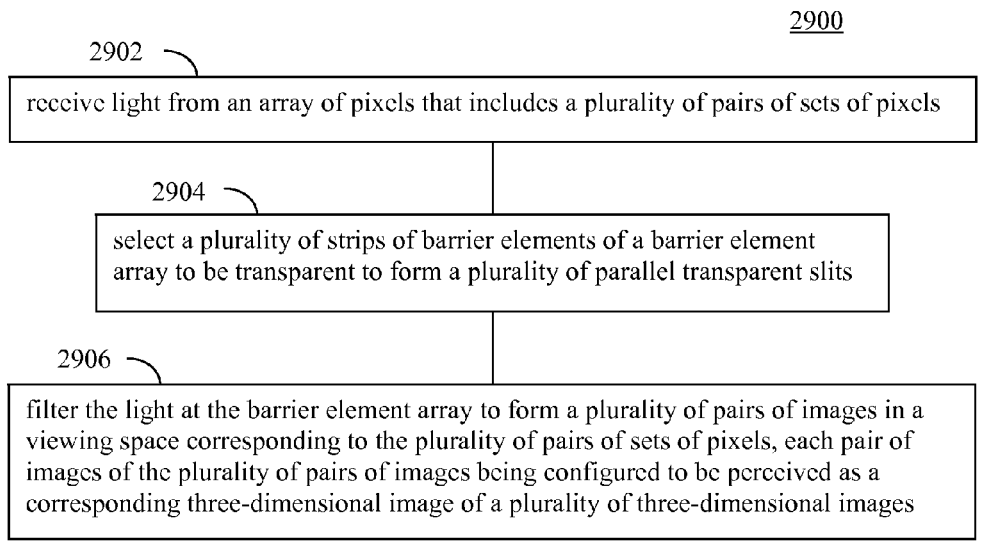
FIG. 29 shows a flowchart of an exemplary method for generating multiple three-dimensional images, according to an embodiment.
Figure 30:
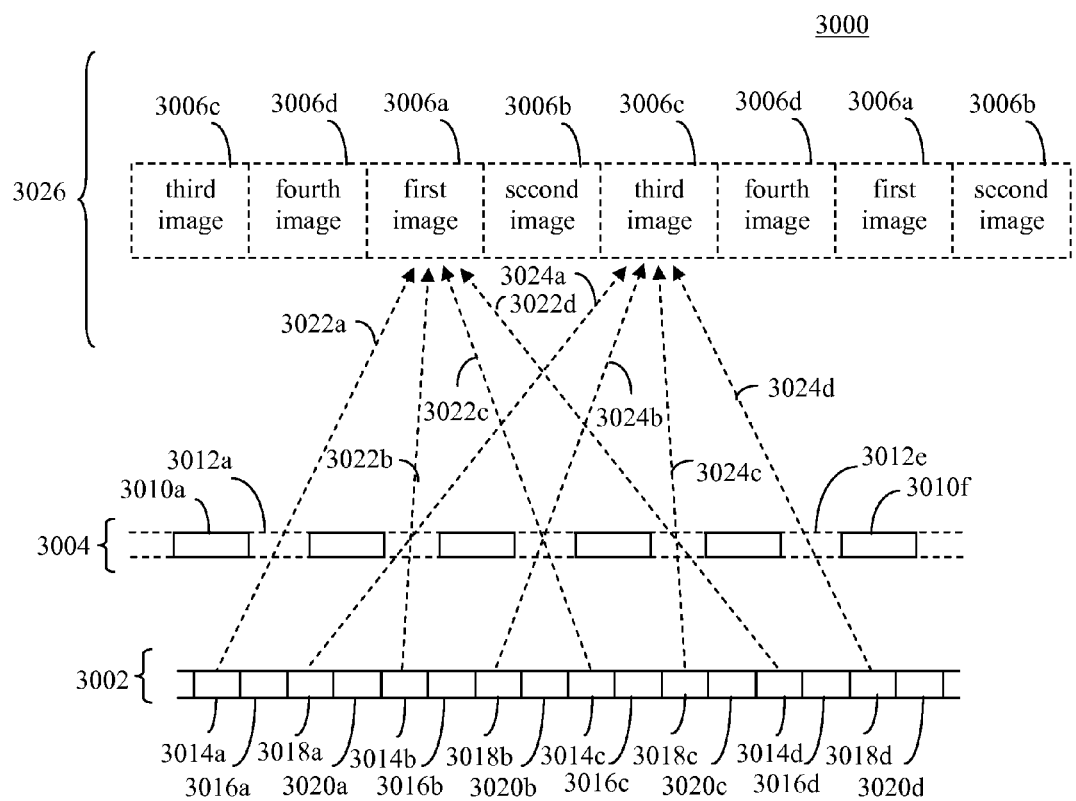
FIG. 30 shows a cross-sectional view of an example of the display system of FIG. 12, according to an embodiment.

For instance, FIG. 29 shows a flowchart 2900 for generating multiple three-dimensional images, according to an exemplary embodiment. Flowchart 2900 is described with respect to FIG. 30, which shows a cross-sectional view of a display system 3000. Display system 21200 is an exemplary embodiment of system 2000 shown in FIG. 20, and is shown for purposes of illustration. As shown in FIG. 30, system 3000 includes a pixel array 3002 and a barrier element array 3004. System 3000 may also include display driver circuit 2002 of FIG. 20, which is not shown in FIG. 30 for ease of illustration. Further structural and operational embodiments will be apparent to persons skilled in the relevant art(s) based on the discussion regarding flowchart 2900. Flowchart 2900 is described as follows.

Flowchart 2900 begins with step 2902. In step 2902, light is received from an array of pixels that includes a plurality of pairs of sets of pixels. For instance, in the example of FIG. 30, pixel array 3002 includes a first set of pixels 3014a-3014d, a second set of pixels 3016a-3016d, a third set of pixels 3018a-3018d, and a fourth set of pixels 3020a-3020d. Each of pixels 3014a-3014d, 3016a-3016d, 3018a-3018d, 3020a-3020d generates light, which emanates from the surface of pixel array 3002 towards barrier element array 3004. Each set of pixels generates a corresponding image. First set of pixels 3014a-3014d and third set of pixels 3018a-3018d are configured to generate images that combine to form a first three-dimensional image. Second set of pixels 3016a-3016d and fourth set of pixels 3020a-3020d are configured to generate images that combine to form a second three-dimensional image. Pixels of the four sets of pixels are alternated in pixel array 3002 in the order of pixel 3014a, pixel 3016a, pixel 3018a, pixel 3020a, pixel 3014b, pixel 3016b, etc. Further pixels may be included in each set of pixels in pixel array 3002 that are not visible in FIG. 30, including hundreds, thousands, or millions of pixels in each set of pixels.

As described above, in the current embodiment, pixel array 3002 is segmented into a plurality of pairs of sets of pixels. For instance, in the example of FIG. 30, pixel array 3002 is segmented into four sets of pixels. The first set of pixels includes pixels 3014a-3014g and the other pixels in the same columns, the second set of pixels includes pixels 3016a-3016g and the other pixels in the same columns, pixels 3018a-3018g and the other pixels in the same columns, and pixels 3020a-3020g and the other pixels in the same columns.

In step 2904, a plurality of strips of barrier elements of a barrier element array is selected to be non-blocking to form a plurality of parallel non-blocking slits. As shown in FIG. 30, barrier element array 3004 includes barrier elements that are each either non-blocking or blocking. Barrier elements that are blocking are indicated as barrier elements 3010a-3010f, and barrier elements that are non-blocking are indicated as barrier elements 3012a-3012e. Further barrier elements may be included in barrier element array 3004 that are not visible in FIG. 30, including hundreds, thousands, or millions of barrier elements, etc. Each of barrier elements 3010a-3010f and 3012a-3012e may include one or more barrier elements. Barrier elements 3010 alternate with barrier elements 3012. In this manner, blocking barrier elements 3010 are alternated with non-blocking barrier elements 3012 to form a plurality of parallel non-blocking slits in barrier element array 3004.

In step 2906, the light is filtered at the barrier element array to form a plurality of pairs of images in a viewing space corresponding to the plurality of pairs of sets of pixels, each pair of images of the plurality of pairs of images being configured to be perceived as a corresponding three-dimensional image of a plurality of three-dimensional images. As shown in FIG. 30, light emanating from pixel array 3002 is filtered by barrier element array 3004 to form a plurality of images in a viewing space 3026. For instance, four images are formed in viewing space 3026, including first-fourth images 3006a-3006d. Pixels 3014a-3014d correspond to first image 3006a, pixels 3016a-3016d correspond to second image 3006b, pixels 3018a-3018d correspond to third image 3006c, and pixels 3020a-3020d correspond to fourth image 3006d. As shown in FIG. 30, light 3022a-3022d from the first set of pixels 3014a-3014d forms first image 3006a, and light 3024a-3024d from the third set of pixels 3018a-3018d forms third image 3006c, due to the filtering of the non-blocking slits (corresponding to non-blocking barrier elements 3012a-3012e) in barrier element array 3004. Although not indicated in FIG. 30 (for ease of illustration), in a similar fashion, light from the second set of pixels 3016a-3016d forms second image 3006b, and light from the fourth set of pixels 3020a-3020d forms fourth image 3006d.

In the embodiment of FIG. 30, any pair of images of images 3006a-3006d may be configured to be perceived as a three-dimensional image by a user in viewing space 3026. For instance, first and third images 3006a and 3006c may be configured to be perceived by a user as a first three-dimensional image, such that first image 3006a is received at a first eye location and third image 3006c is received at a second eye location of a user. Furthermore, second and fourth images 3006b and 3006d may be configured to be perceived by a user as a second three-dimensional image, such that second image 3006b is received at a first eye location and fourth image 3006d is received at a second eye location of a user.

In the example of FIG. 30, two three-dimensional images are provided by system 3000. In further embodiments, further numbers of three-dimensional images may be provided, including a third three-dimensional image, a fourth three-dimensional image, etc. In such case, each three-dimensional image is generated by filtering light (using a barrier element array) corresponding to an image pair generated by a corresponding pair of sets of pixels of the pixel array, in a similar fashion as described with respect to FIG. 30 for two three-dimensional images. For example, to provide three three-dimensional images, pixel array 3002 may include fifth and sixth sets of pixels that generate fifth and sixth images, respectively, to be perceived by a user as a third three-dimensional image. To provide a fourth three-dimensional image, pixel array 3002 may include seventh and eighth sets of pixels that generate seventh and eighth images, respectively, to be perceived by a user as the fourth three-dimensional image.

In FIG. 30, the first and second three-dimensional images generated based on first and third images 3006a and 3006c and second and fourth images 3006b and 3006d, respectively, and any further three-dimensional images that may be generated, may include related image content or may each include unrelated image content. For example, in an embodiment, the first and second three-dimensional images (and any further three-dimensional images) may have been captured as different viewpoints of a common scene. Thus, a user in viewing space 3026 that moves laterally to sequentially view the first and second three-dimensional images (and any further three-dimensional images) may perceive being able to partially or fully "view behind" objects of the common scene.

Further description regarding using a parallax barrier to deliver three-dimensional views, including adaptable versions of parallax barriers, is provided in pending U.S. Ser. No. 12/845,409, titled "Display With Adaptable Parallax Barrier," in pending U.S. Ser. No. 12/845,440, titled "Adaptable Parallax Barrier Supporting Mixed 2D And Stereoscopic 3D Display Regions," and in pending U.S. Ser. No. 12/845,461, titled "Display Supporting Multiple Simultaneous 3D Views," which are each incorporated by reference herein in their entireties.

2. Exemplary Embodiments Using Lenticular Lenses

Figure 31:
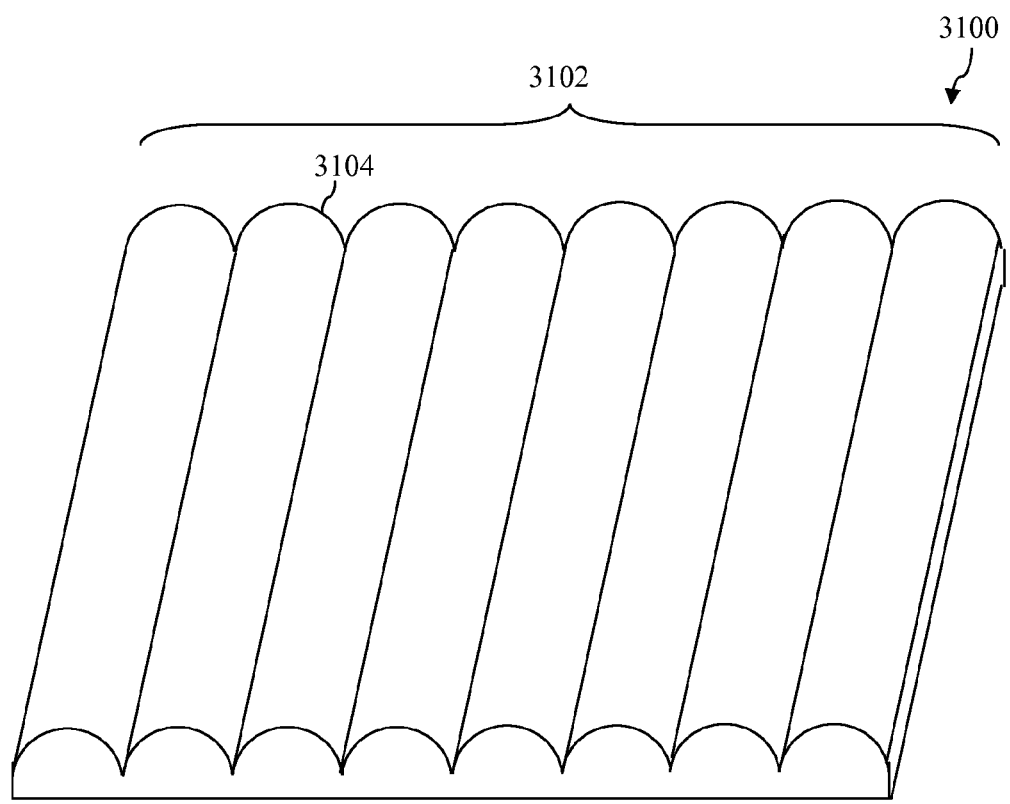
FIGS. 31 and 32 show views of an exemplary lenticular lens, according to an embodiment.
Figure 32:
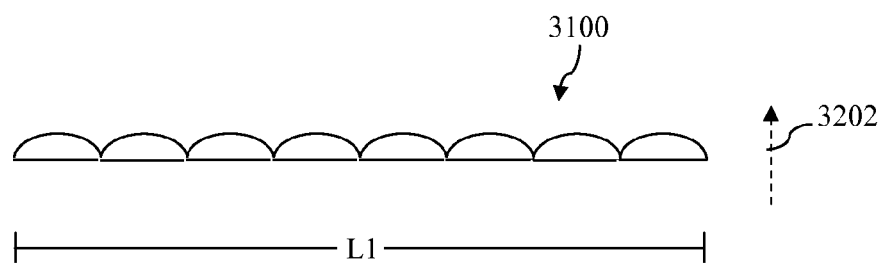

In embodiments, as described herein, display devices 1800 and 1900 of FIGS. 18 and 19 may include one or more lenticular lenses as light manipulators 1804 and 1904 used to deliver three-dimensional images and/or two-dimensional images. For instance, display systems 2000 and 2100 of FIGS. 20 and 21 may each include a sub-lens array of a lenticular lens in place of parallax barrier 2020. For example, FIG. 31 shows a perspective view of a lenticular lens 3100 in accordance with an embodiment. As shown in FIG. 31, lenticular lens 3100 includes a sub-lens array 3102. Sub-lens array 3102 includes a plurality of sub-lenses 3104 arranged in a two-dimensional array (e.g., arranged side-by-side in a row). Each sub-lens 3104 is shown in FIG. 31 as generally cylindrical in shape and having a substantially semi-circular cross-section, but in other embodiments may have other shapes. In FIG. 31, sub-lens array 3102 is shown to include eight sub-lenses for illustrative purposes and is not intended to be limiting. For instance, sub-lens array 3102 may include any number (e.g., hundreds, thousands, etc.) of sub-lenses 3104. FIG. 32 shows a side view of lenticular lens 3100, oriented as lenticular lens 3100 may be positioned in system 2300 of FIG. 23 (in place of parallax barrier 2304) for lenticular lens 2302 to deliver three-dimensional views. In FIG. 32, light may be passed through lenticular lens 3100 in the direction of dotted arrow 3202 to be diverted.

In one embodiment, lenticular lens 3100 may be fixed in size. For example, light manipulator 1804 of FIG. 18 may include lenticular lens 3100 when fixed in size. In another embodiment, lenticular lens 3100 may be adaptable. For instance, light manipulator 1904 of FIG. 19 may include lenticular lens 3100 when adaptable. For instance, in an embodiment lenticular lens 3100 may be made from an elastic material. Such a lenticular lens 3100 may be adapted in size in response to generated drive signals.

Further description regarding using a lenticular lens to deliver three-dimensional views, including adaptable versions of lenticular lenses, is provided in pending U.S. Ser. No. 12/774,307, titled "Display with Elastic Light Manipulator," which is incorporated by reference herein in its entirety.

3. Exemplary Embodiments Using Multiple Light Manipulators

Display devices 1800 and 1900 may include multiple layers of light manipulators in embodiments. Multiple three-dimensional images may be displayed in a viewing space using multiple light manipulator layers, according to embodiments. In embodiments, the multiple light manipulating layers may enable spatial separation of the images. For instance, in such an embodiment, for example, a display device that includes multiple light manipulator layers may be configured to display a first three-dimensional image in a first region of a viewing space (e.g., a left-side area), a second three-dimensional image in a second region of the viewing space (e.g., a central area), a third three-dimensional image in a third region of the viewing space (e.g., a right-side area), etc. In embodiments, a display device may be configured to display any number of spatially separated three-dimensional images, as desired for a particular application (e.g., according to a number and spacing of viewers in the viewing space, etc.).

Figure 33:
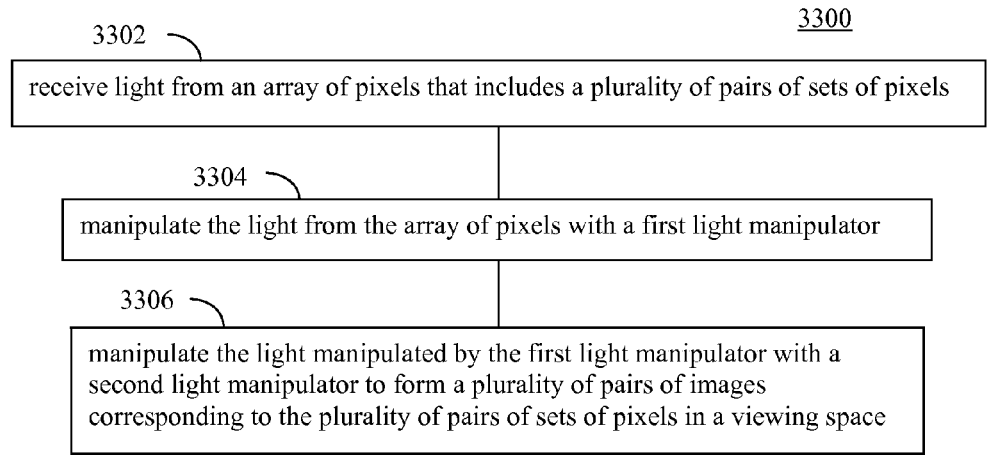
FIG. 33 shows a flowchart of an exemplary method for generating multiple three-dimensional images using multiple light manipulator layers, according to an embodiment.
Figure 34:
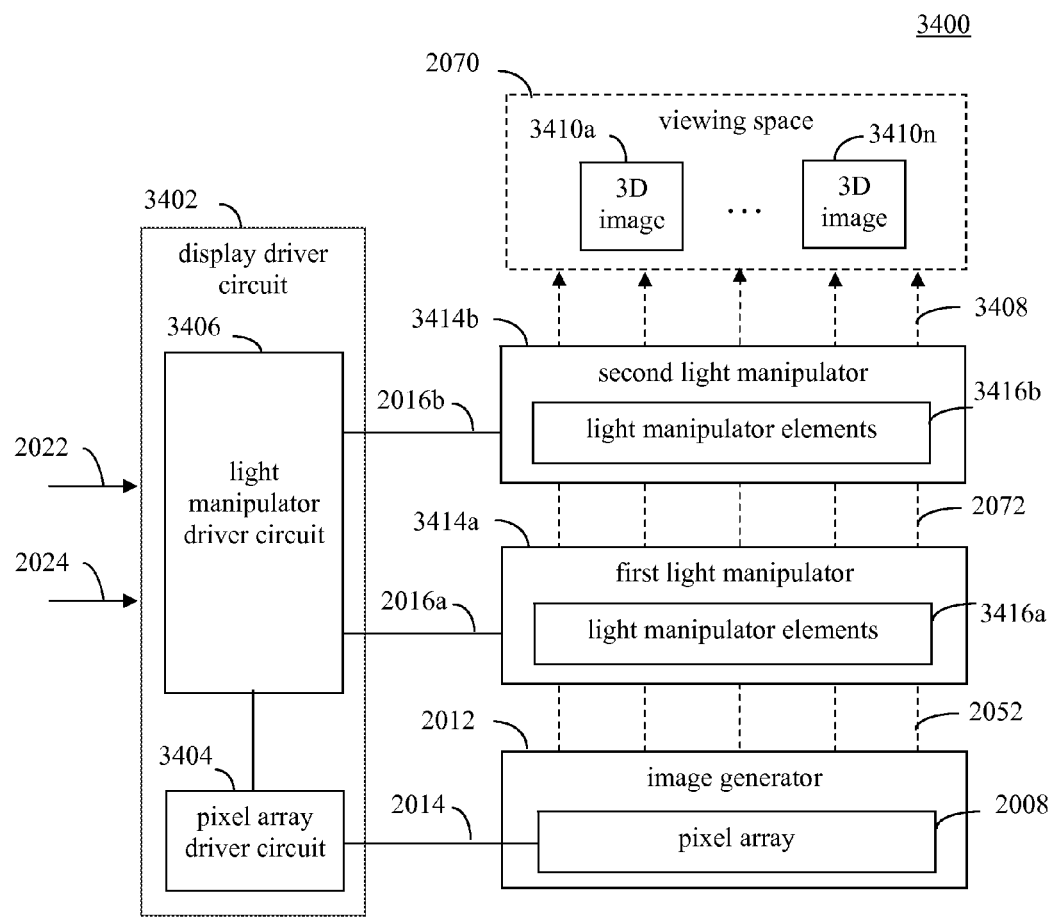
FIG. 34 shows a block diagram of an exemplary display system, according to an embodiment.

For instance, FIG. 33 shows a flowchart 3300 for generating multiple three-dimensional images using multiple light manipulator layers, according to an exemplary embodiment. Flowchart 3300 is described with respect to FIG. 34, which shows a cross-sectional view of a display system 3400 that includes multiple light manipulator layers, according to an exemplary embodiment. As shown in FIG. 34, system 3400 includes a display driver circuit 3402, an image generator 2012, a first light manipulator 3414a, and a second light manipulator 3414b. As shown in FIG. 34, image generator 2012 includes pixel array 2008, first light manipulator 3414a includes first light manipulator elements 3416a, and second light manipulator 3414b includes second light manipulator elements 3416b. Furthermore, as shown in FIG. 34, display driver circuit 3402 includes a pixel array driver circuit 3404 and a light manipulator driver circuit 3406. Flowchart 3300 and system 3400 are described as follows.

Flowchart 3300 begins with step 3302. In step 3302, light is received from an array of pixels that includes a plurality of pairs of sets of pixels. For example, as shown in FIG. 34, light 2052 is received at first light manipulator 3414a from pixel array 208 of image generator 2012. Pixel array driver circuit 3404 may generate driver signals based on content signal 2024 received by display driver circuit 3402, and the driver signals may be received by pixel array 2014 to generate light 2052. Each pixel of pixel array 2008 may generate light that is received at first light manipulator 3414a. In an embodiment, pixel array driver circuit 3404 may generate drive signal 2014 to cause pixel array 2008 to emit light 2052 containing a plurality of images corresponding to the sets of pixels.

In step 3304, the light from the array of pixels is manipulated with a first light manipulator. For example, first light manipulator 3414a may be configured to manipulate light 2052 received from pixel array 2008. As shown in FIG. 34, first light manipulator 3414a includes light manipulator elements 3416a configured to perform manipulating (e.g., filtering, diverting, etc.) of light 2052 to generate manipulated light 2072. Light manipulator elements 3416a may optionally be configurable to adjust the manipulating performed by first light manipulator 3414a. First light manipulator 3414a may perform filtering in a similar manner as a parallax barrier described above or in other manner. In another embodiment, first light manipulator 3414a may include a lenticular lens that diverts light 2052 to perform light manipulating, generating manipulated light 2072. In an embodiment, light manipulator driver circuit 3406 may generate drive signal 2016a based on control signal 2022 received by display driver 3402 to cause light manipulator elements 3416a to manipulate light 2052 as desired.

In step 3306, the light manipulated by the first light manipulator is manipulated with a second light manipulator to form a plurality of pairs of images corresponding to the plurality of pairs of sets of pixels in a viewing space. For example, as shown in FIG. 34, manipulated light 2072 is received by second light manipulator 3414b to generate manipulated light 3408 that includes a plurality of three-dimensional images 3410a-3410n formed in viewing space 2070. As shown in FIG. 34, second light manipulator 3414b includes light manipulator elements 3416b configured to perform manipulating of manipulated light 2072 to generate manipulated light 3408. Light manipulator elements 3416b may optionally be configurable to adjust the manipulating performed by second light manipulator 3414b. In an embodiment, light manipulator driver circuit 3406 may generate drive signal 2016b based on control signal 2022 to cause light manipulator elements 3416b to manipulate manipulated light 2052 to generate manipulated light 3408 including three-dimensional images 3410a-3410n as desired. In embodiments, second light manipulator 3414a may include a parallax barrier or a lenticular lens configured to manipulate manipulated light 2052 to generate manipulated light 3408.

As such, display system 3400 has a single viewing plane or surface (e.g., a plane or surface of pixel array 2008, first light manipulator 3414a, second light manipulator 3414b) that supports multiple viewers with media content in the form of three-dimensional images or views. The single viewing plane of display system 3400 may provide a first three-dimensional view based on first three-dimensional media content to a first viewer, a second three-dimensional view based on second three-dimensional media content to a second viewer, and optionally further three-dimensional views based on further three-dimensional media content to further viewers. First and second light manipulators 3414a and 3414b each cause three-dimensional media content to be presented to a corresponding viewer via a corresponding area of the single viewing plane, with each viewer being enabled to view corresponding media content without viewing media content directed to other viewers. Furthermore, the areas of the single viewing plane that provide the various three-dimensional views of media content overlap each other at least in part. In the embodiment of FIG. 34, the areas may be the same area—an area of a display screen or surface of display system 3400. As such, multiple three-dimensional views that are each viewable by a corresponding viewer may be delivered by a single display viewing plane.

Display system 3400 may be configured in various ways to generate multiple three-dimensional images according to flowchart 3300, in embodiments. Furthermore, as described below, embodiments of display system 3400 may be configured to generate two-dimensional views, as well as any combination of one or more two-dimensional views simultaneously with one or more three-dimensional views.

Figure 35:
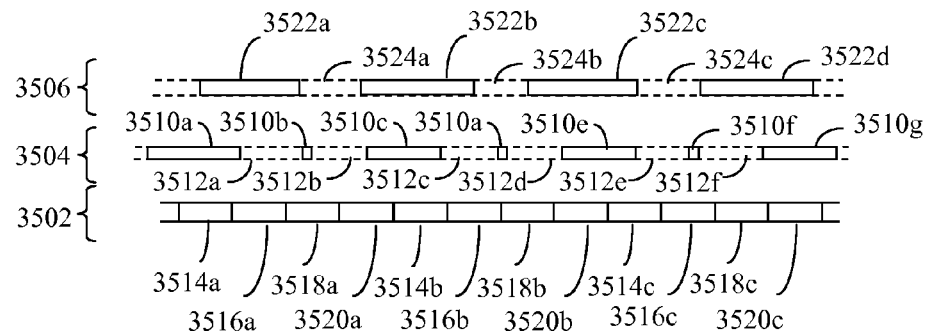
FIGS. 35 and 36 show cross-sectional views of an exemplary display system, according to an embodiment.

For instance, in an embodiment, delivery of three-dimensional images may be performed in system 3400 using multiple parallax barriers. FIG. 35 shows a cross-sectional view of a display system 3500, according to an exemplary embodiment. Display system 3500 is an example of system 3400 shown in FIG. 34. As shown in FIG. 35, system 3500 includes a pixel array 3502, a first barrier element array 3504, and a second barrier element array 3506. System 3500 may also include display driver circuit 3402 of FIG. 24, which is not shown in FIG. 35 for ease of illustration. System 3500 is described as follows.

As shown in the example of FIG. 35, pixel array 3502 includes a first set of pixels 3514a-3514c, a second set of pixels 3516a-3516c, a third set of pixels 3518a-3518c, and a fourth set of pixels 3520a-3520c. Pixels of the four sets of pixels are alternated in pixel array 3502 in the order of pixel 3514a, pixel 3516a, pixel 3518a, pixel 3520a, pixel 3514b, pixel 3516b, etc. Further pixels may be included in each set of pixels in pixel array 3502 that are not visible in FIG. 35, including hundreds, thousands, or millions of pixels in each set of pixels.

Figure 36:
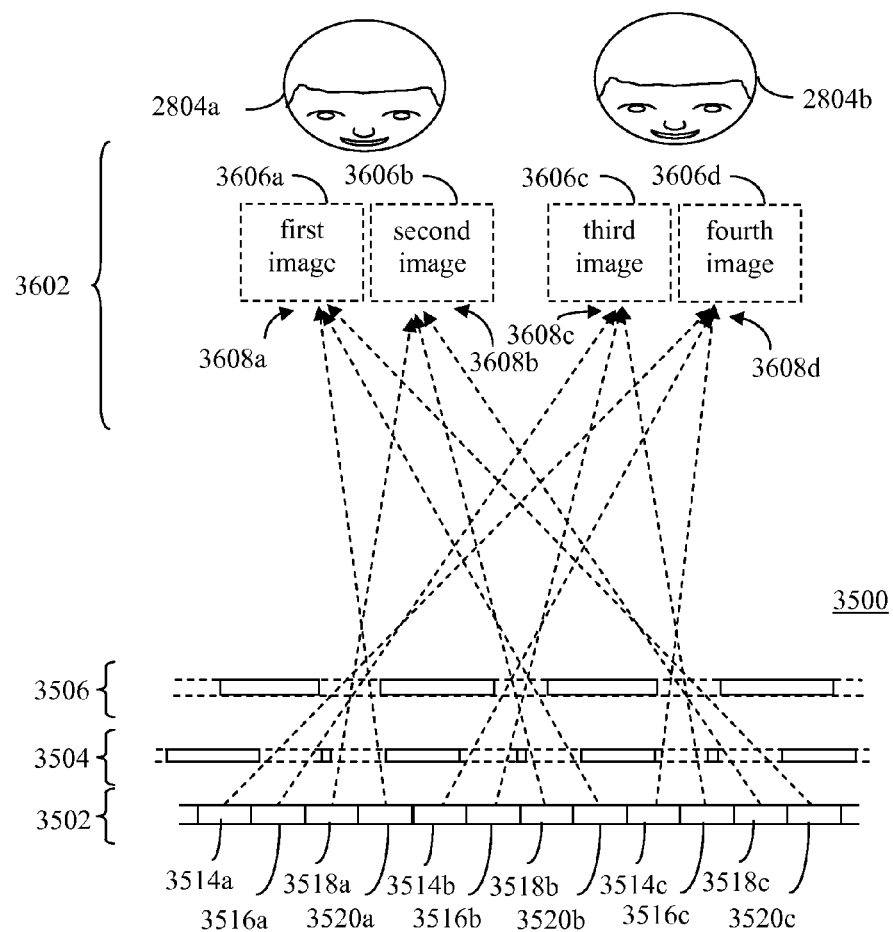

Each of pixels 3514a-3514c, 3516a-3516c, 3518a-3518c, and 3520a-3520c is configured to generate light, which emanates from the surface of pixel array 3502 towards first barrier element array 3504. Each set of pixels is configured to generate a corresponding image. For example, FIG. 36 shows display system 3500, where pixels of pixel array 3502 emit light. Light from second set of pixels 3516a-3516c and first set of pixels 3514a-3514c is configured to generate third and fourth images 3606c and 3606d, respectively, which may be perceived together as a second three-dimensional image by a second viewer 2804b. Light from fourth set of pixels 3520a-

3520c and third set of pixels 3518a-3518c is configured to generate first and second images 3606a and 3606b, respectively, which may be perceived together as a first three-dimensional image by a first viewer 2804a. The light emitted by the sets of pixels is filtered by first and second barrier element arrays 3504 and 3506 to generate the first and second three-dimensional images in respective desired regions of a user space 3602 adjacent to display system 3500.

First-fourth images 3606a-3606d may be formed in viewing space 3602 at a distance from pixel array 3502 and at a lateral location of viewing space 3602 as determined by a configuration of display system 3500 of FIG. 34, including a width and spacing of non-blocking slits in first barrier element array 3504, by a width and positioning of non-blocking slits in second barrier element array 3506, by a spacing between pixel array 3502 and first barrier element array 3504, and a spacing between first and second barrier element arrays 3504 and 3506.

Figure 37:
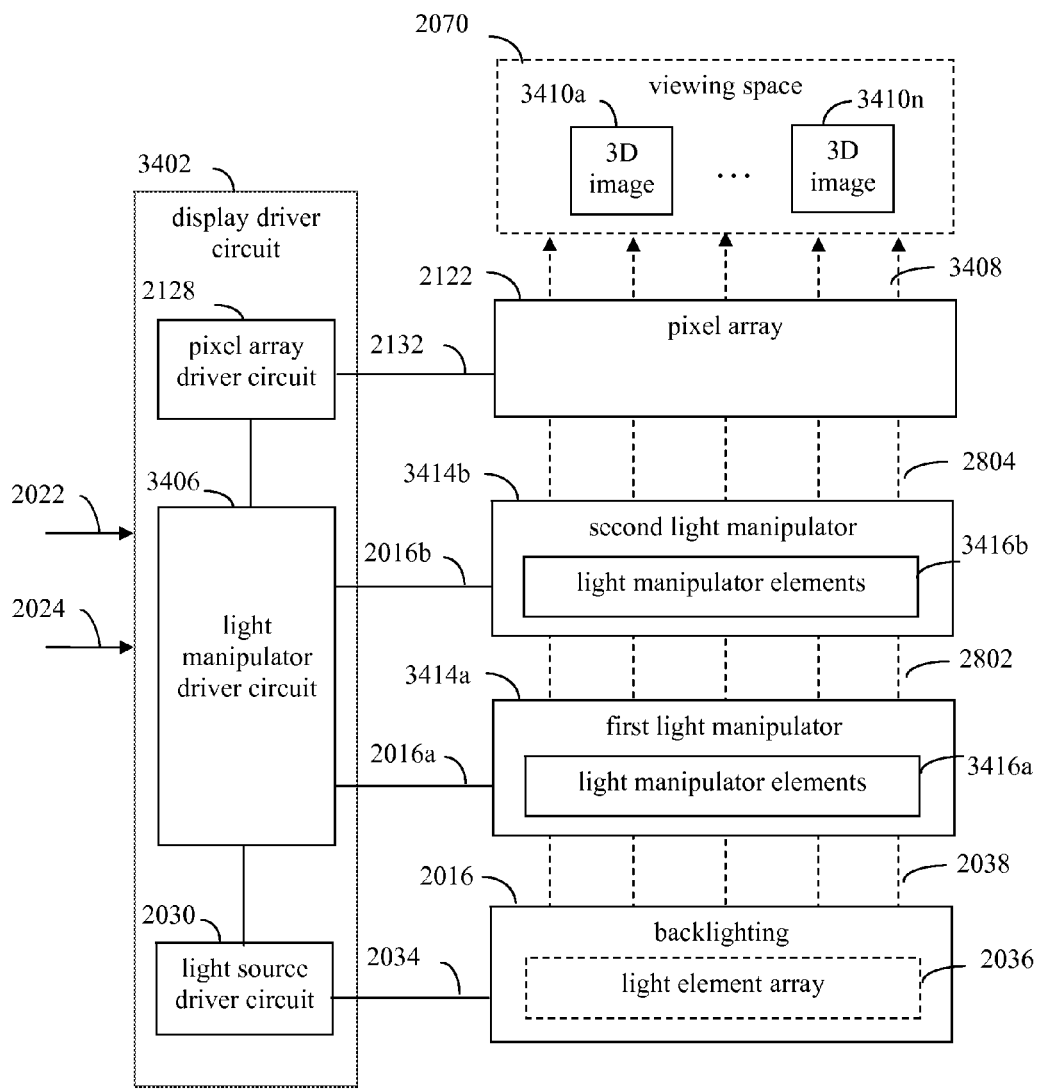
FIG. 37 shows a block diagram of an exemplary display system, according to an embodiment.

In an embodiment, system 3400 of FIG. 34 may be configured similarly to display system 2100 of FIG. 21 to deliver three-dimensional images and/or two-dimensional images. For instance, in embodiments, system 3400 may include backlighting 2116 and pixel array 2122 separated by one or both of first and second light manipulators 3414a and 3414b. For example, FIG. 37 shows a block diagram of a display system 3700, which is an example of display devices 1800 and 1900 shown in FIGS. 18 and 19, according to an embodiment. Display system 3700 is configured to display multiple three-dimensional images in a viewing space in a spatially separated manner. As shown in FIG. 37, system 3700 includes display driver circuit 3402, backlighting 2116, first light manipulator 3414a, second light manipulator 3414b, and pixel array 2122. As shown in FIG. 37, backlighting 2116 optionally includes light element array 2136, first light manipulator 3414a includes first light manipulator elements 3416a, and second light manipulator 3414b includes second light manipulator elements 3416b. Furthermore, as shown in FIG. 37, display driver circuit 3402 receives control signal 2022 and content signal 2024 and includes light source driver circuit 2130, light manipulator driver circuit 3406, and pixel array driver circuit 2128. Light source driver circuit 2130, light manipulator driver circuit 3406, and pixel array driver circuit 2128 may generate drives signals to perform their respective functions based on control signal 2022 and/or content signal 2024. As shown in FIG. 37, first and second light manipulators 3414a and 3414b are positioned between backlighting 2116 and pixel array 2122. In another embodiment, pixel array 2122 may instead be located between first and second light manipulators 3414a and 3414b.

As shown in FIGS. 20 and 21, display driver circuit 2002 receives content signal 2024, and as shown in FIGS. 34 and 37, display driver circuit 2402 receives content signal 2024. Content signal 2024 is an example of content signals 1808 and 1908 of FIGS. 18 and 19. Content signal 2024 includes two-dimensional and/or three-dimensional content for display by the respective display devices/systems. For instance, display driver circuits 2002 and 3402 generate respective drive signals (e.g., pixel array drive signals) based on content signal 2024 to enable the content carried by content signal 2024 to be displayed.

C. Exemplary Display Environments

As described above, light manipulators may be reconfigured to change the locations of delivered views based on changing viewer positions. As such, a position of a viewer may be determined/tracked so that a parallax barrier and/or light manipulator may be reconfigured to deliver views consistent with the changing position of the viewer. For instance, with regard to a parallax barrier, a spacing, number, arrangement, and/or other characteristic of slits may be adapted according to the changing viewer position. With regard to a lenticular lens, a size of the lenticular lens may be adapted (e.g., stretched, compressed) according to the changing viewer position. In embodiments, a position of a viewer may be determined/tracked by determining a position of the viewer directly, or by determining a position of a device associated with the viewer (e.g., a device worn by the viewer, held by the viewer, sitting in the viewer's lap, in the viewer's pocket, sitting next the viewer, etc.).

Figure 38:
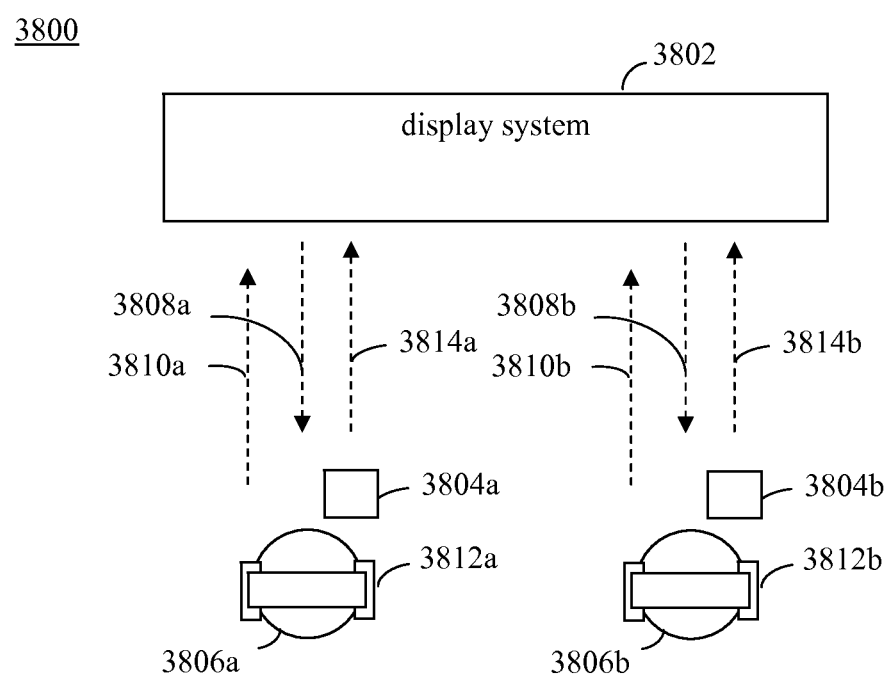
FIG. 38 shows a block diagram of an exemplary display environment, according to an embodiment.

For instance, FIG. 38 shows a block diagram of a display environment 3800, according to an exemplary embodiment. In the example of FIG. 38, first and second viewers 3806a and 3806b are present in display environment 3800, and are enabled to interact with a display device 3802 to be delivered two-dimensional and/or three-dimensional media content. Although two viewers 3806 are shown present in FIG. 38, in other embodiments, other numbers of viewers 3806 may be present in display environment 3800 that may interact with display device 3802 and may be delivered media content by display device 3802. As shown in FIG. 38, display environment 3800 includes display device 3802, a first remote control 3804a, a second remote control 3804b, a first headset 3812a, a second headset 3812b, and viewers 3806a and 3806b. Display device 3802 is an example of the display devices described above, and may be configured similarly to any display device described herein, including display device 106, display device 806, display 906, and display 1006. Viewer 3806a is delivered a view 3808a by display device 3802, and viewer 3806b is delivered a view 3808b by display device 3802. Views 3808a and 3808b may each be a two-dimensional view or a three dimensional view. Furthermore, in embodiments, view 3808a may be delivered to viewer 3806a, but not be visible by viewer 3806b, and view 3808b may be delivered to viewer 3806b, but not be visible by viewer 3806a.

Remote control 3804a is a device that viewer 3806a may use to interact with display device 3802, and remote control 3804b is a device that viewer 3806b may use to interact with display device 3802. For example, as shown in FIG. 38, viewer 3806a may interact with a user interface of remote control 3804a to generate a display control signal 3814a, and viewer 3806b may interact with a user interface of remote control 3804b to generate a display control signal 3814b. Display control signals 3814a and 3814b may be transmitted to display device 3802 using wireless or wired communication links. Display control signals 3814a and 3814b may be configured to select particular content desired to be viewed by viewers 3806a and 3806b, respectively. For example, display control signals 3814a and 3814b may select particular media content to be viewed (e.g., television channels, video games, DVD (digital video discs) content, video tape content, web content, etc.). Display control signals 3814a and 3814b may select whether such media content is desired to be viewed in two-dimensional or three-dimensional form by viewers 3806a and 3806b, respectively. Remote controls 3804a and 3804b may be television remote control devices, game controllers, smart phones, or other remote control type device.

Headsets 3812a and 3812b are worn by viewers 3806a and 3806b, respectively. Headsets 3812a and 3812b each include one or two speakers (e.g., earphones) that enable viewers 3806a and 3806b to hear audio associated with the media content of views 3808a and 3808b. Headsets 3812a and 3812b enable viewers 3806a and 3806b to hear audio of their respective media content without hearing audio associated the media content of the other of viewers 3806a and 3806b.

Headsets 3812*a* and 3812*b* may each optionally include a microphone to enable viewers 3806*a* and 3806*b* to interact with display device 3802 using voice commands.

Display device 3802*a*, headset 3812*a*, and/or remote control 3804*a* may operate to provide position information 3810*a* regarding viewers 3806*a* to display device 3802, and display device 3802*b*, headset 3812*b*, and/or remote control 3804*b* may operate to provide position information 3810*b* regarding viewers 3806*b* to display device 3802. Display device 3802 may use position information 3810*a* and 3810*b* to reconfigure one or more light manipulators (e.g., parallax barriers and/or lenticular lenses) of display device 3802 to enable views 3808*a* and 3808*b* to be delivered to viewers 3806*a* and 3806*b*, respectively, at various locations. For example, display device 3802*a*, headset 3812*a*, and/or remote control 3804*a* may use positioning techniques to track the position of viewer 3806*a*, and display device 3802*b*, headset 3812*b*, and/or remote control 3804*b* may use positioning techniques to track the position of viewer 3806*b*.

Figure 39:
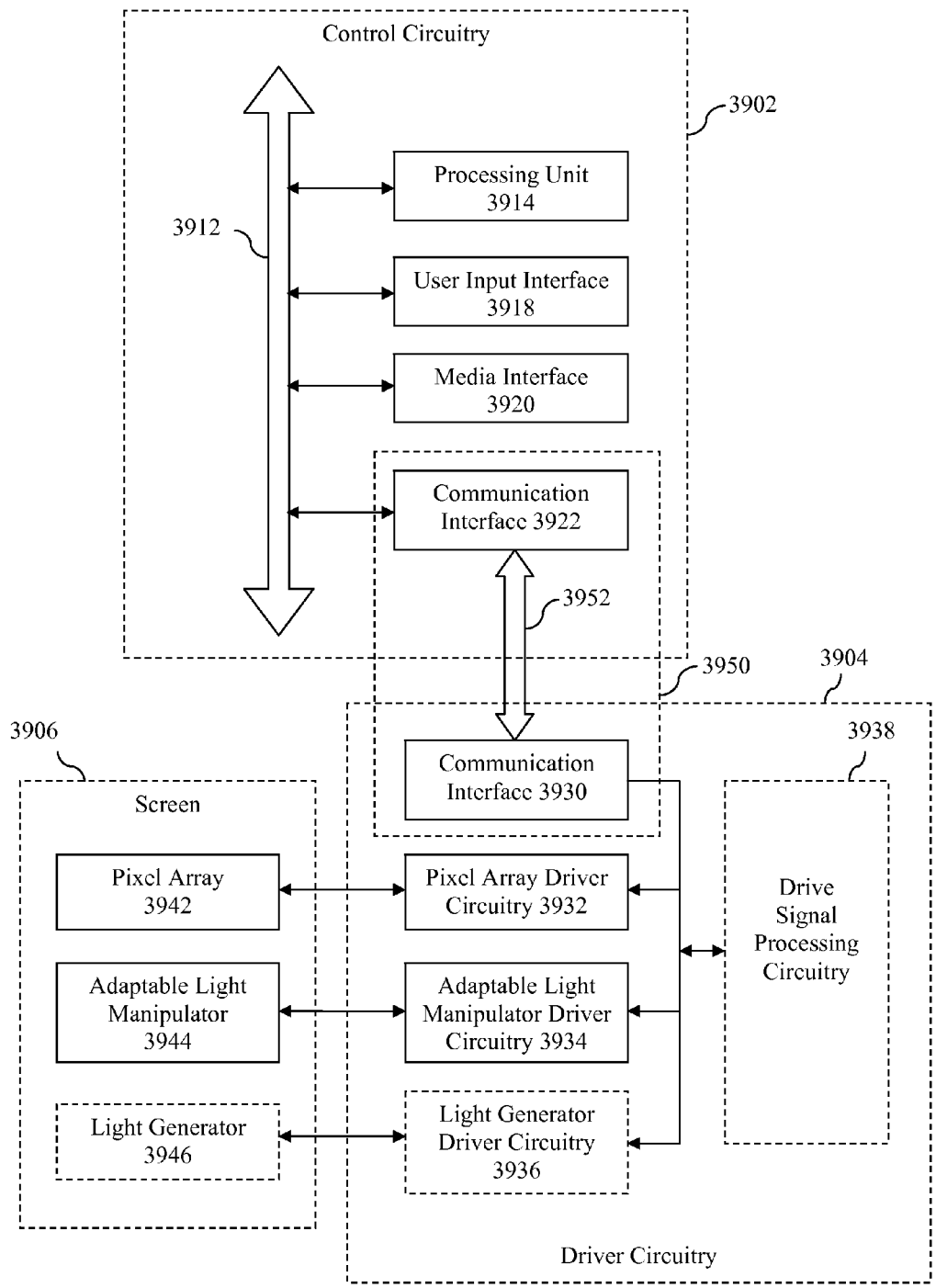
FIG. 39 is a block diagram of an exemplary practical implementation of an adaptable two-dimensional/three-dimensional display system in accordance with an embodiment.

FIG. 39 is a block diagram of an example practical implementation of a display system 3900 in accordance with an embodiment. As shown in FIG. 39, display system 3900 generally comprises control circuitry 3902, driver circuitry 3904 and a screen 3906.

As shown in FIG. 39, control circuitry 3902 includes a processing unit 3914, which may comprise one or more general-purpose or special-purpose processors or one or more processing cores. Processing unit 3914 is connected to a communication infrastructure 3912, such as a communication bus. Control circuitry 3902 may also include a primary or main memory (not shown in FIG. 39), such as random access memory (RAM), that is connected to communication infrastructure 3912. The main memory may have control logic stored thereon for execution by processing unit 3914 as well as data stored thereon that may be input to or output by processing unit 3914 during execution of such control logic.

Control circuitry 3902 may also include one or more secondary storage devices (not shown in FIG. 39) that are connected to communication infrastructure 3912, including but not limited to a hard disk drive, a removable storage drive (such as an optical disk drive, a floppy disk drive, a magnetic tape drive, or the like), or an interface for communicating with a removable storage unit such as an interface for communicating with a memory card, memory stick or the like. Each of these secondary storage devices provide an additional means for storing control logic for execution by processing unit 3914 as well as data that may be input to or output by processing unit 3914 during execution of such control logic.

Control circuitry 3902 further includes a user input interface 3918, and a media interface 3920. User input interface 3918 is intended to generally represent any type of interface that may be used to receive user input, including but not limited to a remote control device, a traditional computer input device such as a keyboard or mouse, a touch screen, a gamepad or other type of gaming console input device, or one or more sensors including but not limited to video cameras, microphones and motion sensors.

Media interface 3920 is intended to represent any type of interface that is capable of receiving media content such as video content or image content. In certain implementations, media interface 3920 may comprise an interface for receiving media content from a remote source such as a broadcast media server, an on-demand media server, or the like. In such implementations, media interface 3920 may comprise, for example and without limitation, a wired or wireless internet or intranet connection, a satellite interface, a fiber interface, a coaxial cable interface, or a fiber-coaxial cable interface.

Media interface 3920 may also comprise an interface for receiving media content from a local source such as a DVD or Blu-Ray disc player, a personal computer, a personal media player, smart phone, or the like. Media interface 3920 may be capable of retrieving video content from multiple sources.

Control circuitry 3902 further includes a communication interface 3922. Communication interface 3922 enables control circuitry 3902 to send control signals via a communication medium 3952 to another communication interface 3930 within driver circuitry 3904, thereby enabling control circuitry 3902 to control the operation of driver circuitry 3904. Communication medium 3952 may comprise any kind of wired or wireless communication medium suitable for transmitting such control signals.

As shown in FIG. 39, driver circuitry 3904 includes the aforementioned communication interface 3930 as well as pixel array driver circuitry 3932 and adaptable light manipulator driver circuitry 3934. Driver circuitry also optionally includes light generator driver circuitry 3936. Each of these driver circuitry elements is configured to receive control signals from control circuitry 3902 (via the link between communication interface 3922 and communication interface 3930) and, responsive thereto, to send selected drive signals to a corresponding hardware element within screen 3906, the drive signals causing the corresponding hardware element to operate in a particular manner. In particular, pixel array driver circuitry 3932 is configured to send selected drive signals to a pixel array 3942 within screen 3906, adaptable light manipulator driver circuitry 3934 is configured to send selected drive signals to an adaptable light manipulator 3944 within screen elements 3906, and optional light generator driver circuitry 3936 is configured to send selected drive signals to an optional light generator 3946 within screen 3906.

In one example mode of operation, processing unit 3914 operates pursuant to control logic to receive video content via media interface 3920 and to generate control signals necessary to cause driver circuitry 3904 to render such video content to screen 3906 in accordance with a selected viewing configuration. The control logic that is executed by processing unit 3914 may be retrieved, for example, from a primary memory or a secondary storage device connected to processing unit 3914 via communication infrastructure 3912 as discussed above. The control logic may also be retrieved from some other local or remote source. Where the control logic is stored on a computer readable medium, that computer readable medium may be referred to herein as a computer program product.

Among other features, driver circuitry 3904 may be controlled in a manner previously described to send coordinated drive signals necessary for simultaneously displaying two-dimensional images, three-dimensional images and multi-view three-dimensional content via different display regions of the screen. The manner in which pixel array 3942, adaptable light manipulator 3944 (e.g., an adaptable parallax barrier), and light generator 3946 may be manipulated in a coordinated fashion to perform this function was described previously herein. Note that in accordance with certain implementations (e.g., implementations in which pixel array comprises an OLED/PLED pixel array), screen 3906 need not include light generator 3946.

In one embodiment, at least part of the function of generating control signals necessary to cause pixel array 3942, adaptable light manipulator 3944 and light generator 3946 to render video content to screen 3906 in accordance with a selected viewing configuration is performed by drive signal processing circuitry 3938 which is integrated within driver circuitry 3904. Such circuitry may operate, for example, in conjunction with and/or under the control of processing unit 3914 to generate the necessary control signals.

In certain implementations, control circuitry 3902, driver circuitry 3904 and screen elements 3906 are all included within a single housing. For example and without limitation, all these elements may exist within a television, a laptop computer, a tablet computer, or a telephone. In accordance with such an implementation, the link 3952 formed between communication interfaces 3922 and 3930 may be replaced by a direct connection between driver circuitry 3904 and communication infrastructure 3912. In an alternate implementation, control circuitry 3902 is disposed within a first housing, such as set top box or personal computer, and driver circuitry 3904 and screen 3906 are disposed within a second housing, such as a television or computer monitor. The set top box may be any type of set top box including but not limited to fiber, Internet, cable, satellite, or terrestrial digital.

Figure 40:
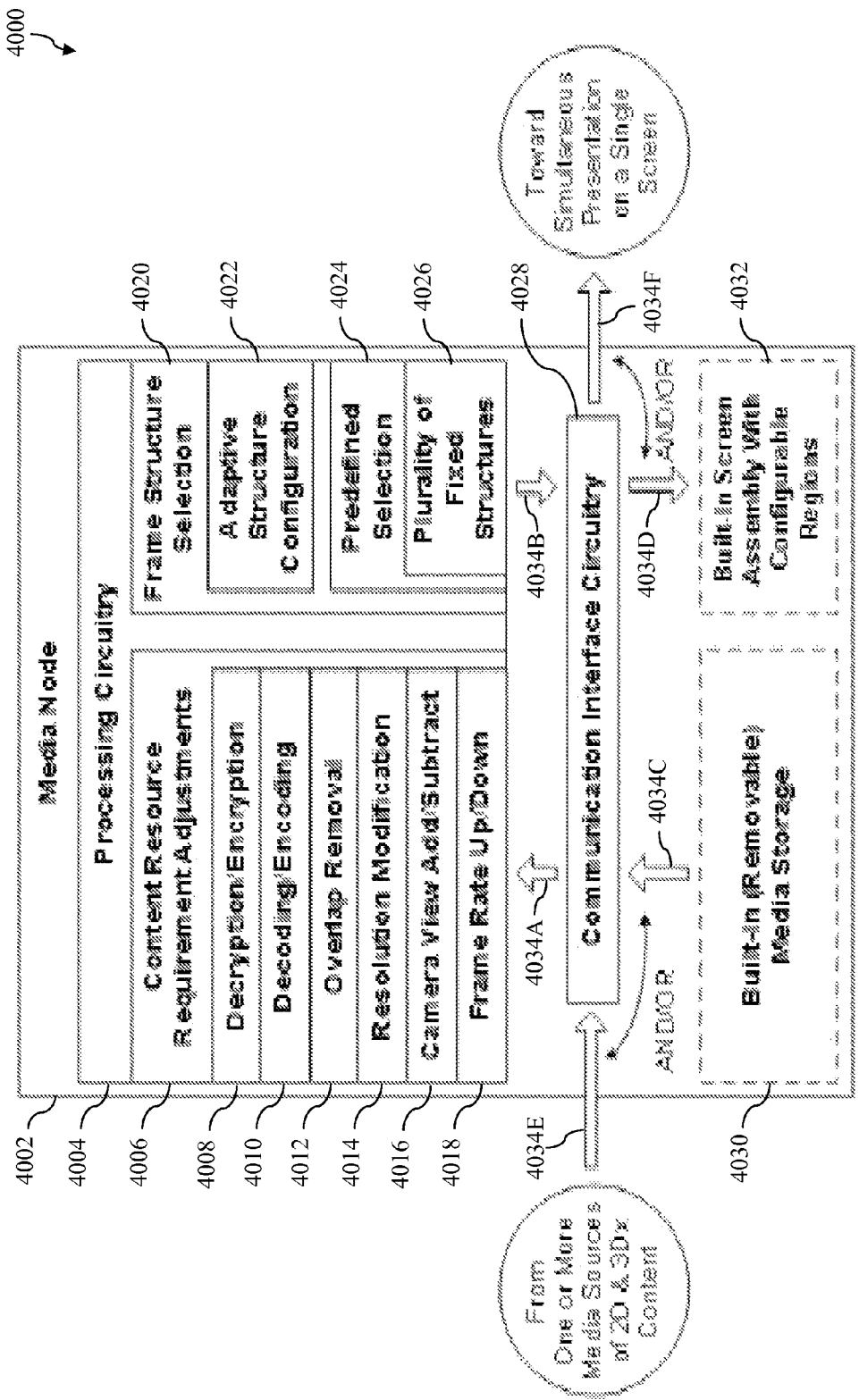
FIG. 40 shows an exemplary media node in accordance with an embodiment.

FIG. 40 shows an exemplary media node 4000 in accordance with an embodiment. Generally speaking, media node 4000 receives 2D and/or 3Dx media data from one or more media sources, adjusts the media data and/or a frame structure associated therewith, and delivers the various data toward a single screen for simultaneous display. For instance, 3Dx media data may be 3D2 media data, 3D4 media data, 3D8 media data, etc. or any combination thereof.

Media node includes processing circuitry 4004, communication interface circuitry 4028, built-in media storage 4030, and a built-in screen assembly 4032. In one example, communication interface circuitry 4028 receives the 2D and/or 3Dx media data from the source(s) via link(s) 4034E. In another example, communication interface circuitry 4028 receives the 2D and/or 3Dx media data from built-in media storage 4030 via link 4034C. In yet another example, communication interface circuitry 4028 receives a first portion of the 2D and/or 3Dx media data from the source(s) via link(s) 4034E and a second portion of the 2D and/or 3Dx media data from built-in media storage 4030 via link 4034C. Communication interface circuitry 4028 forwards the various 2D and/or 3Dx media data to processing circuitry 4004 via link 4034A to be processed. Communication interface circuitry forwards the processed media data that is received from processing circuitry 4004 to built-in screen assembly 4032 via link 4034D and/or toward a single external screen via link 4034F.

Processing circuitry 4004 adjusts the 2D and/or 3Dx media data and/or a frame structure associated therewith to provide output data having a resource requirement that accommodates constraint(s) of one or more communication links (e.g., any one or more of communication links 4034A-4034F). For example, a constraint may be a maximum bandwidth that a communication link or a device that is connected to the communication link is capable of supporting. Processing circuitry 4004 includes content resource requirement adjustment (CRRA) circuitry 4006 and frame structure selection (FSS) circuitry 4020. CRRA circuitry 4006 adjusts the \media data based on the constraint(s) of the communication link(s). CRRA circuitry 4006 includes decryption/encryption circuitry 4008, decoding/encoding circuitry 4010, overlap removal circuitry 4012, resolution modification circuitry 4014, camera view circuitry 4016, and frame rate circuitry 4018.

Decryption/encryption circuitry 4008 is configured to select a type of encryption that is to be used to encrypt the media data based on the constraint(s). For example, decryption/encryption circuitry 4008 may encrypt each of the various 2D and/or 3Dx media data individually based on the constraint(s). In another example, decryption/encryption circuitry 4008 may combine two or more (e.g., all) of the various 2D and/or 3Dx media data and perform an encryption operation on the combined media data.

Decoding/encoding circuitry 4010 is configured to modify a type of encoding that is associated with the media data based on the constraint(s). For example, decoding/encoding circuitry 4010 may encode each of the various 2D and/or 3Dx media data individually based on the constraint(s). In another example, decoding/encoding circuitry 4010 may combine two or more (e.g., all) of the various 2D and/or 3Dx media data and perform an encoding operation on the combined media data.

The various 2D and/or 3Dx video media data may correspond to respective regions of a screen. Some (or all) of the regions may overlap in areas of overlap. Accordingly, multiple portions of data may correspond to each area of overlap. Overlap removal circuitry 4012 is configured to remove one or more of such data portions for each area of overlap, so that a single portion of data represents each area of overlap, based on the constraint(s). For instance, a first area of overlap may be represented by a first single data portion; a second area of overlap may be represented by a second single data portion, and so on. Overlap removal circuitry 4012 need not necessarily remove data portion(s) for every area of overlap. For instance, overlap removal circuitry 4012 may determine for which areas of overlap and/or for how many areas of overlap to remove data portion(s) based on the constraint(s).

Resolution modification circuitry 4014 is configured to modify (e.g., increase or decrease) resolution of one or more of the 2D and/or 3Dx media data based on the constraint(s). For example, resolution modification circuitry 4014 may reduce a resolution of media data in response to a decrease in size of a screen region in which media content that is associated the data is to be displayed. In another example, resolution modification circuitry 4014 may decrease resolution that is associated with a first subset of the 2D and/or 3Dx media data and increase resolution that is associated with a second subset of the 2D and/or 3Dx media data.

Camera view circuitry 40116 is configured to modify a number of camera views that are represented by one or more of the 2D and/or 3Dx media data based on the constraint(s). For example, camera view circuitry 4016 may remove two perspectives from 3D4 media data to provide 3D2 media data to reduce a bandwidth that is used to deliver the data. In another example, camera view circuitry 4016 may remove one perspective from 3D2 media data to provide 2D media data. In yet another example, camera view circuitry 4016 may add four perspectives to 3D4 media data to provide 3D8 media data, so as to more thoroughly utilize available bandwidth.

Frame rate circuitry 4018 is configured to modify a frame rate that is associated with one or more of the various 2D and/or 3Dx media data based on the constraint(s). For example, frame rate circuitry 4018 may reduce a frame rate that is associated with data if consecutive frames of the data are substantially the same. In another example, frame rate circuitry 4018 may decrease the frame rate that is associated with the data Any of decryption/encryption circuitry 4008, decoding/encoding circuitry 4010, overlap removal circuitry 4012, resolution modification circuitry 4014, camera view circuitry 4016, and/or frame rate circuitry 4018 may be connected by one or more links.

FSS circuitry 4020 includes adaptive structure circuitry 4022 and predefined selection circuitry 4024. Predefined selection circuitry 4024 is configured to select a frame structure from among a plurality of fixed frame structures to be used with respect to the various 2D and/or 3Dx media data based on the constraint(s). Adaptive structure circuitry 4022 is configured to modify aspect(s) of a frame structure for use with respect to the various 2D and/or 3Dx media data based on the constraint(s).

Adaptive structure circuitry 4022 and predefined selection circuitry 4024 may be used in combination in some embodiments. For example, FSS circuitry 4020 may select a frame structure from among adaptive frame structures that are provided by adaptive structure circuitry 4022 and fixed frame structures that are provided by predefined selection circuitry 4024 based on the constraint(s). In another example, predefined selection circuitry 4024 may select a frame structure based on the constraint(s), and adaptive structure circuitry 4022 may modify the selected frame structure based on the constraint(s).

Links 4034A-4034F are shown in FIG. 40 to be unidirectional merely to illustrate the flow of media data and are not intended to be limiting. It will be recognized that communication with respect to these and other links may be bi-directional.

Media node 4000 may exist in any network element or node anywhere in an end-to-end pathway. For instance, media node 4000 may be included in a source (e.g., source 102 or any of sources 802A-802N), an intermediate device (e.g., intermediate device 104, 804, 904A, 904B, or 1004), or a display device (e.g., display device 106 or 806 or display 906 or 1006).

Figure 41:
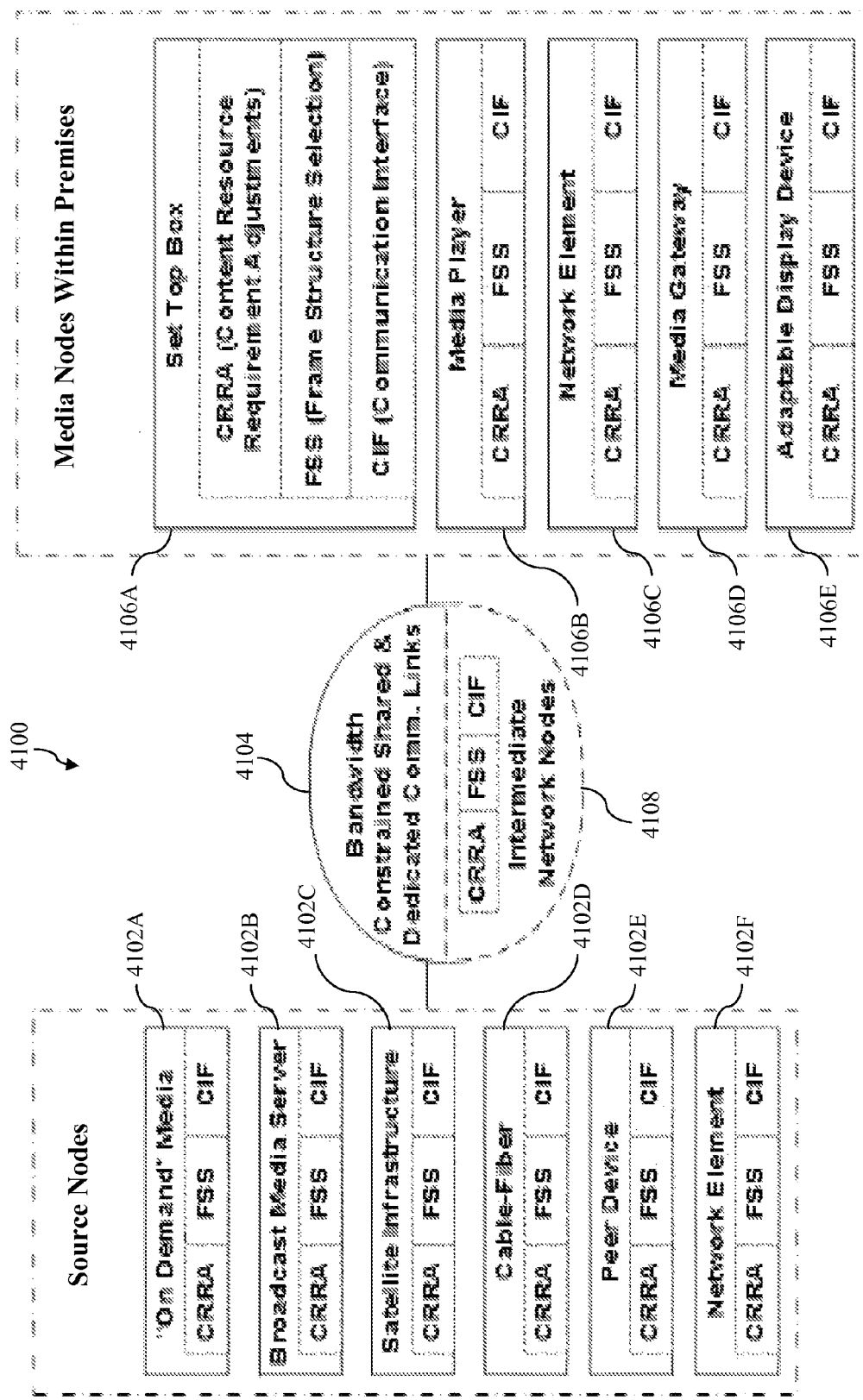
FIG. 41 shows an exemplary system in accordance with an embodiment.

FIG. 41 shows an exemplary system 4100 in accordance with an embodiment. System 4100 includes source nodes 4102A-4102F and media nodes 4106A-4106E. The source nodes are shown to include "on demand" media node 4102A, a broadcast media server 4102B, a satellite infrastructure 4102C, a cable-fiber infrastructure 4102D, a peer device 4102E, and a network element 4102F for illustrative purposes and are not intended to be limiting. The media nodes are shown to include a set top box 4106A, a media player 4106B, a network element 4106C, a media gateway 4106D, and an adaptable display device 4106E for illustrative purposes. System 4100 may include any suitable source(s) and media node(s). It is noted that the media devices may include integrated devices and/or stand alone devices, each of which may operate in concert with other media devices or independently of other media devices.

Source nodes 4102A-4102F are connected to media nodes 4106A-4106E via communication links 4104. As shown in FIG. 41, communication links 4104 may include bandwidth constrained communication links and serve as the backbone through which the framing structure participates. Each of the communication links 4104 may correspond to at least one proprietary and/or industry standard. Each of the communication links 4104 may be a shared communication link or a dedicated communication link. One or more intermediate network nodes 4108 may be connected among the communication links 4104, though the scope of the embodiments is not limited in this respect.

Each of the source nodes 4102A-4102F, media nodes 4106A-4106E, and intermediate network nodes 4108 may include CRRA circuitry, FSS circuitry, and/or CIF circuitry as described above with reference to FIG. 40, though the embodiments are not limited in this respect. The CRRA circuitry, FSS circuitry, and/or CIF circuitry in any node may service at least an immediate downstream communication link. In some embodiments, such circuitry may participate upstream, for example, by indicating to an upstream device a frame format to be used with respect to the media data, by indicating to the upstream device how the media data is to be modified before delivery, and/or by requesting delivery of a different version of the media data from the upstream device.

It will be recognized that any of source nodes 4102A-4102F may be connected by one or more links. Moreover, any of media nodes 4106A-4106E may be connected by one or more links. Each link, whether it be a dedicated link (between two devices) or shared link and external to device housings or on some internal bus structures therebetween, may operate pursuant to a proprietary or industry standard protocol that takes into consideration bandwidth constraints. Thus, each processing circuit that manages a communication interface through which a combination of two or more different portions of media data are transferred may make adjustments to the underlying media portions in order to satisfy a bandwidth constraint. Such adjustments may be made with respect to each internal or external cable or bus structure, plus every shared or point-to-point wired or wireless pathway between any two devices or between any two circuit elements.

III. Conclusion

While various embodiments have been described above, it should be understood that they have been presented by way of example only, and not limitation. It will be understood by those skilled in the relevant art(s) that various changes in form and details may be made to the embodiments described herein without departing from the spirit and scope of the invention. Accordingly, the breadth and scope of the present invention should not be limited by any of the above-described exemplary embodiments, but should be defined only in accordance with the following claims and their equivalents.

What is claimed is:

1. A method supporting formatting of first video data and second video data for delivery in a series of frames via a communication pathway toward a screen, the method comprising:

placing in a first region field a first entry that at least assists in identifying a first display region associated with the first video data;

placing in a second region field a second entry that at least assists in identifying a second display region associated with the second video data;

placing in a first configuration field a third entry that at least assists in identifying a first screen configuration to be used with the first video data;

placing in a second configuration field a fourth entry that at least assists in identifying a second screen configuration to be used with the second video data, the second video data being at least a part of three-dimensional video data, the second screen configuration being a three-dimensional screen configuration and is different from the first screen configuration, and the first screen configuration and the second screen configuration being simultaneously supported on the screen;

placing in a first payload field a portion of the first video data;

placing in a second payload field a portion of the second video data;

constructing a frame of the series of frames which contains at least the first payload field content and the second payload field content; and reformatting one or more of the first video data or the second video data by at least one of removing one or more of multiple data portions that correspond to an area of overlap, reducing resolution of the first video data or the second video data, or reducing a number of perspectives that are represented by the first video data or the second video data.

2. The method of claim 1, further comprising:
placing segments of the second video data into a corresponding plurality of payload fields.

3. The method of claim 2, further comprising:
placing at least a plurality of the first, second, third and fourth entries into at least one frame of the series of frames.

4. The method of claim 1, wherein the first video data is two-dimensional video data.

5. The method of claim 1, wherein the first video data is at least a part of other three-dimensional video data.

6. The method of claim 1, wherein the reformatting of one or more of the first video data or the second video data is based on configuration information regarding one or more limitations of a display associated with the screen, including information relating to a bandwidth or a number of perspectives that is to be used to represent the first video data or the second video data.

7. The method of claim 1, wherein the reformatting of one or more of the first video data or the second video data is based on information provided by a user.

8. A system supporting formatting of first video data and second video data for delivery in a series of frames via a communication pathway toward a screen, the system comprising:
a communication interface that supports delivery of the series of frames; and
processing circuitry coupled to the communication interface, the processing circuitry configured to
place in a first region field a first entry that at least assists in identifying a first display region associated with the first video data,
place in a second region field a second entry that at least assists in identifying a second display region associated with the second video data,
place in a first configuration field a third entry that at least assists in identifying a first screen configuration to be used with the first video data,
place in a second configuration field a fourth entry that at least assists in identifying a second screen configuration to be used with the second video data, the second video data being at least a part of three-dimensional video data, the second screen configuration being three-dimensional screen configuration and is different from the first screen configuration, and the first screen configuration and the second screen configuration being simultaneously supported on the screen,
place in a first payload field a portion of the first video data,
place in a second payload field a portion of the second video data,
construct a frame of the series of frames which contains at least the first payload field content and the second payload field content, and
reformat one or more of the first video data or the second video data by at least one of
removing one or more of multiple data portions that correspond to an area of overlap,
reducing resolution of the first video data or the second video data, or
reducing a number of perspectives that are represented by the first video data or the second video data.

9. The system of claim 8, wherein the processing circuitry is further configured to place segments of the second video data into a corresponding plurality of payload fields.

10. The system of claim 9, wherein the processing circuitry is further configured to place at least a plurality of the first, second, third, and fourth entries into at least one frame of the series of frames.

11. The system of claim 8, wherein the first video data is two-dimensional video data.

12. The system of claim 8, wherein the first video data is at least a part of other three-dimensional video data.

13. The system of claim 8, wherein the reformatting of one or more of the first video data or the second video data is based on configuration information regarding one or more limitations of a display associated with the screen, including information relating to a bandwidth or a number of perspectives that is to be used to represent the first video data or the second video data.

14. The system of claim 8, wherein the reformatting of one or more of the first video data or the second video data is based on information provided by a user.

15. A method supporting formatting of first video data and second video data for delivery in a series of frames via a communication pathway toward a screen, the method comprising:
placing in a first region field a first entry that at least assists in identifying a first display region associated with the first video data;
placing in a second region field a second entry that at least assists in identifying a second display region associated with the second video data;
placing in a first configuration field a third entry that at least assists in identifying a first screen configuration to be used with the first video data;
placing in a second configuration field a fourth entry that at least assists in identifying a second screen configuration to be used with the second video data, the second video data being at least a part of three-dimensional video data, the second screen configuration being a three-dimensional screen configuration and is different from the first screen configuration, and the first screen configuration and the second screen configuration being simultaneously supported on the screen;
placing in a first payload field a portion of the first video data;
placing in a second payload field a portion of the second video data;
constructing a frame of the series of frames which contains at least multiple instances of the first, second, third, and fourth entries; and
reformatting one or more of the first video data or the second video data by at least one of
removing one or more of multiple data portions that correspond to an area of overlap,
reducing resolution of the first video data or the second video data, or
reducing a number of perspectives that are represented by the first video data or the second video data.

16. The method of claim 15, further comprising:
placing at least the first payload field content and the second payload field content in the frame.

17. The method of claim 15, further comprising:
placing segments of the second video data into a corresponding plurality of payload fields.

18. The method of claim 15, wherein the first video data is two-dimensional video data.

19. The method of claim 15, wherein the first video data is at least a part of other three-dimensional video data.

20. The method of claim 15, wherein the reformatting of one or more of the first video data or the second video data is based on configuration information regarding one or more limitations of a display associated with the screen or information provided by a user, including information relating to a bandwidth or a number of perspectives that is to be used to represent the first video data or the second video data.

* * * * *